(12) United States Patent
Song et al.

(10) Patent No.: US 10,086,548 B2
(45) Date of Patent: Oct. 2, 2018

(54) EXTRUSION APPARATUS AND METHOD USING VARIABLE EXTRUSION GATE

(71) Applicant: The Boeing Company, Chicago, IL (US)

(72) Inventors: Weidong Song, Woodinville, WA (US); Jeffrey H. Olberg, Federal Way, WA (US); Jamie J. Langabeer, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/470,304

(22) Filed: Mar. 27, 2017

(65) Prior Publication Data

US 2017/0197346 A1 Jul. 13, 2017

Related U.S. Application Data

(63) Continuation-in-part of application No. 14/812,223, filed on Jul. 29, 2015, and a continuation-in-part of application No. 15/189,316, filed on Jun. 22, 2016.

(51) Int. Cl.
*B29C 47/02* (2006.01)
*B29C 47/92* (2006.01)
(Continued)

(52) U.S. Cl.
CPC .......... *B29C 47/02* (2013.01); *B29C 47/0002* (2013.01); *B29C 47/026* (2013.01); *B29C 47/92* (2013.01); *B29C 70/00* (2013.01); *B29D 99/0003* (2013.01); *B64C 1/064* (2013.01); *B29C 47/0014* (2013.01); *B29C 47/0016* (2013.01); *B29C 47/0064* (2013.01); *B29C 47/0083* (2013.01); *B29C 47/0866* (2013.01); *B29C 47/1045* (2013.01); *B29C 47/366* (2013.01); *B29C 47/767* (2013.01); *B29C 47/786* (2013.01); *B29C 47/822* (2013.01); *B29C 65/02* (2013.01); *B29C 66/112* (2013.01); *B29C 66/1122* (2013.01);
(Continued)

(58) Field of Classification Search
CPC ........ B29C 2945/767; B29C 2043/585; B29C 47/12
USPC ..................................................... 264/700, 40
See application file for complete search history.

(56) References Cited

U.S. PATENT DOCUMENTS 3,797,550 A    3/1974  Latinen et al.
4,058,298 A *  11/1977  Duska .................... B29C 47/48
                                                          366/76.1
(Continued)

OTHER PUBLICATIONS

"Extrusion of Thermoplastics." Available Jan. 4, 2006. <https://www.pitfallsinmolding.com/extrusionl.html>.*
(Continued)

*Primary Examiner* — Matthew J Daniels
*Assistant Examiner* — Hana Page
(74) *Attorney, Agent, or Firm* — Yee & Associates, P.C.

(57) ABSTRACT

A thermoplastic composite structure is produced by extruding a bead of composite material to a desired cross sectional shape. An extruder extrudes the polymer bead containing reinforcing fibers, using a low compression first extruder stage where the polymer is mixed and de-gassed, and a high compression second stage where the polymer is consolidated and extruded. The cross sectional profile of the polymer bead may be altered using a variable extruder gate.

20 Claims, 40 Drawing Sheets

(51) Int. Cl.
| | |
|---|---|
| *B29C 47/00* | (2006.01) |
| *B29C 70/00* | (2006.01) |
| *B64C 1/06* | (2006.01) |
| *B29D 99/00* | (2010.01) |
| *B29L 31/30* | (2006.01) |
| *B29K 105/16* | (2006.01) |
| *B29C 65/00* | (2006.01) |
| *B29C 47/08* | (2006.01) |
| *B29C 47/10* | (2006.01) |
| *B29C 47/36* | (2006.01) |
| *B29C 47/76* | (2006.01) |
| *B29C 47/78* | (2006.01) |
| *B29C 47/82* | (2006.01) |
| *B29C 65/02* | (2006.01) |
| *B64C 1/00* | (2006.01) |
| *B29K 105/12* | (2006.01) |
| *B29K 105/10* | (2006.01) |

(52) U.S. Cl.
CPC ...... *B29C 66/131* (2013.01); *B29C 66/43441* (2013.01); *B29C 66/474* (2013.01); *B29C 66/496* (2013.01); *B29C 66/524* (2013.01); *B29C 66/5326* (2013.01); *B29C 66/54* (2013.01); *B29C 66/636* (2013.01); *B29C 66/721* (2013.01); *B29C 66/73754* (2013.01); *B29C 2791/006* (2013.01); *B29C 2947/926* (2013.01); *B29C 2947/92076* (2013.01); *B29C 2947/92104* (2013.01); *B29C 2947/92114* (2013.01); *B29C 2947/92209* (2013.01); *B29C 2947/92514* (2013.01); *B29C 2947/92571* (2013.01); *B29C 2947/92609* (2013.01); *B29C 2947/92704* (2013.01); *B29K 2105/106* (2013.01); *B29K 2105/12* (2013.01); *B29K 2105/16* (2013.01); *B29K 2105/165* (2013.01); *B29L 2031/3076* (2013.01); *B29L 2031/3082* (2013.01); *B29L 2031/3085* (2013.01); *B64C 2001/0072* (2013.01)

(56) References Cited

U.S. PATENT DOCUMENTS

| | | | | |
|---|---|---|---|---|
| 4,415,336 | A | | 11/1983 | Stasi et al. |
| 5,162,090 | A | * | 11/1992 | Arima ................ B29C 47/0023 264/167 |
| 5,358,397 | A | * | 10/1994 | Ligon ................... B29C 47/026 156/244.11 |
| 5,788,901 | A | * | 8/1998 | Barnard .................. B29C 43/26 264/165 |
| 5,816,698 | A | | 10/1998 | Durina et al. |
| 6,280,667 | B1 | | 8/2001 | Koenig et al. |
| 8,366,851 | B2 | * | 2/2013 | Matsuoka ........... B29C 47/0023 156/117 |
| 9,205,027 | B2 | | 12/2015 | Kessler et al. |
| 9,623,593 | B2 | * | 4/2017 | Fitzpatrick ........... G05B 19/042 |
| 2002/0092392 | A1 | * | 7/2002 | Yasoda .................... B26D 5/08 83/136 |
| 2004/0062827 | A1 | | 4/2004 | Yamaguchi et al. |
| 2006/0103045 | A1 | * | 5/2006 | O'Brien-Bernini .......................... B29C 47/0004 264/45.9 |
| 2012/0139147 | A1 | | 6/2012 | Houk |
| 2012/0313274 | A1 | * | 12/2012 | Loukusa ................ B29C 47/16 264/40.1 |
| 2015/0224699 | A1 | | 8/2015 | Larsen et al. |
| 2016/0082641 | A1 | | 3/2016 | Bogucki et al. |
| 2017/0028606 | A1 | | 2/2017 | Song et al. |

OTHER PUBLICATIONS

Conairgroup, "Plastic processing Overview," YouTube.com, published on Aug. 25, 2015, 1 page. https://www.youtube.com/watch?v=qn16JtE_vLc.

Song et al., Nozzle, Nozzle Assembly and Method for Extrusion of Composite Material, U.S. Appl. No. 15/189,316, filed Jun. 22, 2016, 44 pages.

Song, "2-Stage Extrusion Apparatus and Method of Extrusion," U.S. Appl. No. 15/470,168, filed Mar. 27, 2017, 98 pages.

Martin, Devolitization via Twin Screw Extrusion: Theory, Tips and Test Results, Plastics Extrusion Asia 2014, Jul. 16, 2014, 9 pages.

Office Action, dated Nov. 16, 2017, regarding U.S. Appl. No. 15/470,168, 24 pages.

Notice of Allowance, dated May 11, 2018, regarding U.S. Appl. No. 15/470,168, 16 pages.

\* cited by examiner

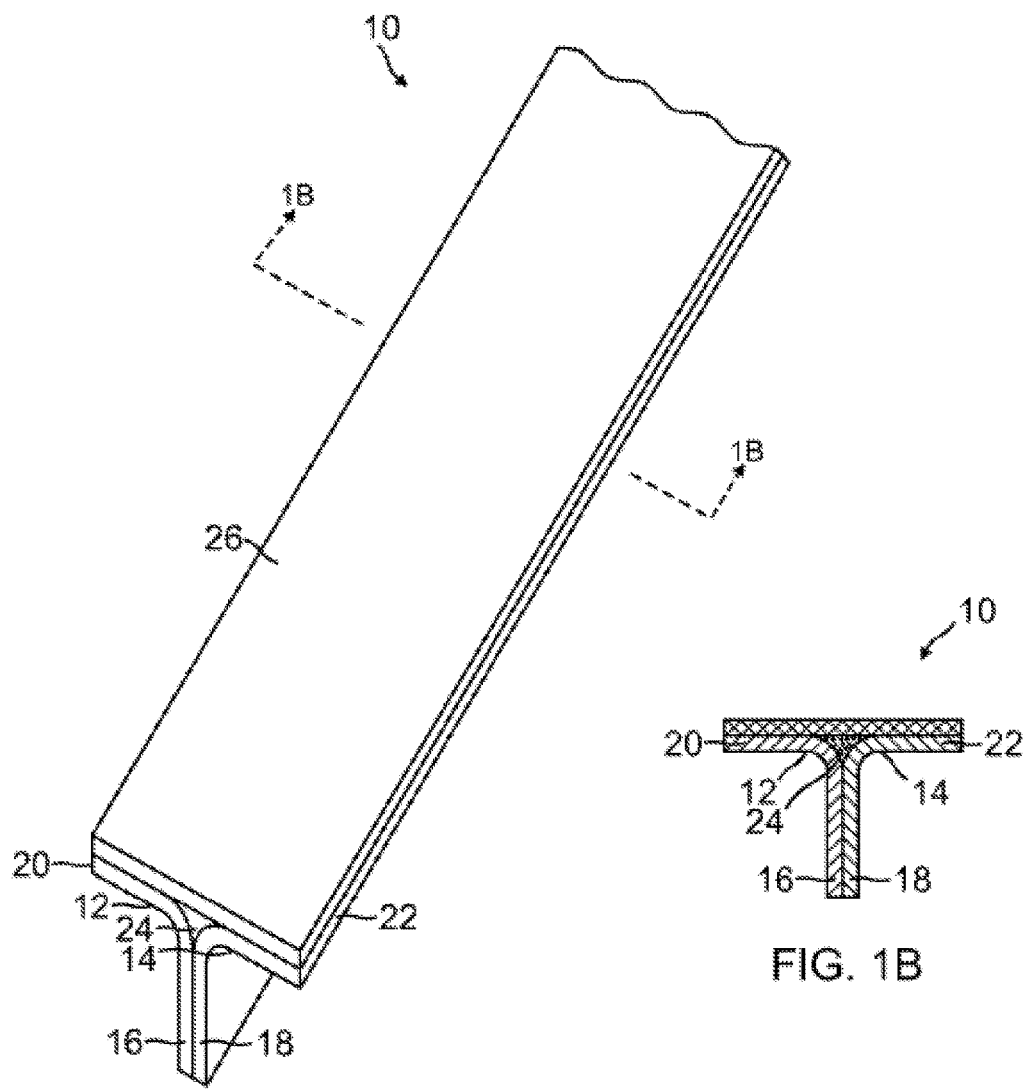

EXTRUSION APPARATUS AND METHOD USING VARIABLE EXTRUSION GATE

CROSS REFERENCE TO RELATED APPLICATIONS

This application is a continuation-in-part of prior co-pending U.S. patent application Ser. No. 14/812,223 filed Jul. 29, 2015, U.S. Publication No. 2017/0028606; is a continuation-in-part of prior co-pending U.S. patent application Ser. No. 15/189,316 filed Jun. 22, 2016; and is related to U.S. Patent Publication No. 2017/0368732 filed concurrently herewith and titled 2-Stage Extrusion Apparatus and Method of Extrusion, the entire disclosures of which are incorporated by reference herein.

BACKGROUND INFORMATION

1. Field

The present disclosure generally relates to manufacturing systems and methods, and more particularly, to systems and methods for making composite structures, e.g., composite aircraft structures.

2. Background

The recent advent of aircraft with composite airframes, i.e., fiber-reinforced polymer or resin airframes, has prompted the need for systems and methods for fabricating composite structural elements of such airframes, e.g., the skins, spars, ribs, frames, and stringers thereof.

As an example, longerons, frames, "stringers" or "stiffeners," and other aircraft structural elements can be fabricated from flat composite ply layups. To stiffen them, they can be provided with complex cross-sectional shapes, e.g., an "L", "U", "Onion", "hat", "I", "T", "J", "Z" or the like, cross-sectional shape, depending on, among other things, the type and amount of load the structural element is designed to carry. The composite cross sectional shapes noted above can be folded to form portions of the cross section but leave voids where the folds meet the other elements of the composite section.

In one of only many possible embodiments thereof, a composite structure can be fabricated by abutting the legs of two composite structural members so as to form groove or channel at their junction, then filling the channel with a structure called a noodle or filler so as to join the two elements together. It is desirable to automate the fabrication procedure, particularly the channel-filling step, with systems and methods that enable composite structures to be produced rapidly, accurately, repeatably, and with a minimum of manual labor, thereby resulting in composite structures that are not only strong and reliable, but cost-effective as well.

SUMMARY

The disclosure relates in general to methods and devices for manufacturing composite structures, and more specifically to a method and apparatus for extruding a bead of composite material.

According to one disclosed embodiment, apparatus is provided for extruding a fiber reinforced polymer bead. The apparatus includes a barrel configured to hold a polymer containing reinforcing fibers, an extrusion nozzle attached to the barrel, and a gate. The extrusion nozzle includes a die having a fixed opening through which the fiber reinforced polymer is extruded into the polymer bead. The gate is movable over a portion of the fixed die opening for changing a shape of the polymer bead extruded through the extrusion nozzle.

According to another embodiment, a robotic end effector is provided for extruding a polymer bead containing reinforcing fibers. The robotic end effector includes a barrel, a rotatable screw within the barrel, a motor for rotating the screw, and an extrusion nozzle assembly mounted on the end of the barrel. The barrel is configured to receive a polymer therein containing reinforcing fibers. The rotatable screw functions to move the polymer toward an end of the barrel. The motor rotates the screw. The extrusion nozzle assembly includes a die having a die face provided with a fixed die opening therein. The gate is slidable over a portion of the die opening for varying the shape of the bead of the polymer extruded through the die.

According to still another disclose embodiment, a method is provided of extruding a polymer bead containing reinforcing fibers. The method includes extruding a polymer bead, and changing the cross-sectional shape of the polymer bead by moving a gate over a portion of the opening in the face of the die. The opening in the die has a fixed shape.

One of the advantages of the disclosed embodiments is that a polymer bead can be extruded through a die in which the cross-sectional shape of the extruded bead can be altered without replacing the die. Another advantage is that a polymer bead can be extruded in which the cross-sectional shape and/or area of the bead can be altered along its length. A further advantage of the embodiments is that a polymer bead can be tailored under digital control for filling a channel or similar depression which varies in cross-section along its length.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 1A is a perspective end view of an exemplary embodiment of a composite structure;

FIG. 1B is a cross-sectional view of the composite structure of FIG. 1A, as seen along the lines of the section 1B-1B taken therein;

DETAILED DESCRIPTION

Figure 2A:
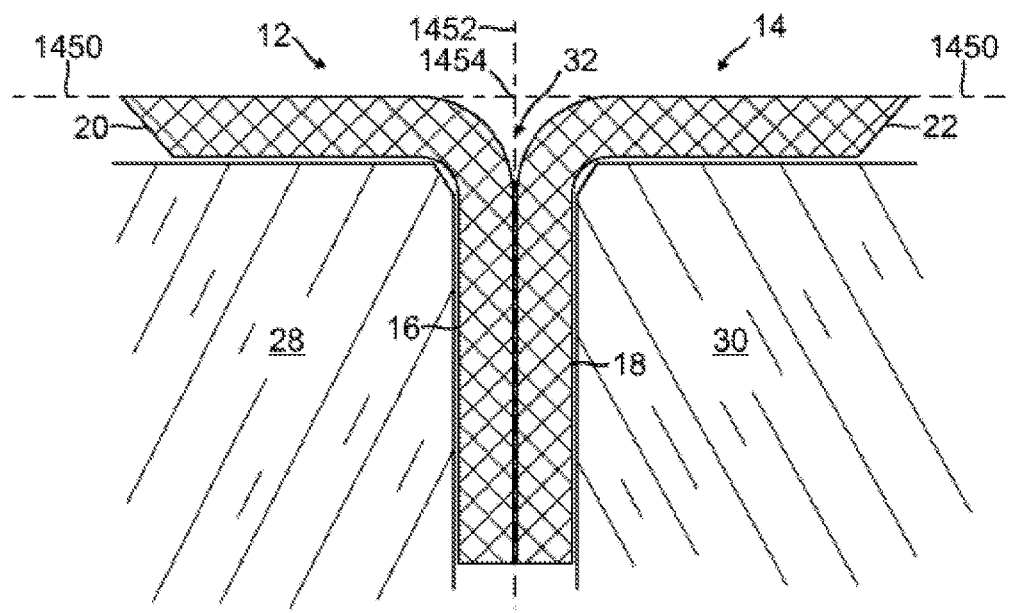
FIGS. 2A-2C are cross-sectional views of successive steps involved in the fabrication of the composite structure of FIGS. 1A and 1B.

FIG. 1A is a perspective end view of an example composite structure 10, viz., an aircraft stringer, to which the systems and methods of the present disclosure are mainly directed, and FIG. 1B is a cross-section view of the structure 10, as seen along the lines of the section 1B-1B taken in FIG. 1A. As can be seen in these figures, the structure 10 comprises a pair of elongated, L-shaped composite structural members 12 and 14, each having a respective vertical "leg" 16 or 18, which are disposed in a back-to-back abutment with each other so as to define a nascent composite structure having the generally T-shaped cross-section seen in FIG. 1B.

As a result of this arrangement, a longitudinally extending, generally V-shaped groove or channel 32 is defined between the upper, horizontal "flanges" 20 and 22 of the two members 12 and 14, and as discussed above, a correspondingly shaped fillet or bead 24 of a composite filler material 200 is disposed within the channel 32. Optionally, as illustrated in FIGS. 1A and 1B, a third composite structural member 26, e.g., a band of composite material, can be bonded onto the bead 24 of filler material 200 and the horizontal flanges 20 and 22 of the structural members 12 and 14 to further strengthen and stiffen the resulting structure 10.

Figure 2B:
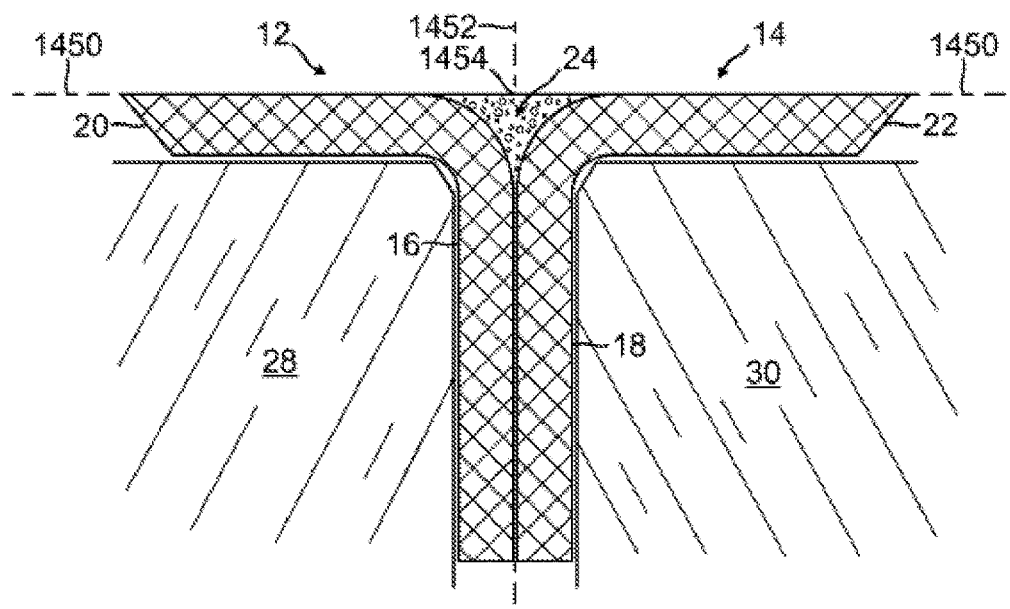
Figure 2C:
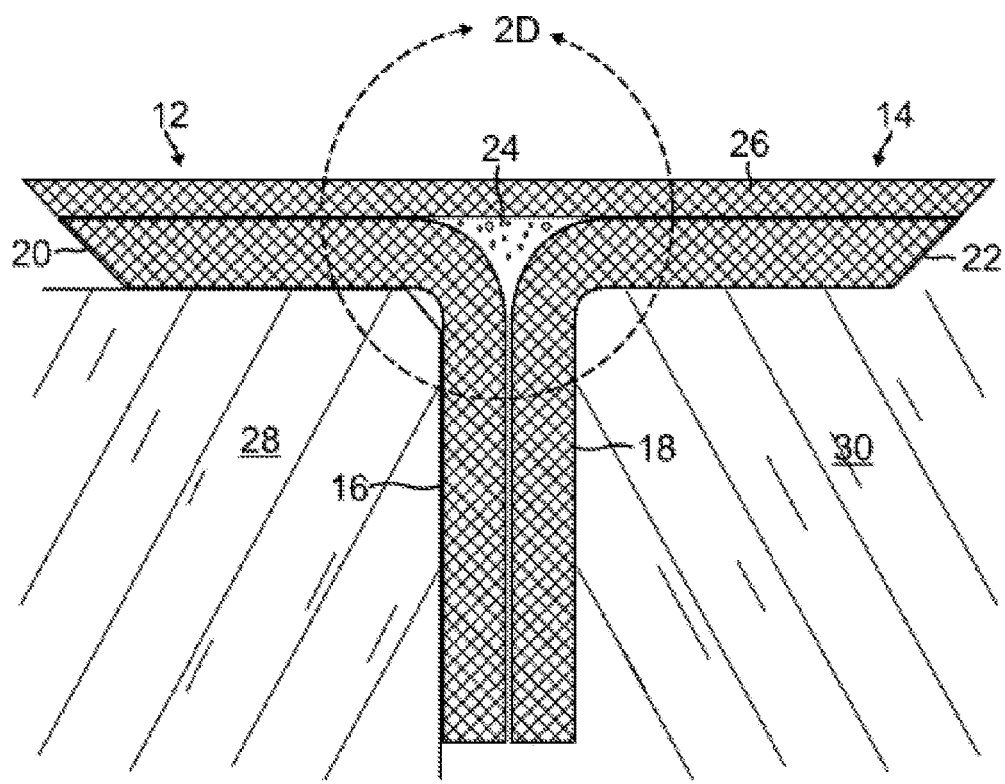
Figure 2D:
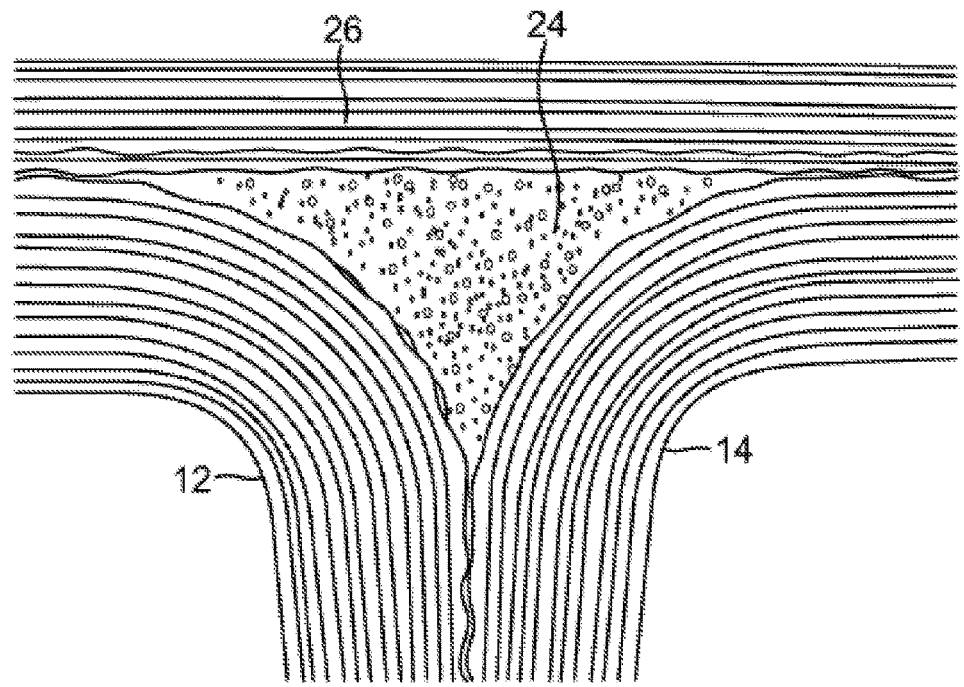
FIG. 2D is an enlarged photograph of a partial cross-sectional area of an actual composite structure corresponding to that indicated in FIG. 2C as detail 2D, showing a V-shaped channel disposed between two adjacent, L-shaped composite structural members and below a third structural member, with an exemplary embodiment of a compacted bead of a composite filler material substantially filling the channel.

FIGS. 2A-2C are cross-sectional views of successive steps involved in a process for fabricating the composite structure 10 of FIGS. 1A and 1B, and FIG. 2D is an enlarged photograph of a cross-sectional area of an actual composite structure 10 corresponding to that illustrated in FIG. 2C and indicated therein as detail view 2D. As illustrated in FIGS. 2A, in one practical embodiment, the process can begin with clamping the vertical "legs" 16 and 18 in a fixture, comprising a pair of opposing, spaced-apart plates 28 and 30, such that they are disposed in a back-to-back abutment with each other. Optionally, the two legs 16 and 18 can be bonded to each other. Their respective horizontal flanges 20 and 22 are then disposed parallel to each other atop the fixture, so as to define the generally V-shaped channel 32 discussed above.

The cross-sectional view of FIG. 2B illustrates the nascent T-shaped structure after the reinforcing bead 24 of composite material has been deposited in the channel 32 and compacted therein by, e.g., the use of a screed or a roller, and FIG. 2C shows a similar view, but after the third structural member 26 has been disposed atop the bead 24 of filler material and the horizontal flanges 20 and 22.

In one possible embodiment, the components of the assembly, i.e., the L-shaped structural members 12 and 14, the third structural member 26, and the bead 24 of the composite filler material, can be provided in a partially cured state, e.g., in a so-called "B-stage" condition, in which they are relatively flexible and "tacky," to facilitate the assembly process. That is, the materials can be applied and/or assembled in the partially cured state at one location and at an initial time, such that they are tacked together to help hold the laminated structure configuration until final curing, and then finally cured in another location, e.g., hours or even days later. Accordingly, for the structure 10 to reach its optimum strength and stiffness, the components of the assembly must be finally cured, which is typically effected at an elevated temperature and pressure, e.g., in an autoclave.

FIG. 2D is an enlarged photograph of a partial cross-sectional area of an actual composite structure corresponding to that indicated as detail view 2D in FIG. 2C, showing an example embodiment of the compacted bead 24 of a composite filler material substantially filling the V-shaped channel 32 between two composite structural members 12 and 14 and below the third structural member 26.

In one possible formulation, the noodle or channel filler material can comprise one in which first and second groups of reinforcing fibers, e.g., carbon, glass, aramid, basalt, or the like, are dispersed within a fluid, polymeric matrix material, e.g., a thermosetting epoxy resin. The fibers of the first group can have a first length and an aspect ratio of 2000 or less, and the fibers of the second group can have a second length that is substantially shorter than the first length. In addition to the fibers, the novel formulation can include thixotropic nanoparticles and/or "toughening" agents that are also dispersed within the resin. This formulation results in an isotropic, short fiber, reinforced thermosetting resin channel-filler.

Figure 2E:
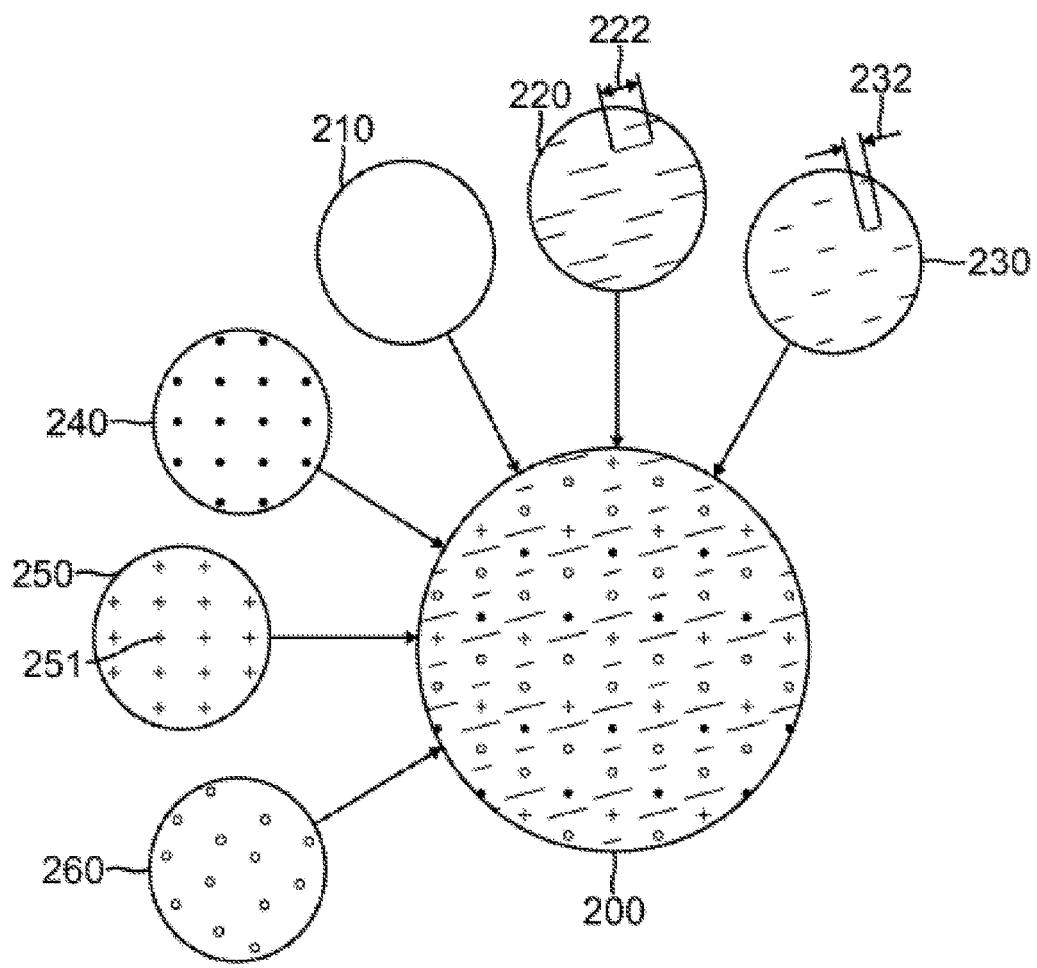
FIG. 2E is a schematic view of an exemplary embodiment of a composite channel filler material, according to an embodiment of the present disclosure.
Figure 3:
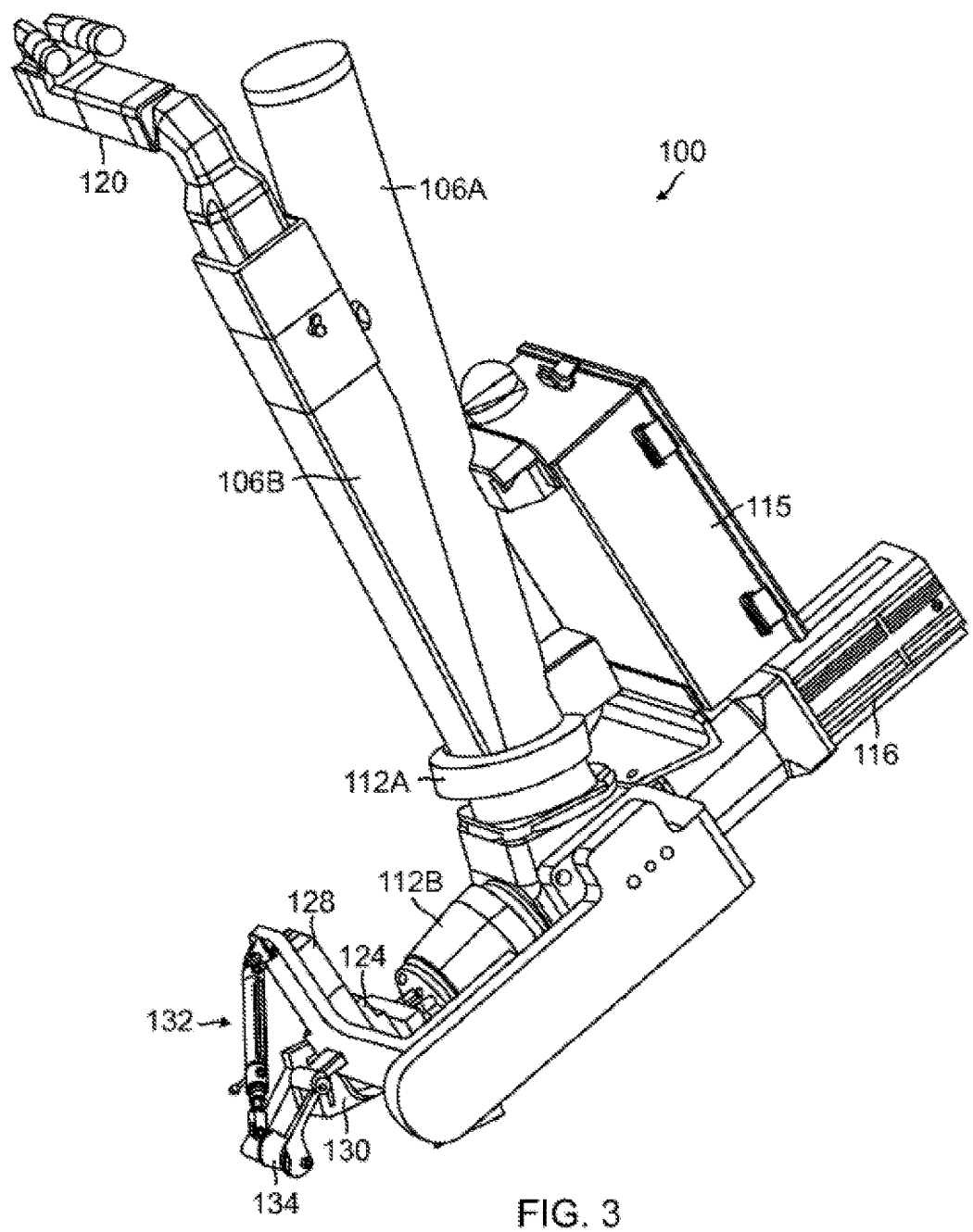
FIG. 3 is an upper, front, and left side perspective view of an example embodiment of an end-effector in accordance with the present disclosure.

FIG. 2E is a schematic view of a composite channel filler material 200 formulated in accordance with an example embodiment of the foregoing formulation. The composite channel filler material 200 of the illustrated embodiment is compounded for an "in-situ" application (i.e., formed as a paste or paste-like material that can be applied by various techniques to nascent structural member elements at the time of their assembly), for joining plural adjacent composite structural members along a common seam or length of the members. The composite channel filler material 200 depicted includes a resin matrix 210, e.g., a thermosetting resin 210, a first group of fibers 220 dispersed within the resin 210, a second group of fibers 230 dispersed within the resin 210, a third group of fibers 240 dispersed within the resin 210, a group 200 of thixotropic particles 251 dispersed within the resin 210, and a toughening agent 260 dispersed within the resin 210. The fibers of the first group 220 can have a length 222 that is substantially longer the length 232 of the fibers of the second group 230. The composite channel filler material 200 can be used, for example, to provide the composite channel filler 24 of the type discussed above in connection with FIGS. 1A-2D.

Generally speaking, one or more of the various additives (i.e., the first group of fibers 220, second group of fibers 230, third group of fibers 240, thixotropic particles 251, toughening agent 260) are added to the resin 210 to improve one or more properties of the resulting composite channel filler material 200. For example, one or more of the additives can be utilized to lower the coefficient of thermal expansion (CTE) of the composite channel filler material 200.

In another example, one or more of the additives can be utilized to improve the elastic modulus of the composite channel filler material 200. In yet another example, one or more of the additives can be utilized to improve the tensile strength of the composite channel filler material 200. In still yet another example, one or more of the additives can be utilized to maintain a proper flow viscosity for the manufacturability of a structure in conjunction with which the composite channel filler 200 is to be used.

In one practical embodiment, the filler material 200 can be produced by mechanically mixing appropriate amounts of the first and second groups of fibers 220 and 230, and optionally, the nanoparticles 251 and toughening agents, in the liquid resin matrix to produce a mixture that can then be "staged," i.e., partially cured, e.g., by heating, to the desired viscosity, as discussed above, for application to the channel 32 between the structural members 12 and 14, as described above in connection with, e.g., FIG. 2B. As discussed in more detail below, it is desirable that the filler material 200 be thick enough to prevent it from running when it is deposited into the channel 32, and thin enough to enable it to be fully compacted into the channel 32 such that its upper surface is generally flush, or coplanar with, the upper surfaces of the respective horizontal flanges 20 and 22 of the structural members 12 and 14 after it is compacted.

The conventional fabrication procedure can involve the application of the channel filler material 200 by hand, which can lead to less than desirable results.

In accordance with the present disclosure, the conventional fabrication process can be replaced by a system that includes an "end-effector," operating in conjunction with a robot mounted on a carriage that travels adjacent to a composite structure, such as an aircraft stringer, which has an elongated channel that is to be filled with a composite filler material. Other movement systems instead of the carriage and robot and application systems other than an end-effector on a robot are also envisioned for use in this type of system. The system deposits into the channel a void-free bead 24 of the filler material 200 in which longer reinforcing fibers are oriented longitudinally (e.g., generally parallel to the long direction of the channel), shorter fibers are oriented randomly, and the bead 24 has a cross-sectional profile that can be varied instantaneously to precisely match that of a channel which has a cross-sectional profile that varies with its length.

FIGS. 3-12D are various views of an example embodiment of such an end-effector 100 in accordance with the present disclosure. As illustrated in, e.g., FIGS. 10 and 11, the example end-effector 100 comprises an elongated cylindrical barrel 102 having a helical extrusion screw 104 rotatably disposed therein. A hopper 106A or 106B (see FIGS. 3-10) has a lower end disposed in fluid communication, via an aft aperture 107 of the barrel 102, and is configured to hold a composite filler material 200, e.g., of the type discussed above, in an uncured or partially cured state, i.e., having a thick liquid or paste-like consistency, and to feed it into the barrel 102 at a controlled rate.

Figure 12A:
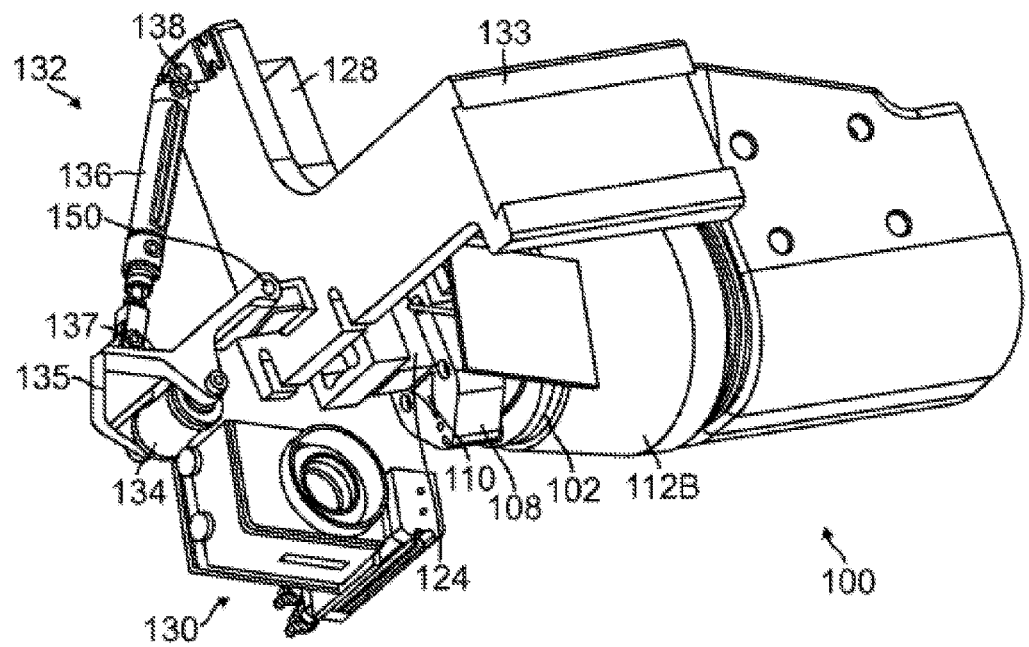
FIG. 12A is a partial front and left side perspective view of the end-effector, showing a housing, extrusion die, aperture gating assembly, support bracket, machine vision system and roller assembly thereof.
Figure 12B:
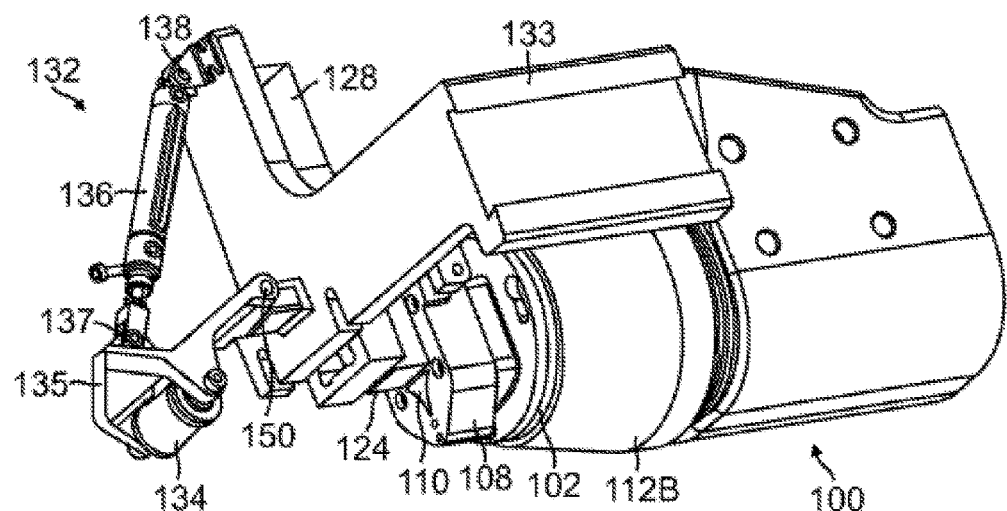
FIG. 12B is a partial perspective view of the end-effector similar to FIG. 12A, in which the machine vision system has been omitted for purposes of visualization.
Figure 12C:
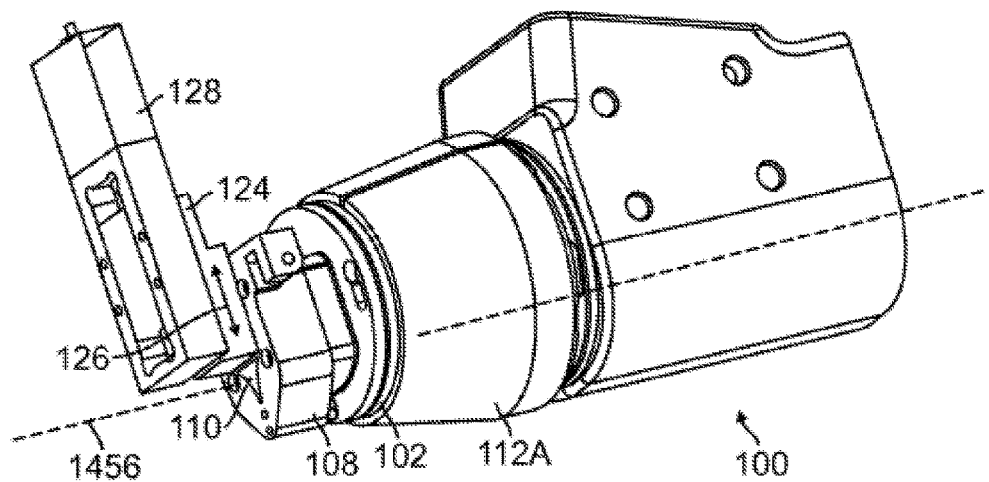
FIG. 12C is a partial perspective view of the end-effector similar to FIG. 12B, in which the roller assembly, and support bracket have been omitted for purposes of visualization.
Figure 12D:
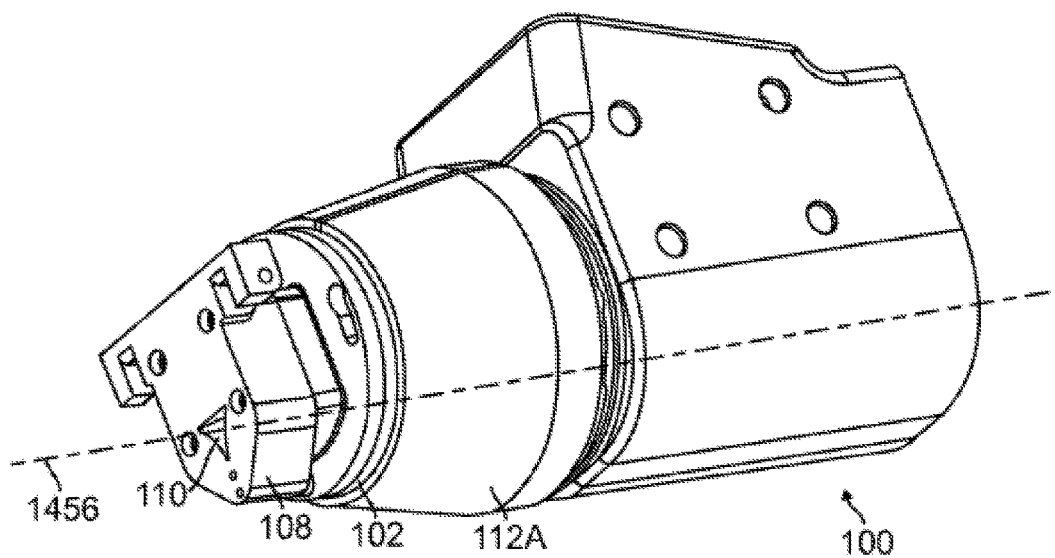
FIG. 12D is a partial perspective view of the end-effector similar to FIG. 12C, in which the gating assembly has been omitted for purposes of visualization.

As illustrated in, e.g., FIGS. 12C and 12D, a die 108 containing an extrusion aperture 110 is disposed in a sealed engagement with a front end of the barrel 102. In the particular example embodiment illustrated in FIGS. 12C and 12D, the aperture 110 has a generally V-shaped cross-section, so as to produce a bead 24 of a filler material 200 corresponding to a V-shaped channel, such as that described above in connection with FIG. 2A, that is to be filled with the filler material 200. However, as those of some skill will understand, the extrusion aperture 110 can have any of a number of other cross-sectional profiles, depending on the cross-sectional profile of the channel to be filled, such that the cross-sectional profile of the bead produced by the aperture 110 during operation will closely match that of the channel that is to be filled with the bead. It is also possible to have an aperture that could have a variable and/or controllable cross-section and possibly a gate to shut off the flow.

As those of some skill will also appreciate, the combination of a helical screw rotatably disposed within a cylindrical barrel defines an ancient pumping device sometimes referred to as an "Archimedes screw." It is believed that this type of pumping device is preferred over other types in this particular application for the following reasons. As discussed above in connection with FIG. 2E, in one embodiment, the filler material 200 can comprise a matrix of a thermoplastic or a thermosetting resin containing a first group of fibers having a first length, and a second group of fibers having a second length that is substantially shorter than the first length. Moreover, for the structural reasons discussed above, it is desirable that the longer fibers be aligned substantially longitudinally within the bead 24 of extruded filler material 200, whereas, the second group of fibers be aligned in substantially random directions therein.

It has been discovered that this desirable orientation of the reinforcing fibers can be obtained inherently by the close rotation of the crest of the thread of the screw 104 relative to the interior wall surface of the barrel 102, which achieves a longitudinal "wiping" or "combing" effect with regard to the longer fibers, whereas, the shorter fibers tend to remain relatively unaffected thereby, and instead, to be mixed in random directions by the rotation of the screw 104. Additionally, the rotation of the screw 104 within the barrel 102 tends to push air bubbles and voids entrained within the filler material 200 rearwardly within the barrel 102, while pushing the fluid filler material 200 forwardly in the barrel 102, thereby serving to separate the voids and air bubbles from the filler material 200 as it is pushed toward the front end of the barrel 102. This process helps with de-gassing the mixture, and a vacuum system of the type discussed below can also help with gas removal. This is in contrast to the operation of, e.g., a positive displacement pump, e.g., a piston pump, which isolates the liquid or solid filler material 200, together with any entrained bubbles or voids, ahead of the front face of the piston as it pushes the mixture forward in a "cylinder," e.g., the barrel 102.

In the embodiment illustrated in the figures, the example end-effector 100 is shown as having two hoppers, i.e., 106A, a simple elongated tube for containing the filler material 200 and feeding it into the barrel 102 by the force of gravity, and 106B, a "powered" hopper, discussed in more detail below, that contains a motor-driven screw 118, and which can operate, in the case of more viscous filler materials 200, in conjunction with a vacuum and a screw 118 to "force-feed" the barrel 102 with the filler material 200. However, it should be understood that only one of the alternative hopper configurations 106A or 106B is used at a time with the end-effector 100 during its operation, depending on the particular application at hand.

Figure 11:
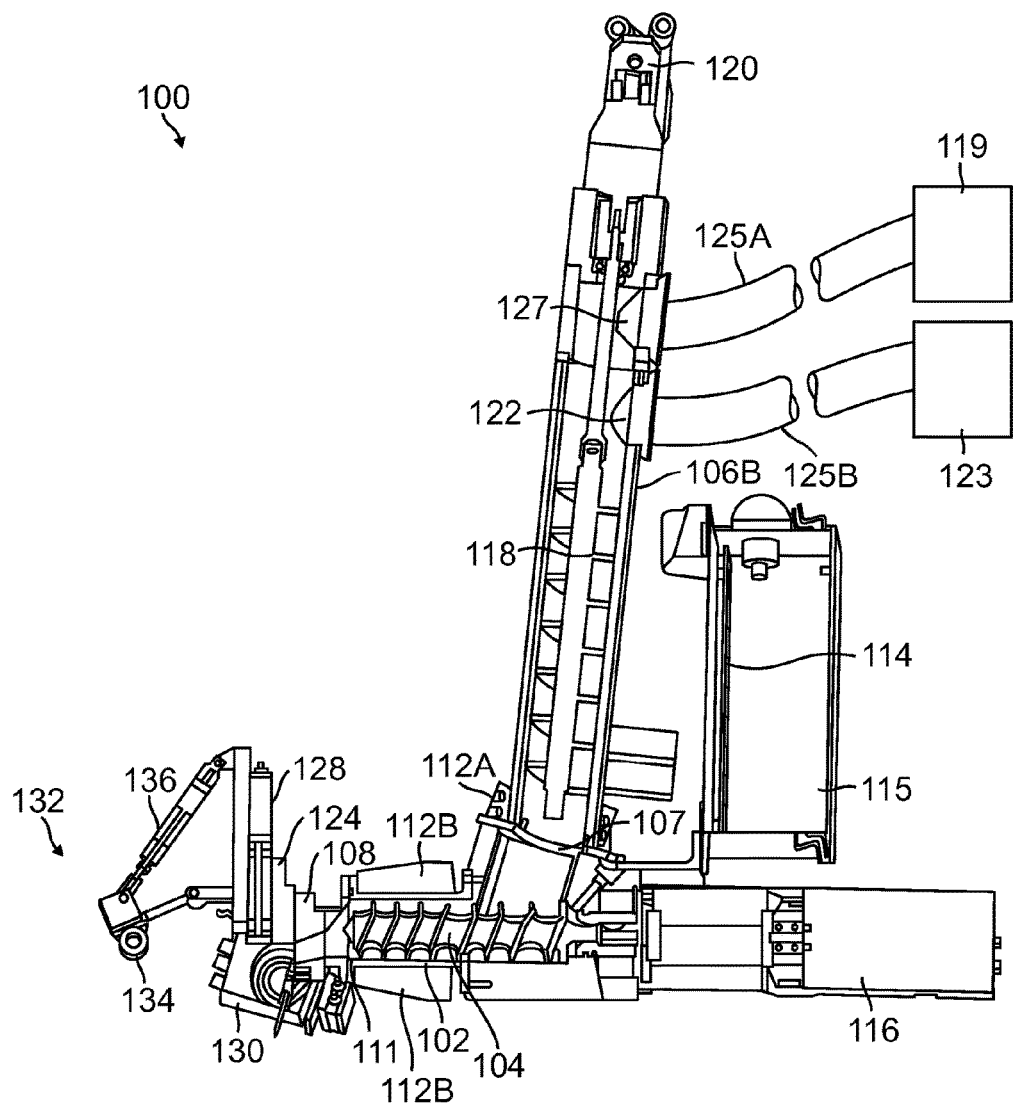
FIG. 11 is a left side inboard profile of the end-effector.

As illustrated in, e.g., FIG. 11 and discussed below in connection with the feedback loop and control system 1500 of FIG. 15, the example end effector 100 can include a pair of heaters 112A and 112B. The heaters 112A and 112B can be configured with a suitable controller 1502, in the form of a pair of closed loop control circuits 1504 and 1506 (see FIG. 15) disposed on a common controller printed circuit board (PCB) 114, that can be located within a common controller housing 115, to controllably heat the filler material 200 (e.g., shown in FIG. 2E) when disposed in the hopper 106A or 106B and the barrel 102, e.g., in two steps or stages. In the particular example embodiment illustrated, the first heater 112A comprises a heat jacket that surrounds the lower end of the hopper 106A or 106B, so as to heat the filler material 200 when it is disposed in the hopper 106A or 106B, and the second heater 112B comprises a clam-shell-like heater jacket that surrounds the barrel 102, so as to heat the filler material 200 when it is disposed therein.

Figure 10:
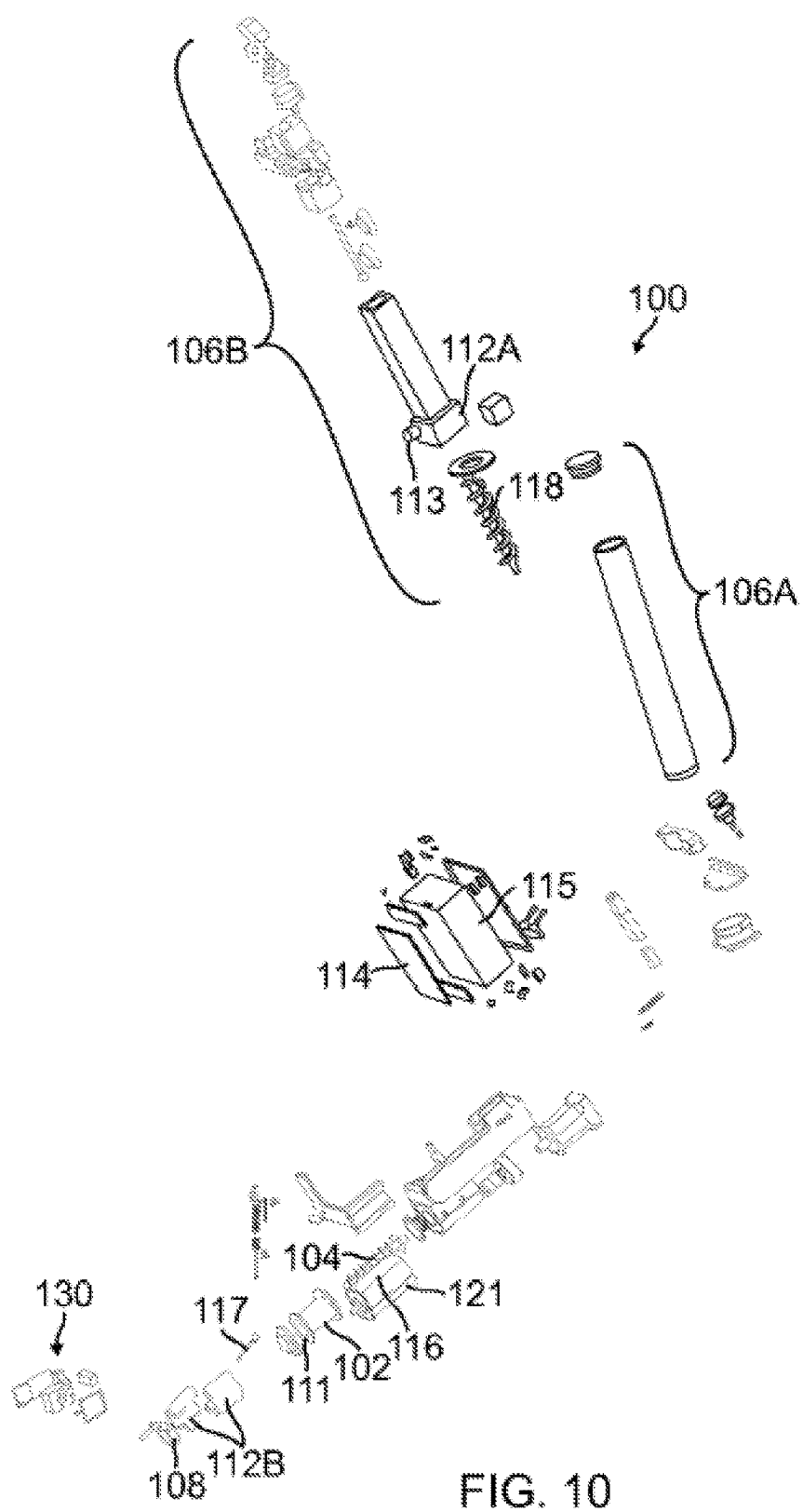
FIG. 10 is an exploded left side perspective view of the end-effector.

As illustrated in, e.g., FIG. 10, in one advantageous embodiment, the first heater 112A can have a first temperature sensor 113 associated with it that is configured to detect the temperature of the filler material 200 when disposed in the hopper 106A or 106B, and the second heater 112B can have a second temperature sensor 117 associated with it that is configured to detect the temperature of the filler material 200 when it is disposed in the barrel 102. An associated temperature controller 1502, e.g., one located on the common controller printed circuit board (PCB) 114, can be disposed in communication with the first and second temperature sensors 113 and 117 via the feedback loops 1504 and 1506 and configured to selectively operate the first and second heaters 112A and 112B in response to the first and second temperatures. For example, in one embodiment, the first heater 112A can be configured to heat the filler material 200 disposed in the hopper 106A or 106B to approximately 140 degrees Fahrenheit, and the second heater 112B can configured to further heat the filler material 200 (e.g., shown in FIG. 2E) when disposed in the barrel 104 to approximately 190 degrees Fahrenheit.

Figure 4:
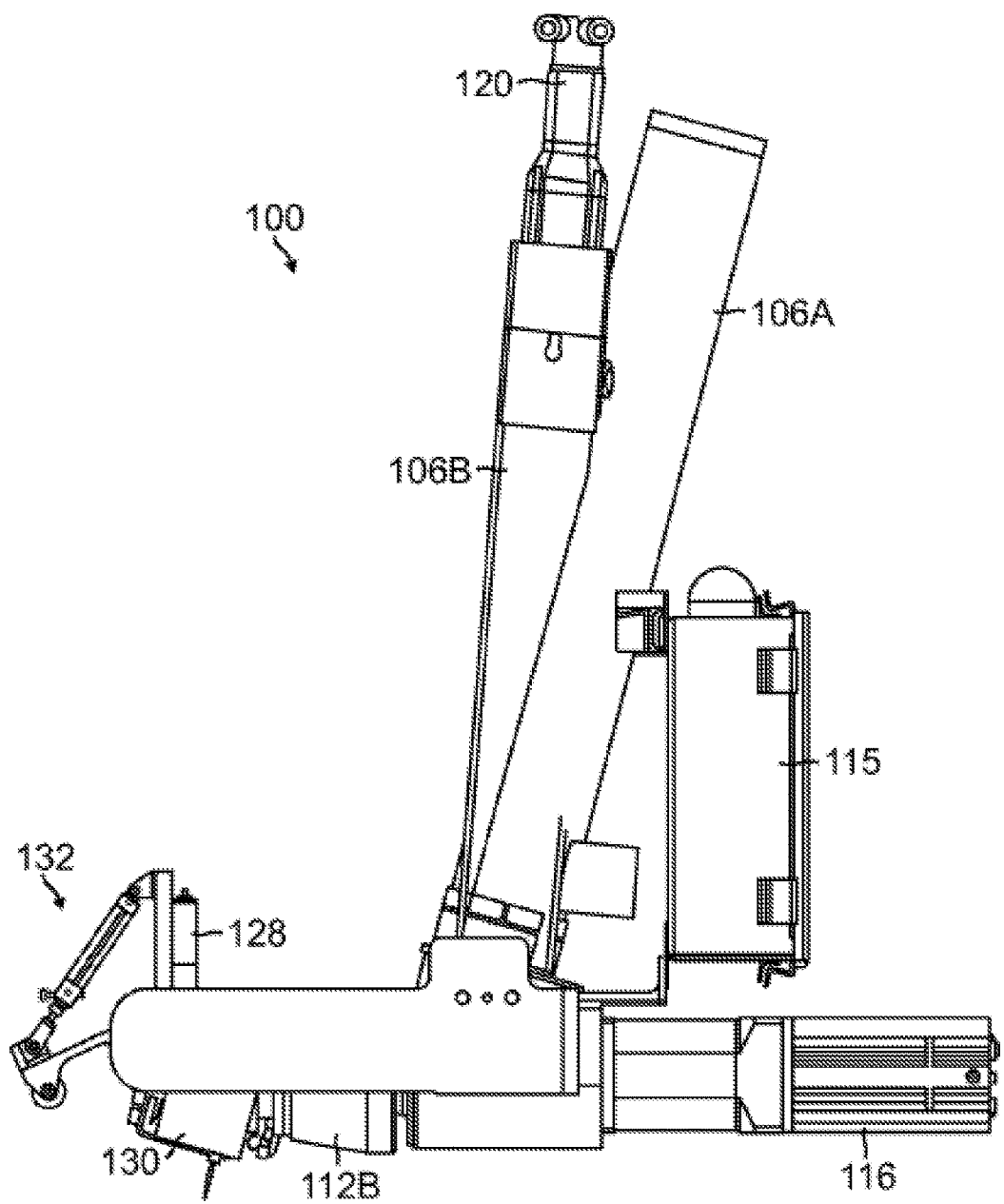
FIG. 4 is a left side elevation view of the end-effector.
Figure 5:
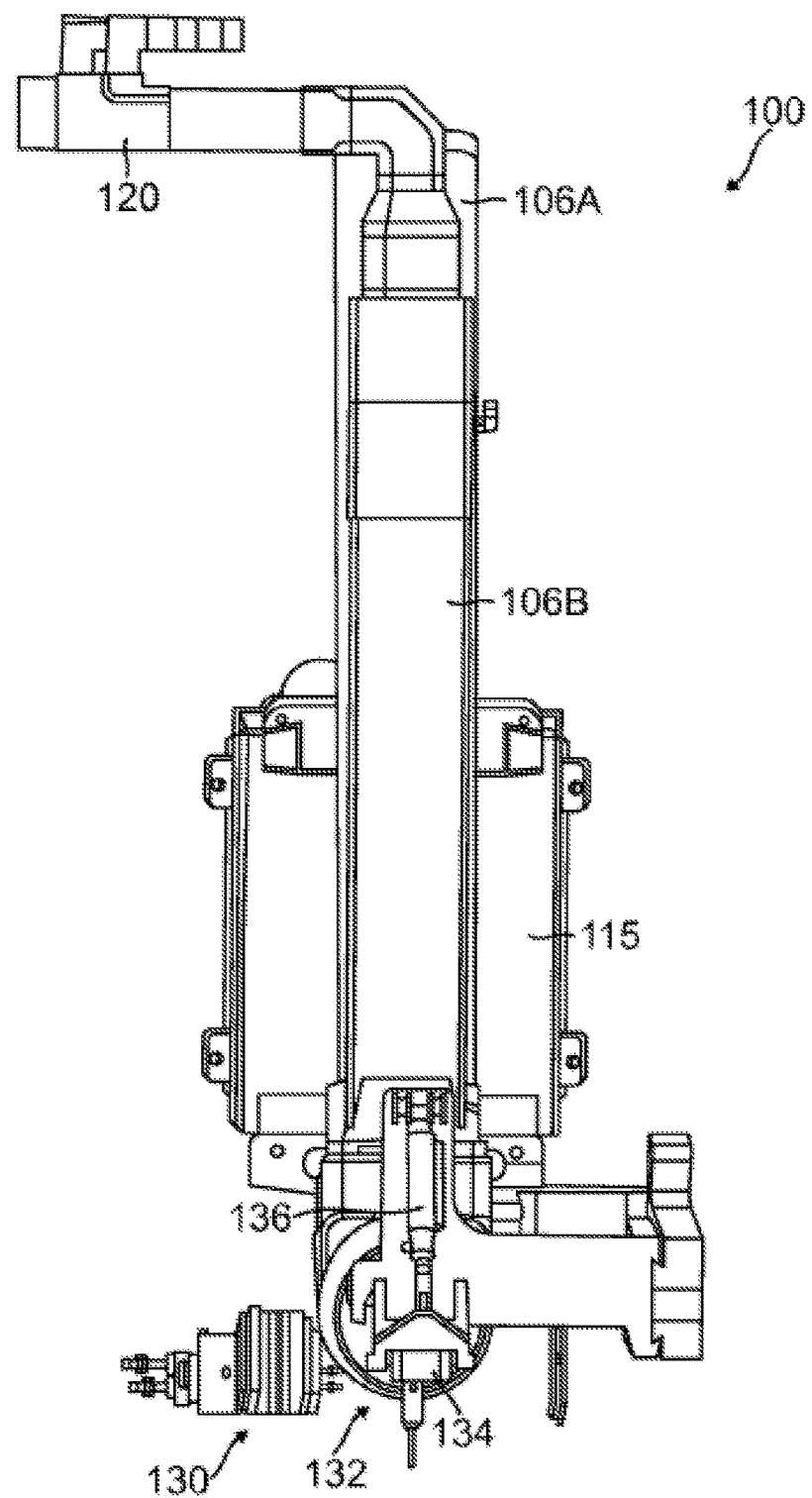
FIG. 5 is a front end elevation view of the end-effector.
Figure 6:
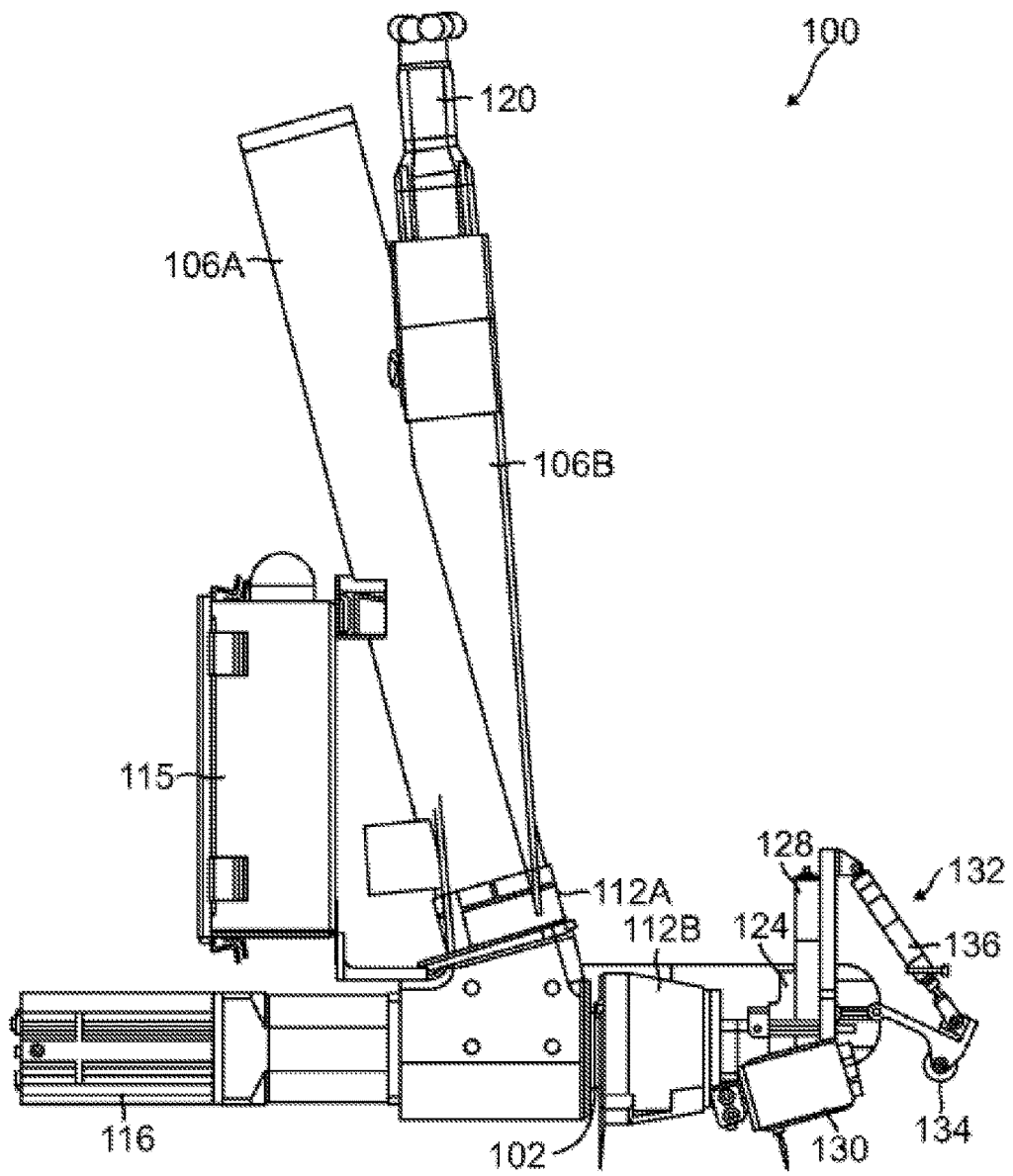
FIG. 6 is a right side elevation view of the end-effector.
Figure 7:
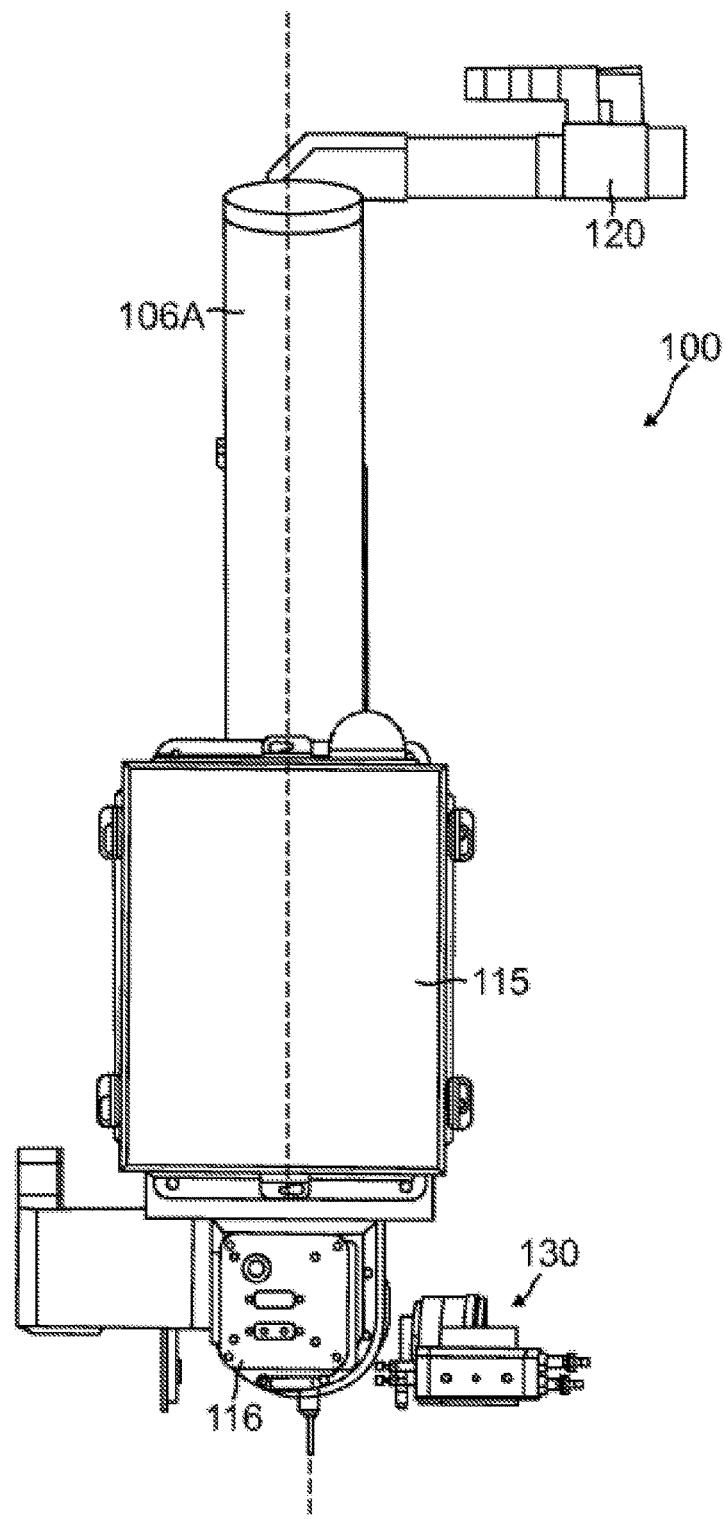
FIG. 7 is a rear end elevation view of the end-effector.
Figure 8:
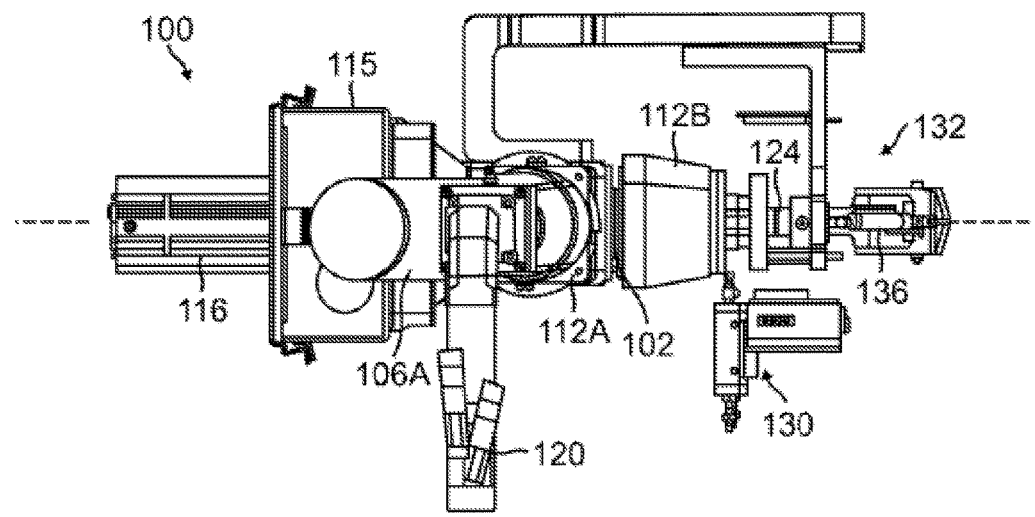
FIG. 8 is a top plan view of the end-effector.
Figure 9:
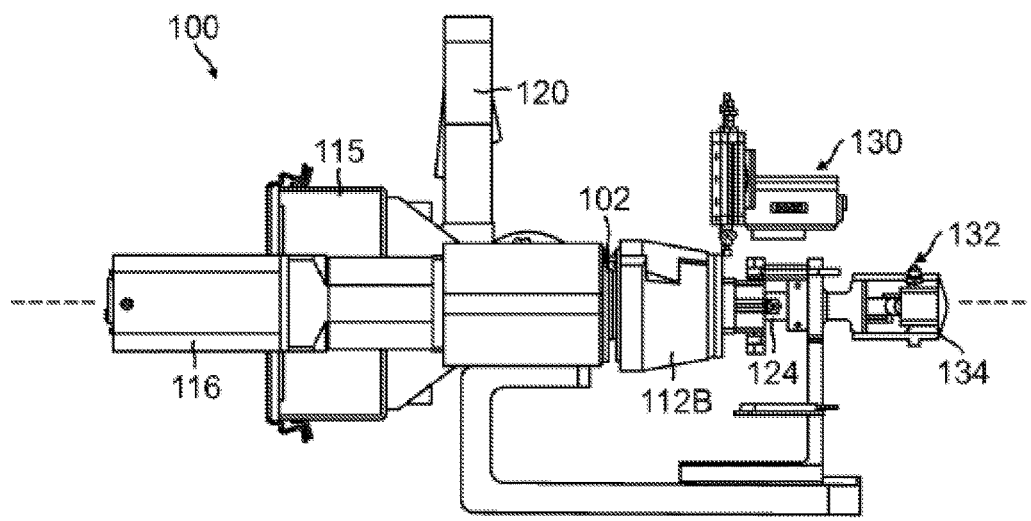
FIG. 9 is a bottom plan view of the end-effector.
Figure 14:
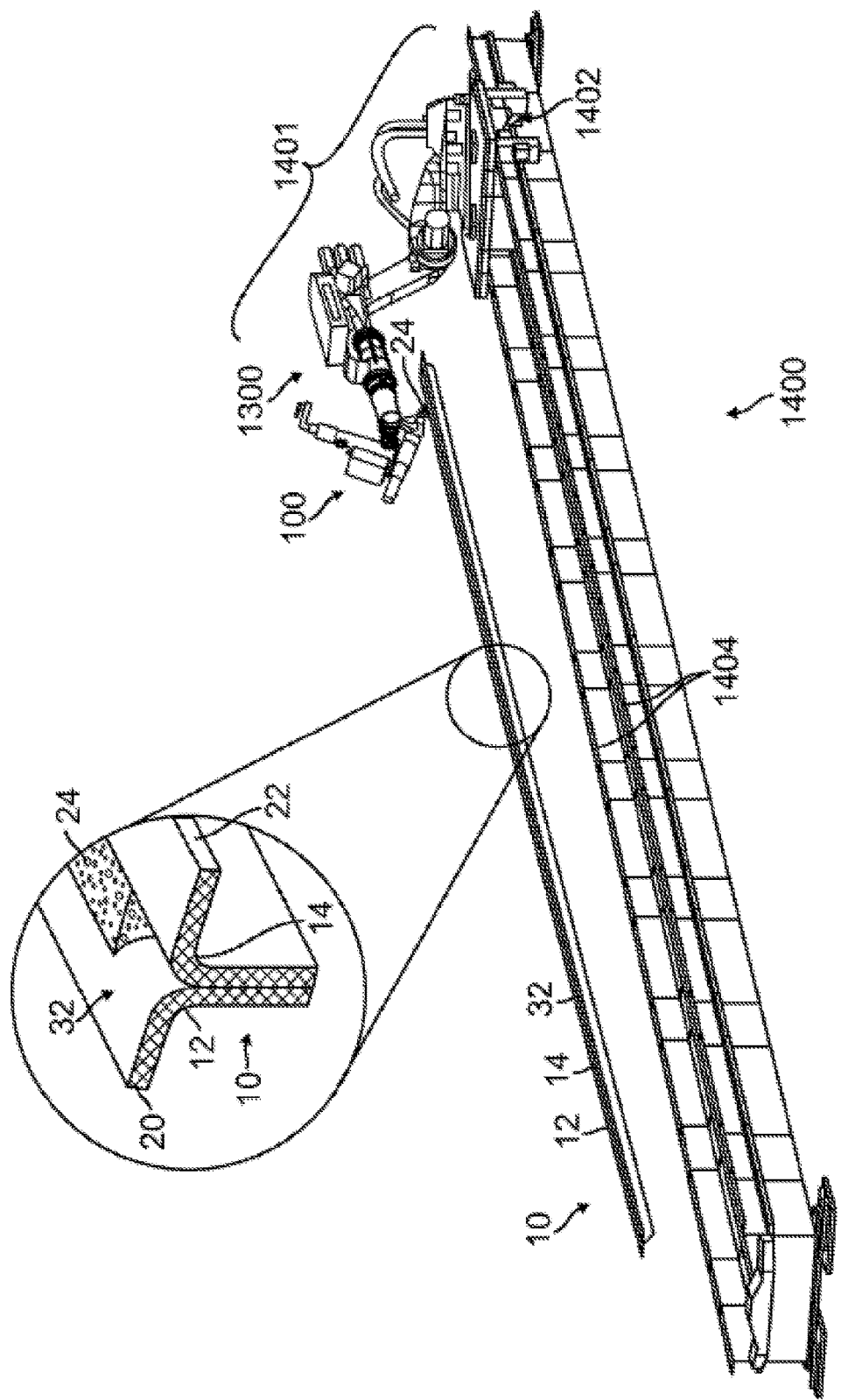
FIG. 14 is a perspective view of a drive system comprising a carriage configured to move longitudinally along rails disposed adjacent to a channel, showing the robot and end-effector of FIG. 13 disposed thereon.

As illustrated in, e.g., FIGS. 4 and 5, the end-effector 100 includes a motor 116, e.g., an electric motor, disposed at a rear end of the barrel 102 and configured to rotate the screw 104 to pump or compress the filler material 200 forwardly therein so as to express or extrude a bead 24 of the filler material 200, such as illustrated in FIGS. 2B and 14, through the aperture 110 at a controllable temperature and rate. In one advantageous embodiment, the motor 116 can include an integral speed sensor 121, e.g., an encoder, configured to detect the rotational speed of the motor 116, and an associated controller 1502, e.g., one disposed on the common controller PCB 114, can be disposed in communication with the speed sensor 121 and a flow sensor 111 (see FIG. 11)

located, e.g., in the barrel 102, through a feedback loop 1508. The associated controller 1502 can be configured to adjust the speed of the motor 116 in response to the speed sensor 121 and the flow sensor 111 so as to precisely control the rate of rotation of the screw 104, and hence, the rate of extrusion of the bead 24 of filler material 200 illustrated in FIGS. 2B and 14 when extruded from the aperture 110 illustrated in FIGS. 12A-12D.

As discussed above, in some embodiments, it might be desirable to provide a mechanism, i.e., other than gravity, for feeding the filler material 200 into the barrel 102 of the end-effector 100. As illustrated in, e.g., FIGS. 10 and 11, this can be effected by the provision of a "powered" hopper 106B, which incorporates a second helical screw 118 disposed in the hopper 106B and configured to agitate the filler material 200 and pump it into the barrel 102. As illustrated in, e.g., FIG. 11, in one possible embodiment, the feeder hopper 106B can be provided with a pair of ports, viz., a vacuum attachment port 127 and a filler material 200 inlet port 122. In this embodiment, a source of a vacuum 119 can be coupled, e.g., via a first hose 125A, to the vacuum port 127 of the hopper 106B, and a source 123 of the filler material 200 can be coupled, e.g., via a second hose 125B, to the filler inlet port 122 thereof. A vacuum can then be applied to the first port 127, both to evacuate gases being de-gassed from the composite as it is being compressed and heated, and voids and air bubbles from the filler material 200, and to draw it into the hopper 106B through the second port 122, where it is collected by the thread of the second screw 118 and thereby pumped down into the barrel 102 of the end-effector 100. For this purpose, a second motor 120 is provided at the upper end of the powered hopper 106B and coupled, e.g., through a right-angled drive, to rotate the second screw 118 at a programmably controllable rate.

As discussed above, in the particular embodiment illustrated in the figures, the aperture 110 has a cross-section configured to produce a bead 24 of filler material 200 corresponding in size and shape to a channel 32, such as that described above in connection with, e.g., FIGS. 2A and 2B, that is to be filled with the filler material 200. However, it is possible that, in some embodiments, the channel 32 could have a cross-sectional profile that varies as a function of its length, in which case, it becomes desirable to provide a mechanism for varying the cross-sectional profile of the bead 24 instantaneously so as to precisely match that of the channel 32 into which the bead 24 is being deposited. As illustrated in, e.g., FIGS. 12C and 12D, in one possible embodiment, this can be effected by the provision of a "gate" 124 that is configured to selectively occlude the aperture 110 and thereby controllably adjust the cross-sectional profile of the bead 24 of filler material 200 as it is being deposited into the channel 32. In the example embodiment illustrated, the gate 124 is selectably slid across the front face of the die 108 in the direction of the double-headed arrow 126 shown in FIG. 12C, such that it occludes all or a desired portion of the aperture 110.

In one advantageous embodiment, this can be effected by an actuator 128, e.g., an electric or a pneumatic actuator 128, associated with the gate 124. As illustrated in, e.g., FIGS. 10-12A, in one advantageous embodiment, the gate actuator 128 can be controlled by a machine vision system 130 of the end-effector 100 through a feedback loop 1510 (see FIG. 15) that is configured to compare the applied profile of the bead 24 with a desired profile, and the controller circuit 1502 disposed, e.g., on the common controller PCB 114, that is configured to selectively operate the actuator 128 so as to move the gate 124 and thereby conform the applied profile of the bead 24 with the desired profile.

As discussed in more detail below, the machine vision system 130 can also be used to align the aperture 110 of the end-effector 100 with a channel 32 that is to be filled with the filler material 200, and to maintain or vary that alignment as the end-effector 100 is moved along the channel 32, while the bead 24 of filler material 200 is being deposited into the channel 32 by gravity.

Figure 12E:
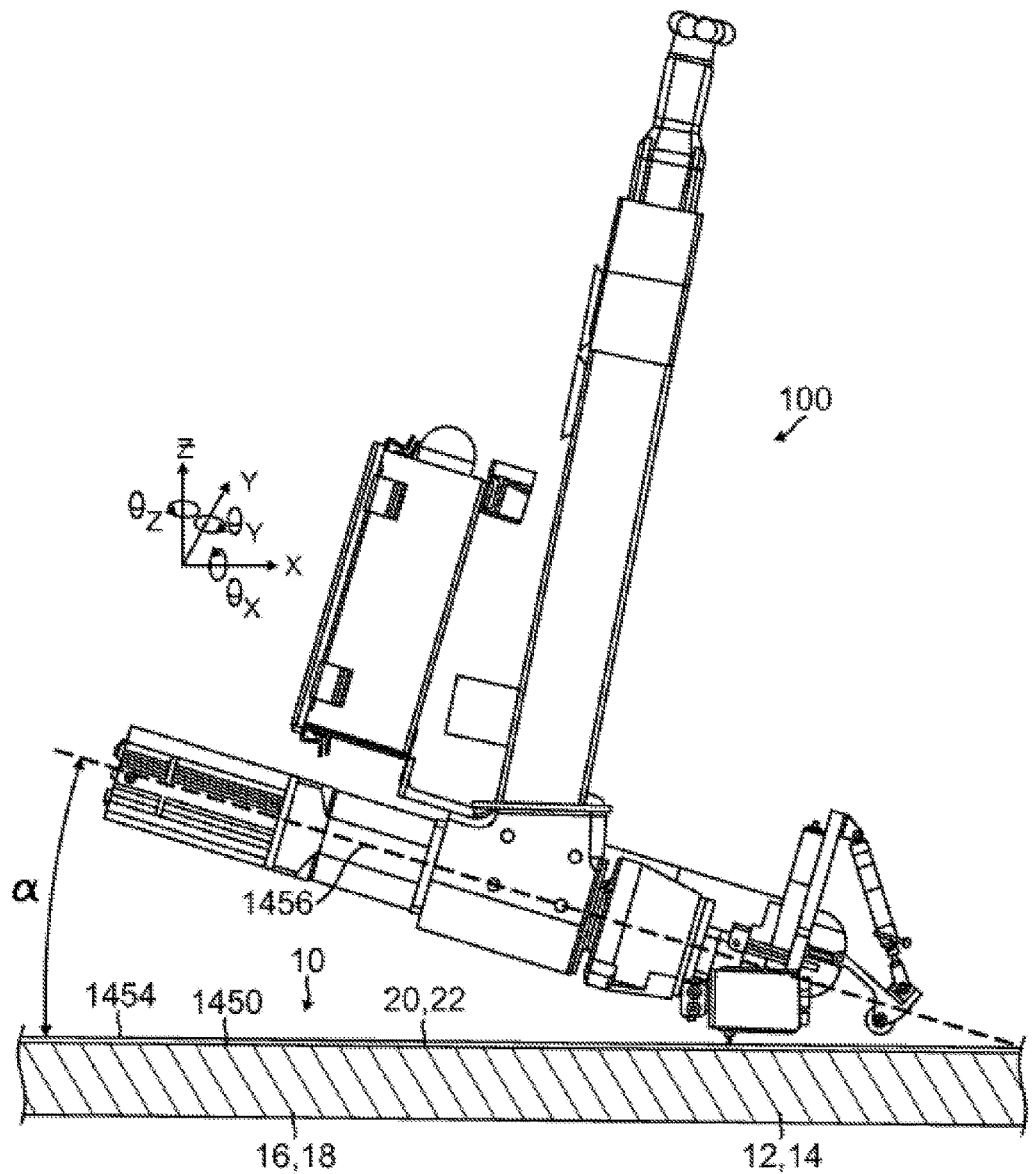
FIG. 12E is a left side elevation view of the example end-effector, shown disposed above composite structural elements of the type illustrated in FIGS. 1A-2D.

FIG. 12E is a left side elevation view of the example end-effector 100, shown disposed above a pair of abutting, L-shaped structural elements 12 and 14 of the type discussed above in connection with FIGS. 1A-2D. As discussed above in connection with FIGS. 2A and 2B, when the vertical legs 16 and 18 of the two structures 12 and 14 are clamped together between plates 30, 38 of a fixture (omitted in FIG. 12E for purposes of illustration), the upper surfaces of the horizontal flanges 20, 22 of the two structural elements 12 and 14 are disposed substantially coplanar with each other, and thus, define a common plane 1450, which, in some embodiments, can be oriented generally horizontally. Additionally, as illustrated in FIGS. 2A and 2B, in the particular example embodiment illustrated, the inner surfaces of the two vertical legs 16 and 18 of the two structural elements 12 and 14 are disposed substantially coplanar with each other and define a second plane 1452 shown in FIGS. 2A, 2B, and 12G that is generally orthogonal, or perpendicular, to the first plane 1450. As illustrated in FIGS. 2A, 2B and 12E, the intersection of the two planes 1450 and 1452 define a line 1454 that is disposed at the top of and centered with respect to the channel 32. FIG. 12G is a perspective view illustrating the structural members 12 and 14, the planes 1450 and 1452, and the line 1454.

As illustrated in FIGS. 12C and 12D, a line 1456 can be constructed that passes through the centroid of the aperture 110 and is disposed parallel to its inner sidewalls. In some possible embodiments, one or more of the barrel 102, the screw 104 and the motor 116 can be disposed coaxially with this line 1456, although this need not necessarily be the case. As illustrated in FIG. 12E, in some embodiments, the end-effector 100 can be oriented at an angle with respect to the plane 1450 such that the line 1456 is disposed at a first alignment (angle a, see FIG. 12E) with respect to the line 1454 defined by the two planes 1450 and 1452.

Figure 12F:
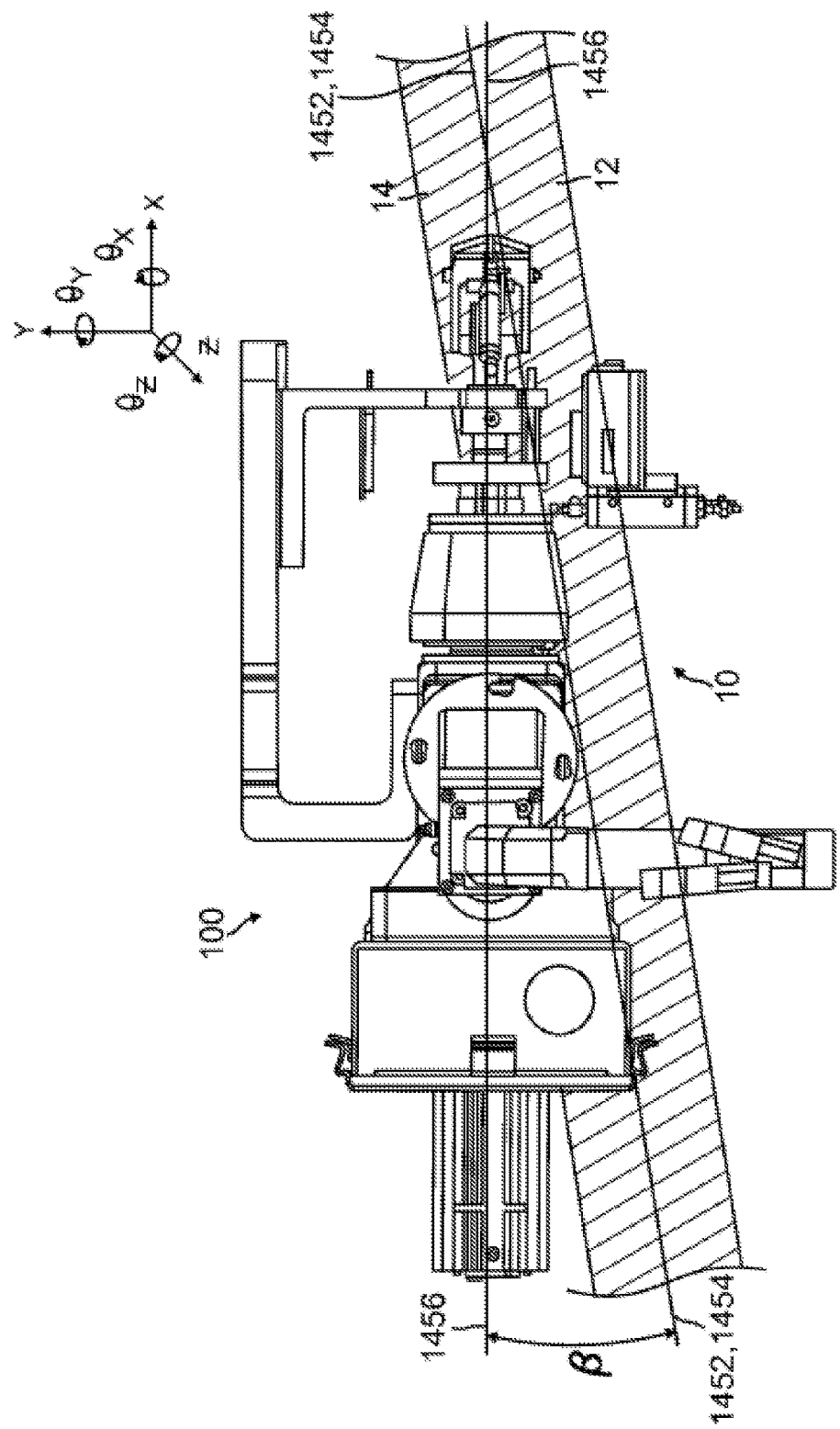
FIG. 12F is a top plan view of the end-effector of FIG. 12E and the underlying composite structural elements.
Figure 12G:
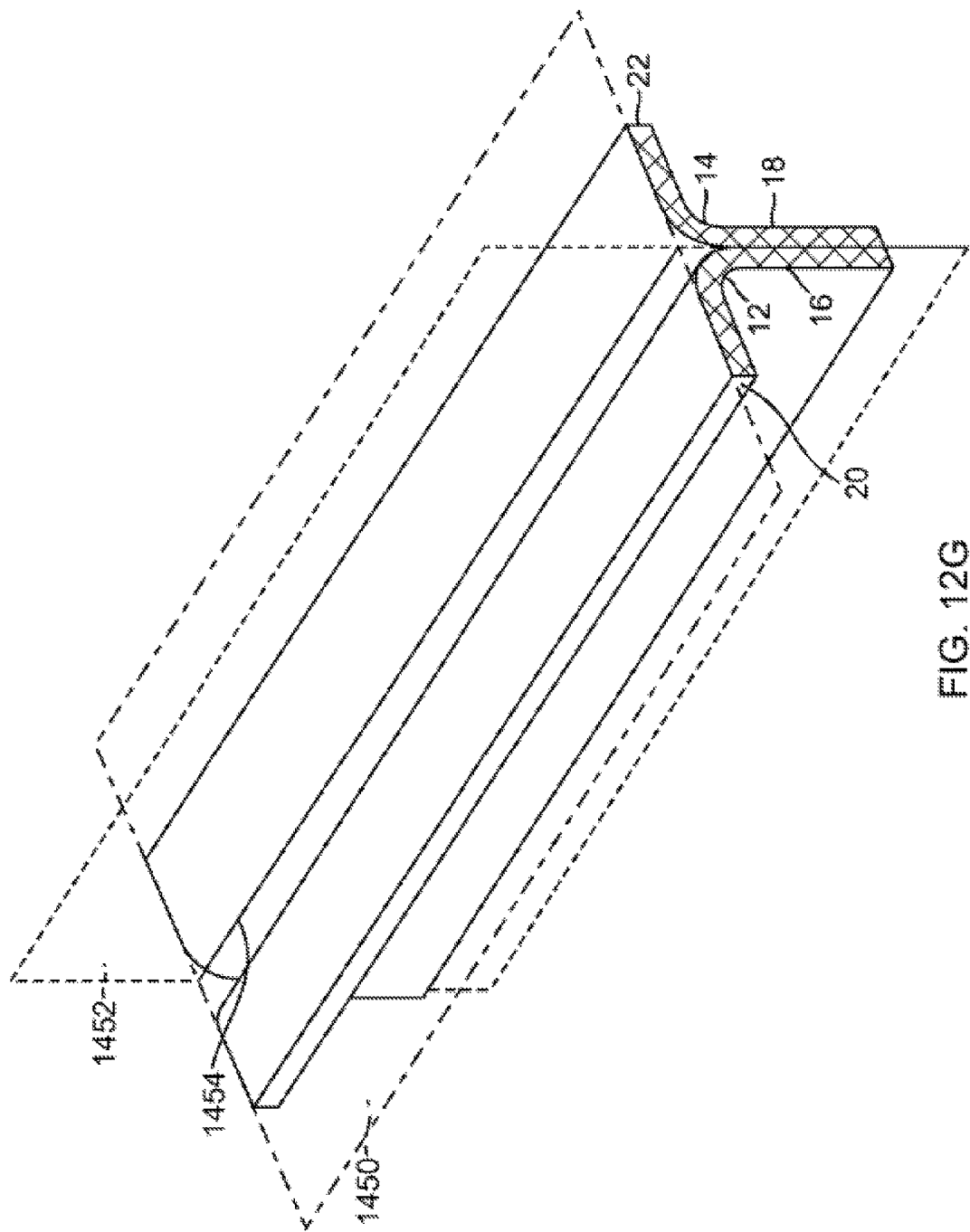
FIG. 12G is a perspective view illustrating the structural members of FIGS. 1A-2D, a pair of planes defined by those structures, and a line defined by the planes.

FIG. 12F is a top plan view of the example end-effector 100 of FIG. 12E, shown disposed above the pair of abutting structural elements 12 and 14. As illustrated in FIG. 12F, the line 1456 through the centroid of the aperture 110 is disposed at a second alignment angle with respect to the line 1454 defined by the two planes 1450 and 1452, and hence, with respect to the channel 32. As discussed in more detail below, the end-effector 100 can be mounted at the end of an arm of a robot 1300 that is capable of moving the end-effector 100 in six degrees of movement, i.e., ±X, ±Y, ±Z, ±$\theta_x$, ±$\theta_y$, and ±$\theta_z$, where X, Y, and Z are the axes of a conventional orthogonal Cartesian coordinate system, as illustrated in FIGS. 12E and 12F.

If, for example, the X axis is arbitrarily chosen to coincide with the line 1454, then translational movement of the end-effector 100 in the ±X direction corresponds to movement along the line 1454, and hence, along the channel 32. Similarly, translational movement of the end-effector 100 in the ±Y direction corresponds to movement perpendicular to the line 1452, and hence, transverse to the channel 32. Translational movement of the end-effector 100 in the ±Z direction corresponds to vertical movement of the end-effector 100 relative to the channel 32, and so on. In this manner, the first and second alignment angles α and β respectively illustrated in FIGS. 12E and 12F can be varied by rotating the end-effector 100 in the ±θ$_y$ and ±θ$_z$ directions, respectively, so as to take on any real values. However, as a practical matter, α is typically maintained at a constant value of between about 0 to 90 degrees, whereas, in most embodiments, it is desirable to maintain the second alignment angle at substantially 0 degrees.

The foregoing positional control of the end-effector 100 in six degrees of movement, i.e., ±X, ±Y, ±Z, ±θ$_x$, ±θ$_y$, and ±θ$_z$, can be effected automatically by a feedback control loop 1510 (see FIG. 15) comprising the controller 1502, the machine vision system 130, the robot 1300, and optionally, a carriage 1402 moving along a pair of tracks 1404, as illustrated in FIG. 14. Specifically, the machine vision system 130 measures the ±X, ±Y, ±Z, ±θ$_x$, ±θ$_y$, and ±θ$_z$, position of the end-effector 100, or more particularly, a bead 24 of the filler material 200 leaving the aperture 110 along the line 1456, relative to the position of the channel 32, converts the measurement to an electrical signal provided over feedback loop 1510 to the controller 1502.

Using the measurement signal from the machine vision system 130, the controller 1502 determines a control signal represented in FIG. 15 by the portion of feedback loop 1510 between controller 1502 and robot 1300 (e.g., a "difference" signal corresponding to the difference between the position of the bead 24 of filler material 1200 leaving the aperture 110 and that of the channel 32 disposed immediately below the bead 24), and provides such control signal to the robot 1300 over feedback loop 1510 to drive the difference between the two positions to zero.

Additionally, in some embodiments, the machine vision system 130 can be used to adjust the position of a roller mechanism 132 used to compact the bead 24 of filler material 200 into the channel 32. Thus, as illustrated in, FIGS. 3-6, 8, 9, 11, 12A and 12B, the end-effector 100 can advantageously include a roller mechanism 132 that includes a roller 134 moveably coupled to, e.g., a support bracket 133 of the end-effector 100, and which is configured to compact the deposited bead 24 of filler material 200 into and flush with the upper surface of the target channel 32.

As illustrated in FIGS. 12A and 12B, the roller mechanism 132 can include a roller 134, a roller support bracket 135, and a first link or arm comprising an actuator 136, e.g., a pneumatic actuator, that has a first end coupled to the roller support bracket 135 through a first hinge 137, and an opposite second end coupled the support bracket 133 by a second hinge 138. The roller mechanism 132 can further include a second arm 139 having a first end rigidly coupled to the roller support bracket 135 and an opposite second end coupled to the support bracket 133 through a third hinge 150. Actuation of the actuator 136 causes the roller 134 to move up and down relative to the front end of the end-effector 100. The machine vision system 130 can thus be configured to operate as a sensor in conjunction with the controller 1502 to control the position of the end-effector 100 relative to the target channel 32, as described above, as well as to control the position of the roller 134 relative to the end-effector 100 via the actuator 136, such that the roller 134 compacts the bead 24 of extruded material into the target channel 32 after it has been deposited into the channel 32 by the end-effector 100, as illustrated in FIG. 14.

In the particular example embodiments illustrated herein, the aperture 110 is shaped like an inverted delta ("Δ"), except with inwardly radiused side walls to conform to corresponding radii in the corresponding side walls of the L-shaped structural members 12 and 14 shown in FIGS. 2A and 2B. As discussed above, the gate 124 acts like a sluice gate or a guillotine blade, in that it partially or completely blocks off or occludes the aperture 110, starting at the top and moving down toward the apex (at the bottom) of the aperture 110, thereby decreasing the functional cross-sectional area of the aperture 110. Since the filler material 200, like water, is relatively incompressible, as the cross-sectional area of the aperture 110, and hence, the cross-sectional area of the bead 24 of filler material 200, decrease, the rate at which the bead of filler material 200 leaves the aperture 110 will increase, all other things remaining the same. This can be compensated for by decreasing the rate at which the screw 104 is rotated within the barrel 102, thereby decreasing the rate at which the bead of filler material 200 is extruded through the aperture 110, or by increasing the rate at which the end-effector 100 is moved along the channel 32, thereby increasing the rate at which the channel 32 is filled with the bead 34, or both.

Figure 13:
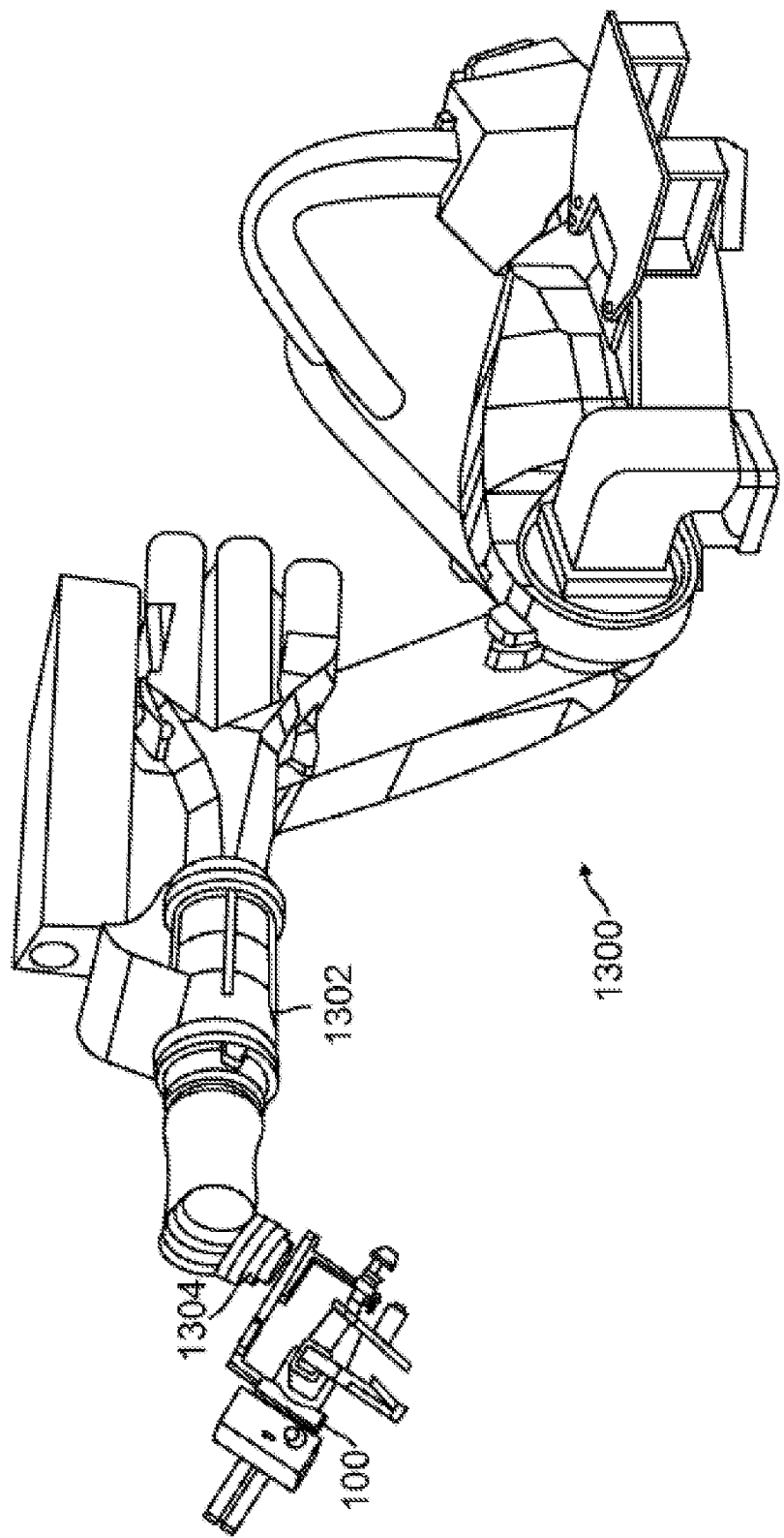
FIG. 13 is a perspective side elevation view of a robot having an arm with a distal end that is moveable by the robot with six degrees of freedom, showing the end-effector disposed at the distal end thereof.

FIGS. 13 and 14 illustrate an example system 1400 for automatically depositing a bead 24 of filler material 200 into an elongated channel 32 of a composite structure disposed adjacent to the system 1400, such as the composite aircraft structure 10 of FIGS. 1-2D described above, in which the extruded bead 24 has a cross-sectional profile that can be varied instantaneously to match that of the target channel 32.

As illustrated in FIG. 14, the example system 1400 includes a drive system 1401 comprising a carriage 1402 that is configured to move along rails 1404 disposed adjacent to the structure 10 and channel 32, and a robot 1300 disposed on the carriage 1402 for conjoint movement therewith. As discussed above in connection with FIGS. 12E and 12F and illustrated in FIG. 13, the robot 1300 can include an arm 1302 with a distal end 1304 that is controllably moveable by the robot 1300 with six degrees of freedom, i.e., ±X, ±Y, ±Z, ±θ$_x$, ±θ$_y$, and ±θ$_z$, relative to the channel 32. The example end-effector 100 described above can be mounted at the distal end 1304 of the arm 1302 such that the end-effector 100, like the distal end 1304 of the arm 1302, is likewise moveable by the robot 1300 in six degrees of freedom, i.e., ±X, ±Y, ±Z, ±θ$_x$, ±θ$_y$, and ±θ$_z$. Additionally, as discussed above in connection with FIGS. 12E and 12F, it may be recalled that, in some embodiments, movement of the end-effector 100 in the ±X direction can correspond to movement along the channel 32. As discussed above, while this ±X movement can be effected with the robot 1300 under the control of the controller 1502, the machine vision system 130, and, e.g., the feedback loop 1510 (see FIG. 15), in cases where the length of the channel 32 to be traversed by the end-effector 100 in depositing a bead 24 of the filler material 200 exceeds the "reach" of the robot 1300, i.e., the length of its arm 1302, then the ±X movement of the end-effector 100 along the channel 32 can be implemented by disposing the robot 1300 on the carriage 1402 and then effecting ±X movement ("±D(X)") of the end-effector 100 along the channel 32 by moving the carriage 1402 under the control of the controller 1502 and the machine vision system 130.

Figure 15:
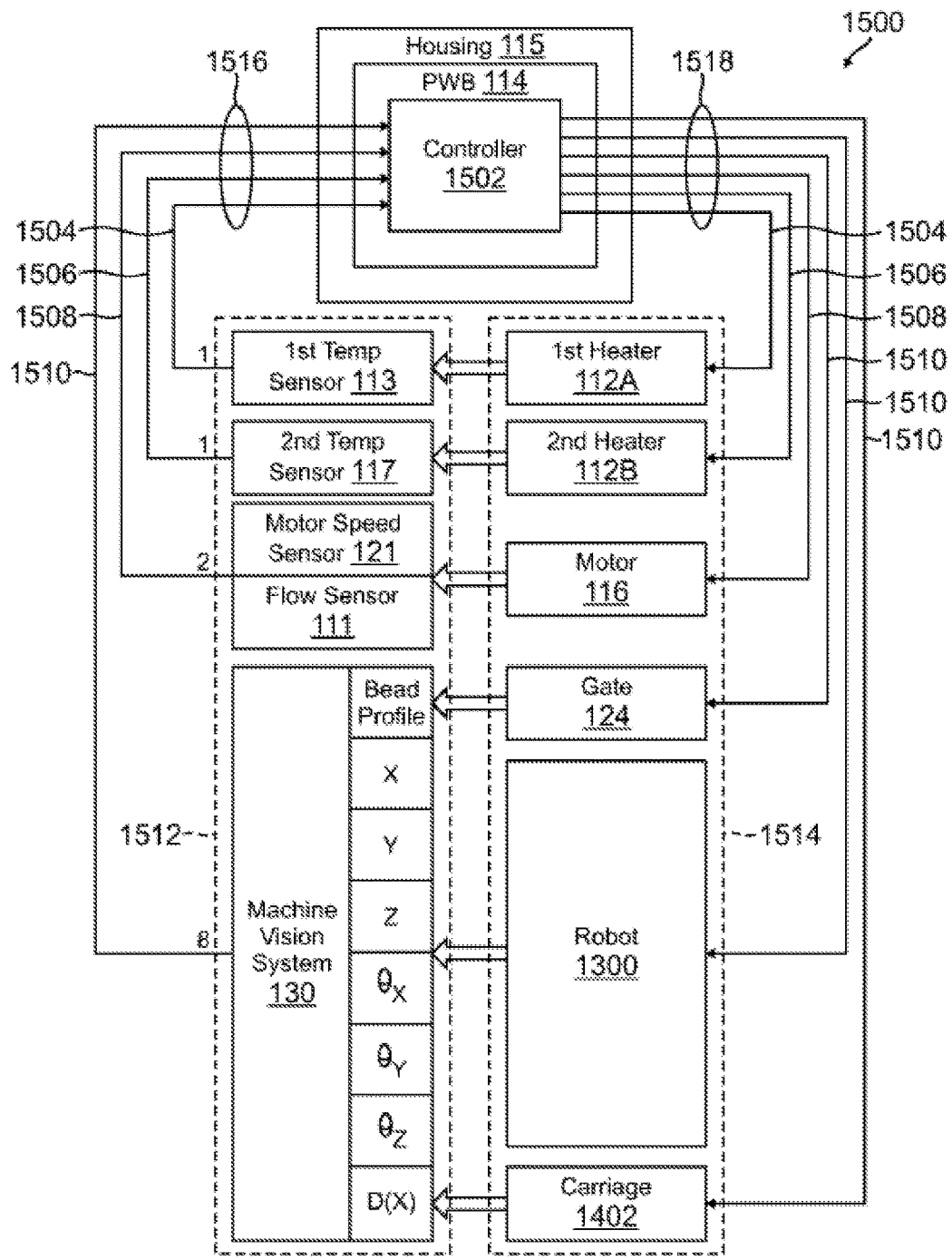
FIG. 15 is a functional block diagram of an examplary embodiment of a feedback and control system in accordance with the present disclosure.

FIG. 15 is a block diagram of an example embodiment of a feedback control system 1500 of a type contemplated for use in combination with the system 1400. As discussed above in connection with FIG. 11, in one embodiment, the control system 1500 can include a controller 1502 mounted on a common control PCB 114 disposed within a controller housing 115 of the end-effector 100, together with a plurality of closed loops 1504-1510, that serve to couple respective ones of a plurality of sensors 1512, such as the first temperature sensor 113, through the controller 1502, and to respective ones of the various elements 1514 that are controlled by the controller 1502 through associated ones of the feedback loops 1504-1510, such as the first and second heaters 112A and 112B, motor 116, gate 124, and so on. As a practical matter, the controller 1502 can comprise a plurality of individual electrical circuits and associated feedback control loops respectively dedicated to each sensor and associated controlled element. As discussed above, a single sensor, such as the machine vision system 130, can be used to sense more than one parameter, such as the position, i.e., ±X, ±Y, ±Z, ±θ$_x$, ±θ$_y$, and ±θ$_z$, including the alignment angles α and β of the end-effector 100 relative to the channel 32, and cross-sectional profile of the bead 24, and accordingly, can be associated with a corresponding plurality of the controlled elements 1514 through one or more of the associated feedback loops 1504-1510.

Similarly, one or more of the controlled elements 1514, such as the motor 116, can have more than one of the sensors 1512 associated with its automatic control. Sensor signals from respective ones of the sensors 1512 can be conveyed to the controller 1502 via individual conductive wires disposed in, e.g., a sensor harness 1516, and control signals can be conveyed from the controller 1502 to respective ones of the controlled elements 1514 via individual wires disposed in, e.g., a controller harness 1518. In one advantageous embodiment, the sensor harness 1516 and the control harness 1518 can be combined into a single harness. Other known techniques, including wireless techniques, can also be used in addition to or instead of the individual wires of the harnesses 1520 and 1522 to convey the signals between the sensors 1512, the controller 1502 and the controlled elements 1514.

Figure 16:
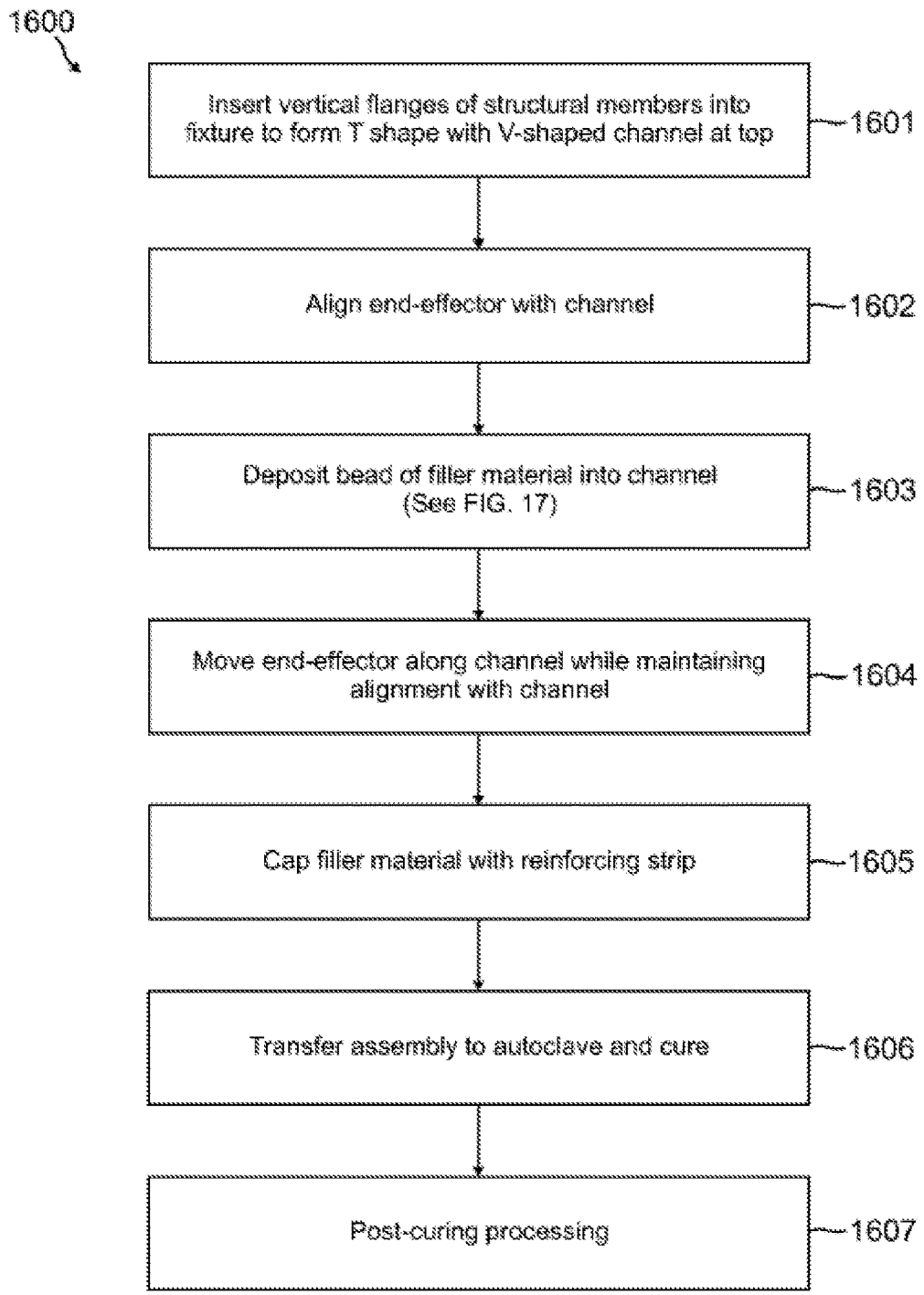
FIG. 16 is a flow diagram of an examplary method for making the composite structure of FIGS. 1A and 1B using an example end-effector of the present disclosure.

FIG. 16 is a flow diagram of an example method 1600 for making the composite structure 10 of FIGS. 1-2D, and FIG. 17 is a flow diagram of an example method 1700 for using the above system 1400 to make the composite structure 100. As illustrated in FIG. 1, the example method 1600 can begin at step 1601 by clamping the vertical "legs" 16 and 18 of two L-shaped composite structures 12 and 14 in a fixture, such that they are disposed in a back-to-back abutment with each other. As illustrated in the detail view of FIG. 14, their respective horizontal flanges 20 and 22 are then disposed parallel to each other atop the fixture, so as to define the generally V-shaped groove or channel 32 discussed above.

At step 1602 of the method 1600, the example end-effector 100 is aligned with the channel 32, vertically, horizontally, and at the desired angles α and β using the machine vision system 130 of the end-effector 100 as described above, and at step 1603 of the method 1600, the system 1400 then implements a method 1700 for depositing a bead 24 of filler material 200 into the channel 32. As illustrated in FIG. 16, the step 1603 of depositing the bead 24 of filler material 200 can comprise the example method 1700 outlined in FIG. 17.

Figure 17:
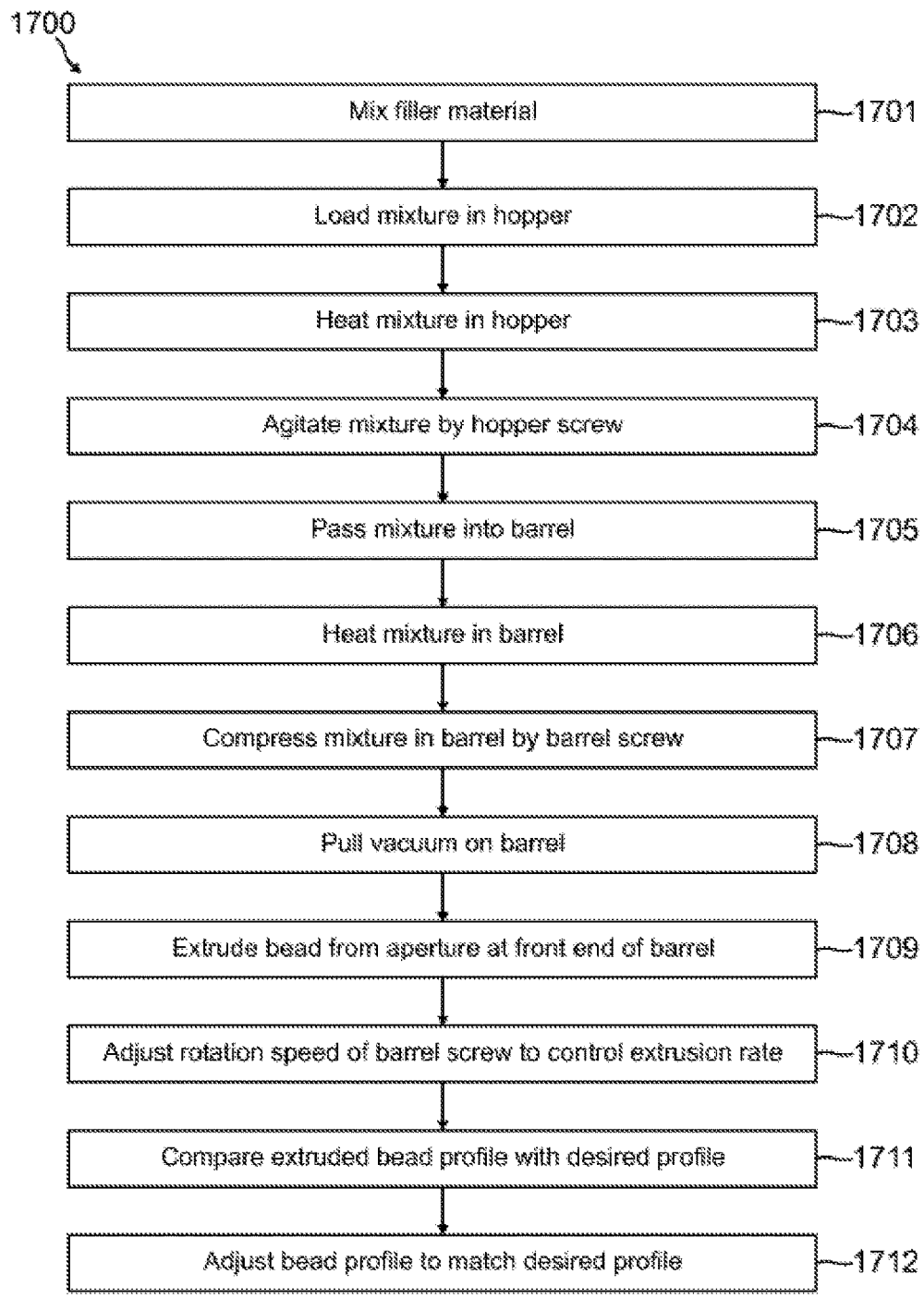
FIG. 17 is a flow diagram of an examplary method for making a composite structure according to an embodiment of the present disclosure.
Figure 18:
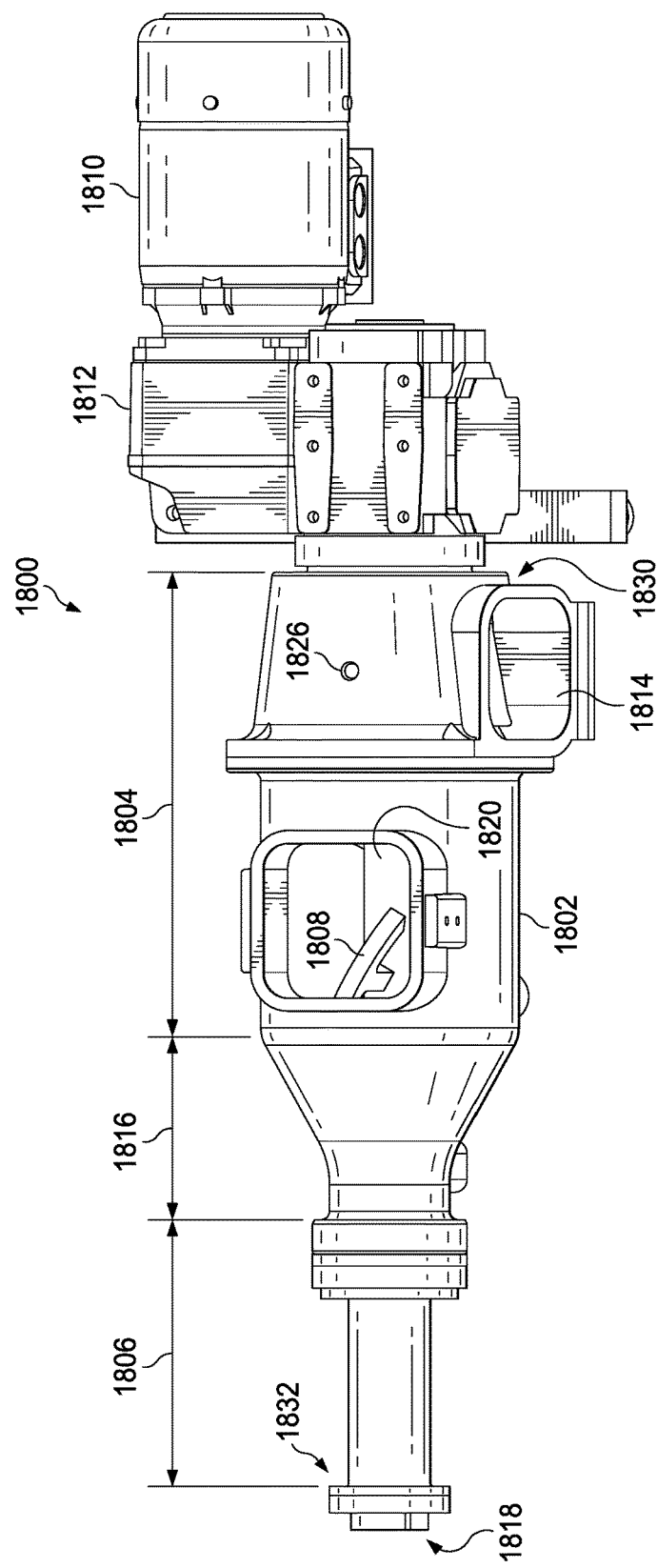
FIG. 18 is a top plan view of an extruder for extruding a bead of fiber reinforced polymer.
Figure 19:
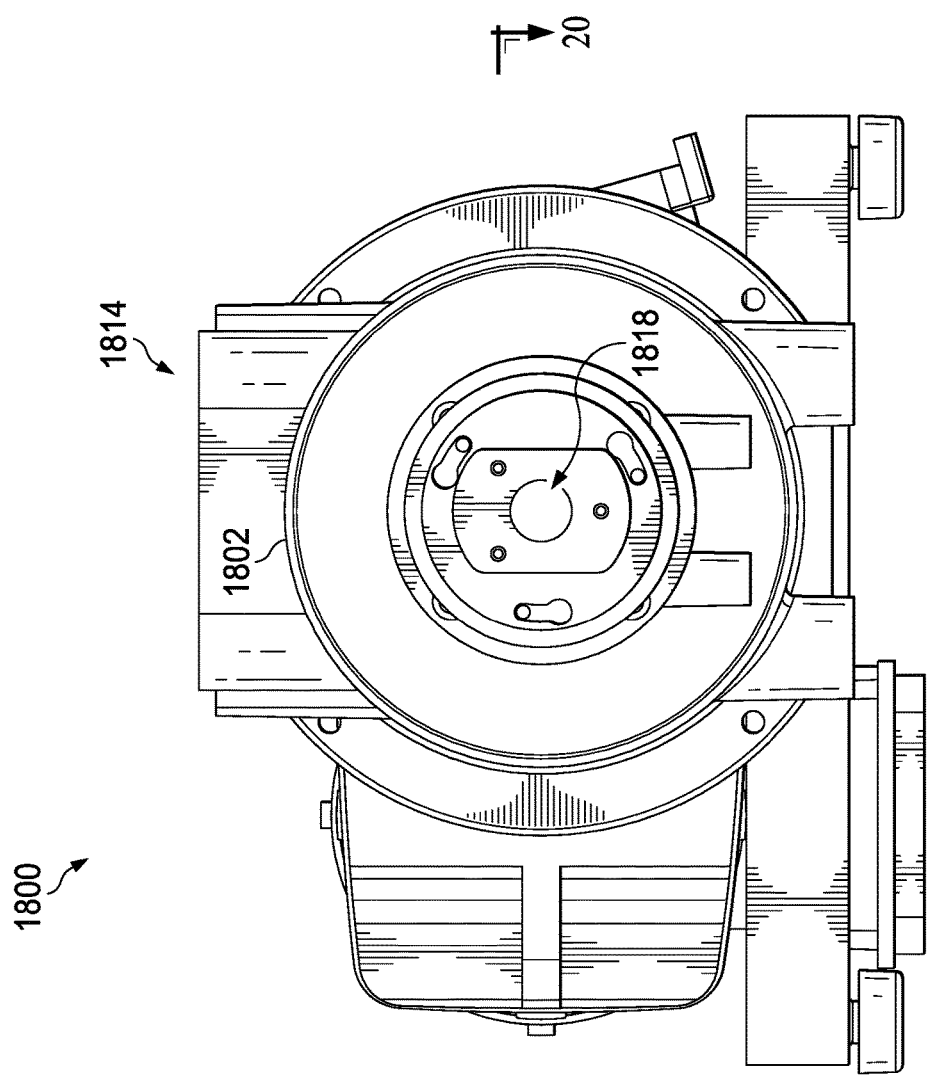
FIG. 19 is a front end view of the extruder shown in FIG. 18.
Figure 20:
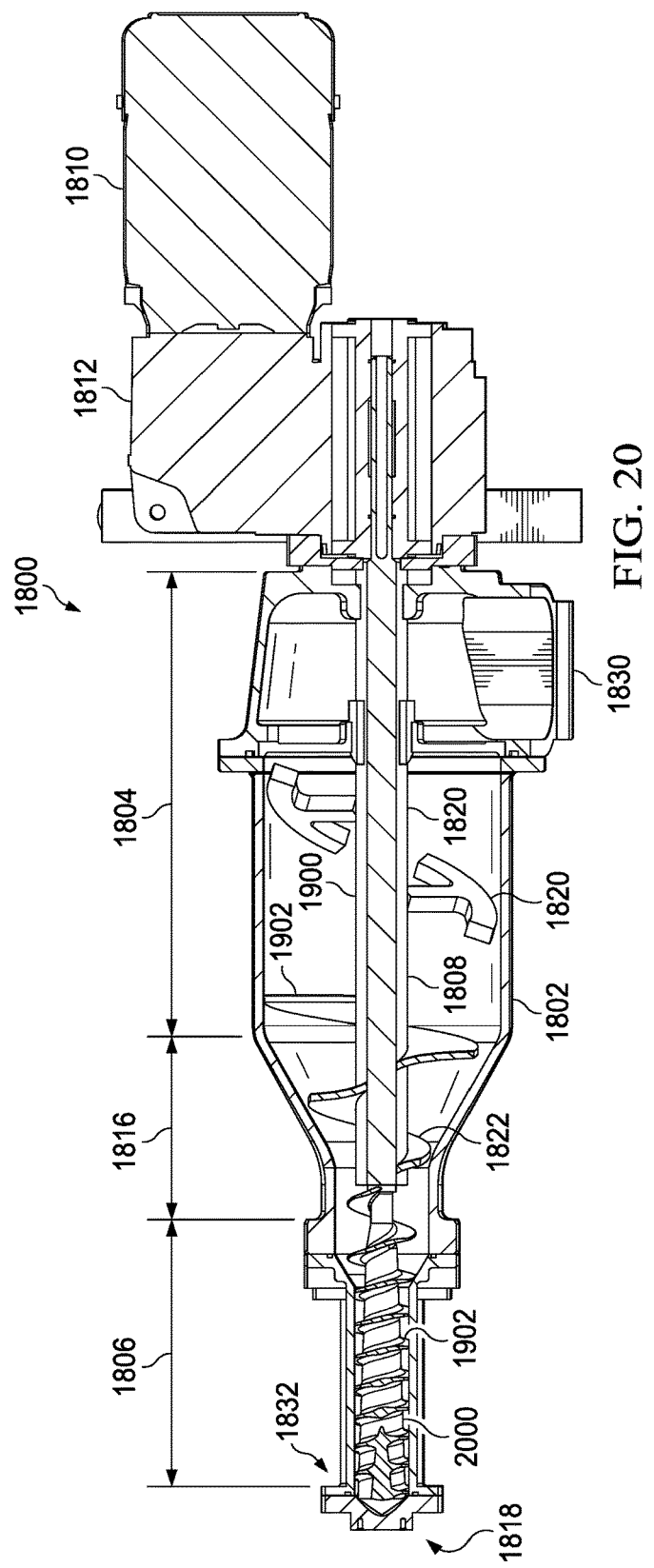
FIG. 20 is a longitudinal sectional view taken along the line 20-20 in FIG. 19.

Thus, as illustrated in FIG. 17, the example method 1700 can comprise an initial step 1701 of mixing first and second groups 220 and 230 of reinforcing fibers into a liquid or paste-like thermosetting resin 210, in which the fibers of the second group 230 have a length substantially shorter than the length of the fibers of the first group 220. As discussed above in connection with FIG. 2E, this step can also include the blending of other property improving fibers, thixotropic particles, and/or toughening agents into the filler material 200.

At step 1702 of the method 1700, the mixture of filler material 200 is loaded into the hopper 106A or 106B of the end-effector 100, which, as discussed above can comprise either the gravity-feed hopper 106A or the vacuum-assisted, power-feed hopper 106B. Optionally, the method 1700 can then continue at 1703 with the heating of the filler material 200 in the hopper 106A or 106B, which, as discussed above, can be effected with the heater 112A disposed in the hopper 106A or 106B to increase the cure stage of the material. At step 1704, if desired, the second screw 118 located in the power-feed hopper 106B can be rotated to agitate the filler material 200 before, at step 1705, the mixture is pumped into the barrel 102 of the end-effector 100. At step 1706, the filler material 200 flowing into the barrel 102 can be further heated or cured, if desired, in a second stage using the second heat jacket 112B surrounding the barrel 102. At step 1707, the heated filler material 200 is then compressed forwardly within the barrel 102 by rotating the extrusion screw 104 using the motor 116. As discussed above, at step 1708, a vacuum can be used in cooperation with the powered hopper 106B to help de-gas and remove voids from the filler material 200 and assist in feeding it into the barrel 102.

At step 1709, the extrusion screw 104 is selectably rotated within in the barrel 102 using the motor 116 to extrude a bead 24 of the filler material 200 through the aperture 110 in response to the rotation. At step 1710, the rotation speed of the screw 104 is adjusted with the motor speed controller 1502 and the motor speed sensor 121 to control the rate of extrusion of the filler material 200. The amount of filler material 200 deposited depends on the gate 124 opening size, the alignment angle and the rate at which the end-effector 100 is moved down the channel 32. At step 1711 of the method 1700, the machine vision system 130 of the end-effector 100 is used, as described above, to compare the cross-sectional profile of the bead 24 of filler material 200 being extruded from the end-effector 100 with a desired profile, e.g., that of the channel 32 disposed below it. At step 1712, the machine vision system 130 is used to selectively operate the gate actuator 128 and thereby move the gate 124 to conform the applied profile of the bead 24 with the desired profile.

Returning to the description of the example method 1600 of FIG. 16, the method 1600 continues with the at step 1604 of moving the end-effector 100 along the channel 32 using the robot 1300 and the carriage 1402 operating in conjunction with the controller 1502 and the machine vision system 130 so as to deposit the bead 24 of filler material 200 into the channel 32 along its entire length. In this regard, the machine vision system 130 is capable of guiding the end-effector 100 so as to follow any channel 32, which can be continuous or discontinuous, of any shape, even if it has a twist, bend or some other deviation, which is not uncommon, as aircraft are not fabricated of just straight materials, and to deposit a corresponding bead 24 of filler material 200 into that channel 32. As discussed above in connection with FIGS. 1-2D, at step 1605, the compacted bead 24 of filler material 200 and upper surfaces of the flanges 20 and 22 of the L-shaped structural members 12 and 14 can be capped with the third structural member 26.

At step 1606 of the example method 1600, the assembly thus formed can then be transferred to another station, e.g., an autoclave, for curing, and at step 1607, the cured assembly can then be subjected to other post-cure procedures, such as sawing into selected lengths. Thus, the various steps of the methods 1600 and 1700 of FIGS. 16 and 17 collectively provide a method of in-situ fabricating a composite structure 24. In this regard, a material 200 is received (e.g., step 1702) at an end-effector 100. The material 200 comprises a first group of fibers 220 having a first length 222, a second group of fibers 230 having a second length 232 shorter than the first length, and a resin 210. The end-effector 100 is operated (e.g., steps 1706 and 1707) to orient the first group of fibers 220 in a substantially longitudinal direction relative to the channel 32 when extruded from the end-effector 100 and orient the second group of fibers 230 in substantially random directions when extruded from the end-effector 100. A bead 24 of the oriented filler material 200 is extruded (e.g., step 1709) from the end-effector 100 onto a workpiece (e.g., structural members 12 and 14 defining channel 32). The end-effector 100 is moved relative to the workpiece during the extruding to form the composite structure 24 while a position of the bead 24 relative to the composite structure 24 is detected (e.g., step 1604), and the extruding and moving are adjusted in response to the detected position (e.g., steps 1604 and 1710).

Attention is now directed to FIGS. 18-21 which illustrate an extruder 1800 that may be employed in the previously discussed end-effector 100 or similar apparatus for extruding a bead of polymer containing reinforcement fibers. The extruder 1800 includes a barrel 1802 formed of a suitable material such as a metal. The extruder 1800 includes a low compression first stage 1804 and a high compression second stage 1806, arranged in-line and connected by a tapered transition section 1816. A rotating screw device 1820 within the barrel 1802 is driven by a motor 1810 through a set of reduction gears 1812, and functions to move the polymer from the aft end 1830 of the barrel 1802 through the transition section 1816 to the barrel's forward end 1832 where it exits through an aperture 1818, and is thereafter extruded through a nozzle assembly (not shown in FIGS. 18-21) that is adapted to be attached to the forward end 1832 of the barrel 1802 and is coupled with the aperture 1818.

The screw device 1820, sometimes referred to as an auger, has a varying diameter, and includes a low compression screw 1808 and a high compression screw 2000 connected end-to-end by any suitable means. In other embodiments, the low compression screw 1808 and the high compression screw 2000 may be of a one-piece construction. Each of the screws 1808, 2000 comprises a helical blade 1902 attached to or integrated with a central shaft 1900 driven by the motor 1810. The barrel 1802 is provided with feed inlet 1814 allowing a supply of a granulate polymer containing reinforcement fibers to be fed into the aft end 1830 of the barrel 1802. For example, a hopper tube 106 (see FIG. 3), such as that previously described, containing a supply of the granulate polymer may be coupled with the feed inlet 1814 in order to provide the barrel 1802 with a continuous supply of the granulate polymer.

Granulate polymer introduced into the aft end 1830 of the barrel 1802 is broken down into smaller particles and mixed by the low compression screw 1808 which feeds the polymer particles through the transition section 1862 to the high compression screw 2000. The low compression screw 1808 may have a discontinuous section 1902A at the aft end thereof which may assist in breaking up/crushing larger polymer particles before they move into the continuous section of the helical blade 1902. A reduced diameter portion 1822 of the low compression screw 1808 within the transition section 1816 increases compression and mixing of the granulate polymer as it is being heated and melted before delivery thereof to the high compression send stage 1806.

Figure 21:
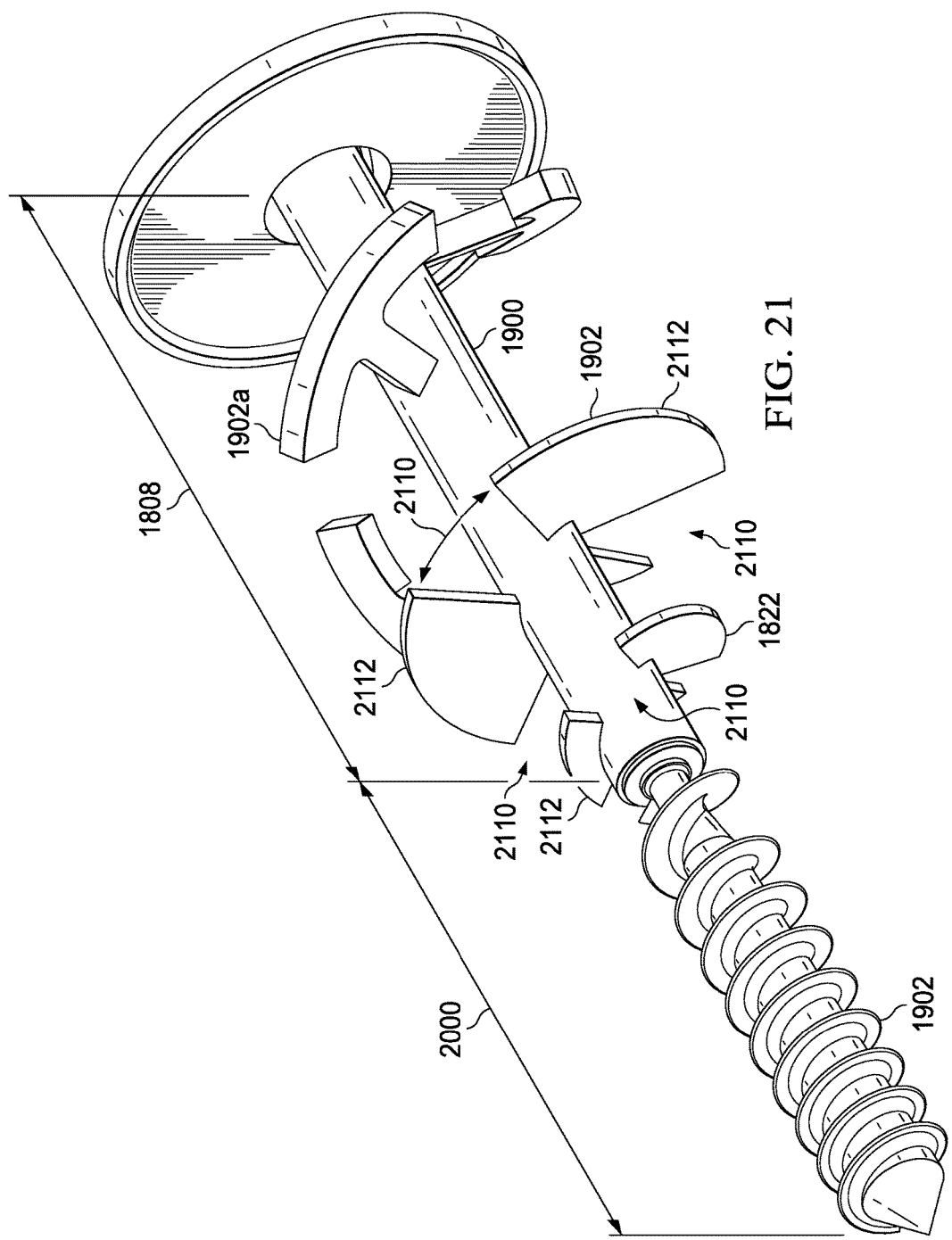
FIG. 21 is a perspective view of the screw forming part of the extruder shown in FIGS. 18-20.

Referring particularly to FIG. 21, in some embodiments, the helical blade 1902 within the low compression first stage 1804 may include circumferentially extending cutouts 2110 therein, forming individual blade segments 2112. As will be discussed below in more detail, the blade cutouts 2110 aid recirculation flow of the polymer within the barrel 1802 which increases mixing and de-gassing of the polymer.

The melted polymer within the transition section 1816 fed to the high compression stage 1806 where the high compression screw 2000 consolidates the melted polymer under high pressure. The barrel 1802 includes a vacuum port 1826 that is adapted to be coupled with a vacuum source 1828 (see FIG. 22) that draws a vacuum within the barrel 1802, causing air and volatile vapors to be drawn away from the barrel 1802, i.e. de-gassing the barrel 1802.

Figure 22:
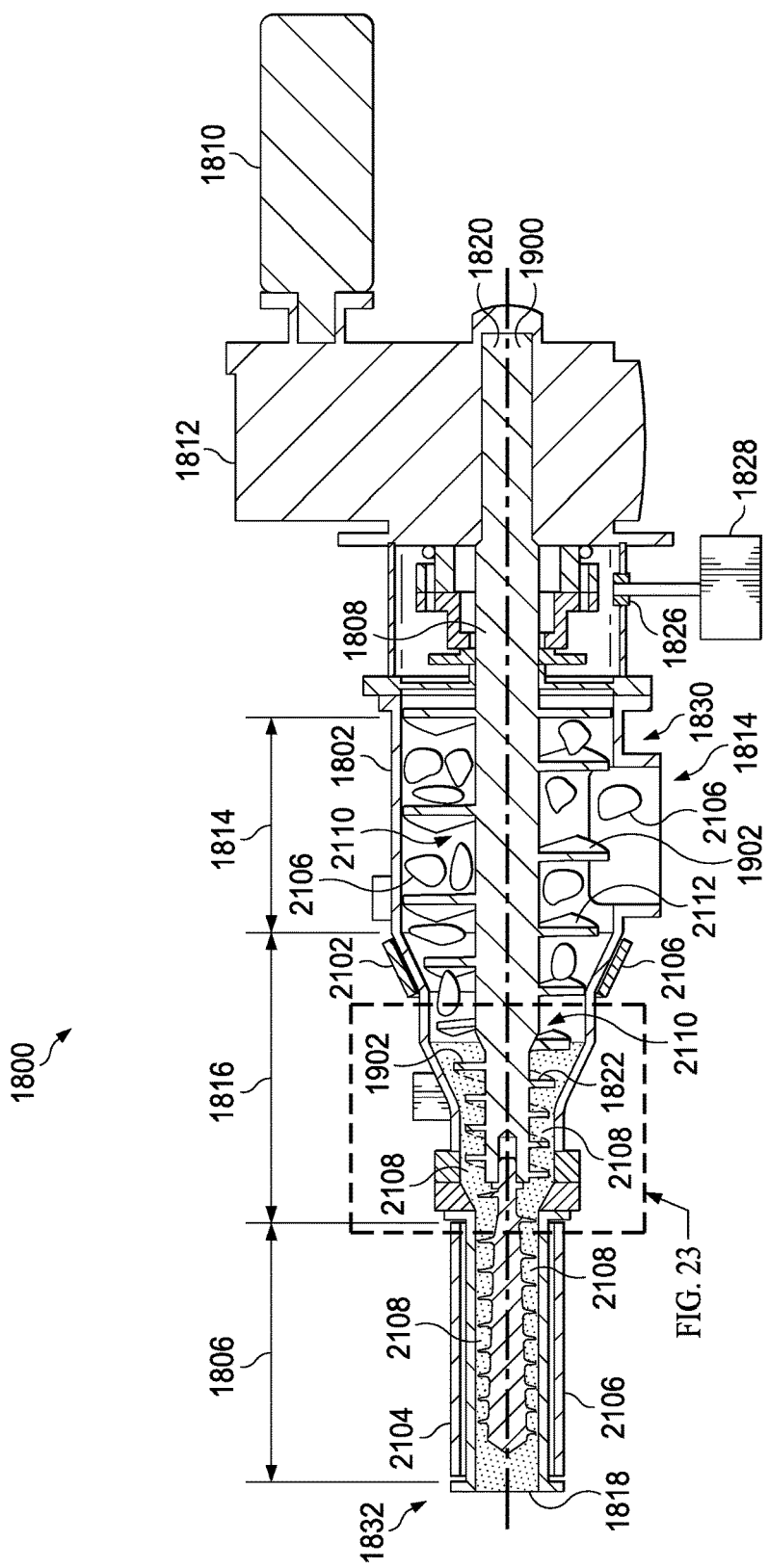
FIG. 22 is a longitudinal sectional view of the extruder, better illustrating a transitional section between the first and second stages of the extruder.
Figure 23:
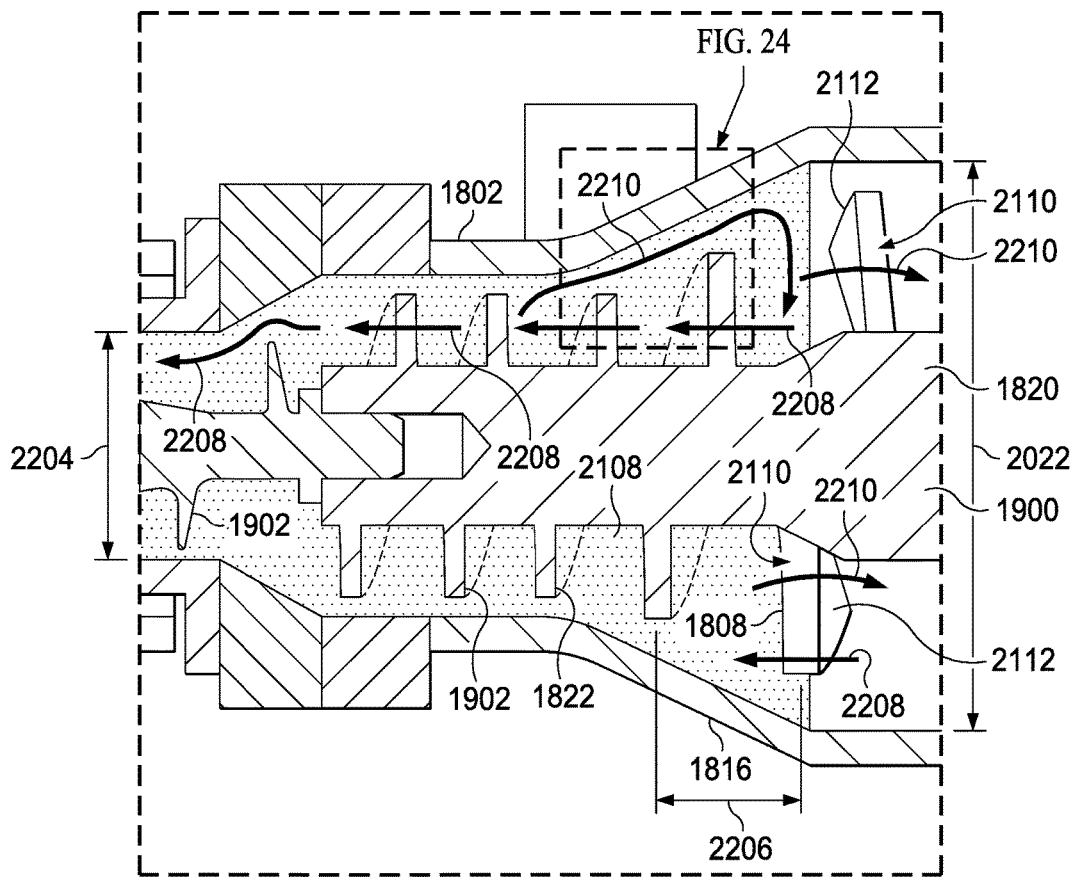
FIG. 23 is an enlarged view of the area designated as "FIG. 23" in FIG. 22.
Figure 24:
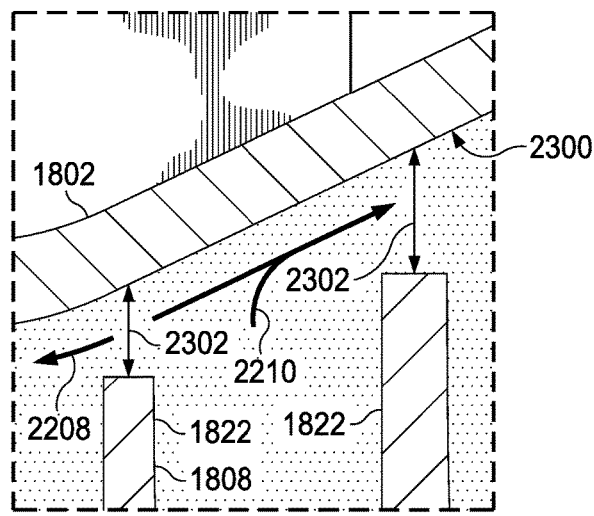
FIG. 24 is an enlarged view of the area designated as "FIG. 24" in FIG. 23.

Reference is now made to FIGS. 22-24 which illustrate additional details of the extruder 1800. As shown in FIG. 22, granulate polymer 2106 containing reinforcing fibers is introduced into the feed inlet 1814 at the aft end 1830 of the barrel 1802. Within the low compression first stage 1804, the granulate polymer 2106 is crushed into smaller particles and compressed under relatively low pressure by the low compression screw 1808. The heating system comprising first and second heating jacket 2102, 2104 respectively, melt the granulate polymer 2106 and maintain the melted polymer in a freely flowable state suitable for extrusion. The first heating jacket 2102 (FIG. 22) surrounds the barrel 1802 within the transition section 1816. The heating jacket 2102 may be, for example, an electrically powered resistive heating element. The heating jacket 2102 heats the polymer to its melting temperature, allowing melted polymer 2108 to smoothly flow under the pressure applied by the low compression screw 1808 toward the high compression second stage 1806.

Smooth feeding the polymer through the barrel 1802 is enhanced by the change in diameter and pitch of the screw device 1820. For example, as shown in FIG. 23, the diameter 2200 and pitch 2206 of the blade 1902 are progressively smaller from the aft end 1830 the forward end 1832. The second heating jacket 2104 surrounds the barrel 1802 substantially throughout the length of the high compression second stage 1806 and may comprise an electrically powered resistive heating element or other heating device suitable for the application.

Referring particularly now to FIGS. 23 and 24, within the transition section 1816, the diameter 2202 of the helical blades 1902, and particularly those of reduced diameter 1822 is less than the inside diameter 2204 of the barrel 1802, creating a gap 2302 between the outer edges of the blades 1902 and the inside wall 2300 of the barrel 1802. As the screw device 1820 feeds the melted polymer 2108 through the transition section 1816 of the barrel 1802, a portion of the melted polymer 2108 recirculates or flows backward through a gap 2302 while the remaining melted polymer 2108 continues its outward flow 2208. The melted polymer 2108 within the transition section 1860 is subject to the vacuum drawn in the barrel 1802. The recirculated portion of the melted polymer 2108 is thus further subjected to de-gassing, allowing additional air and volatiles to be removed from the melted polymer 2108 before it is extruded. Moreover, the recirculation of the melted polymer in this manner improves mixing of the polymer and its included reinforcing fibers, leading to an extruded polymer bead exhibiting improved structural properties. Similarly, the cutouts 2110 in the helical blade 1902 within the low compression first stage 1804 also allow recirculation flow 2210, thereby further improving both mixing of the polymer and reinforcing fibers, and de-gassing of the polymer.

Figure 25:
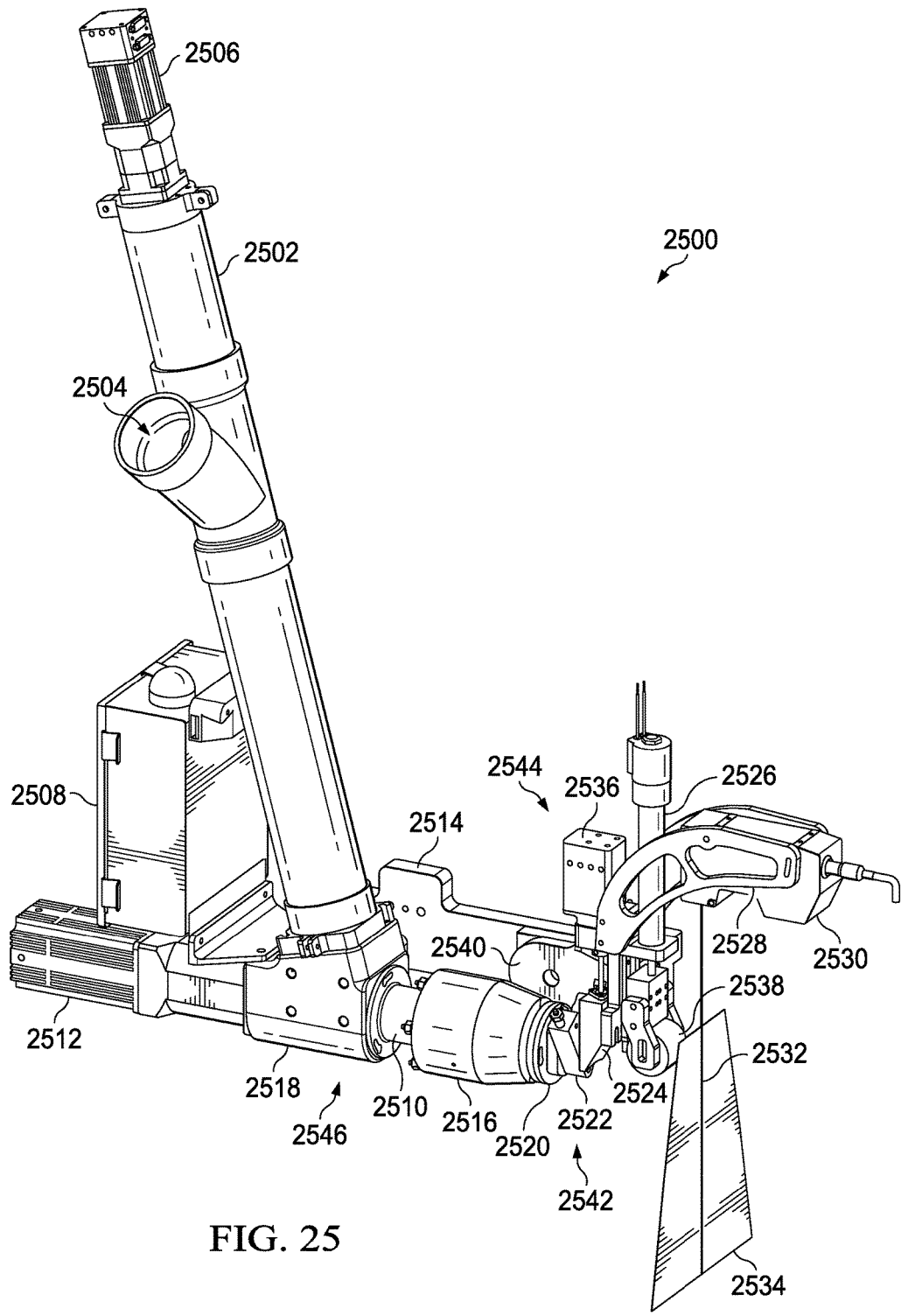
FIG. 25 is a perspective view of one side of an alternate form of the end effector employing the extruder of FIGS. 18-24.
Figure 26:
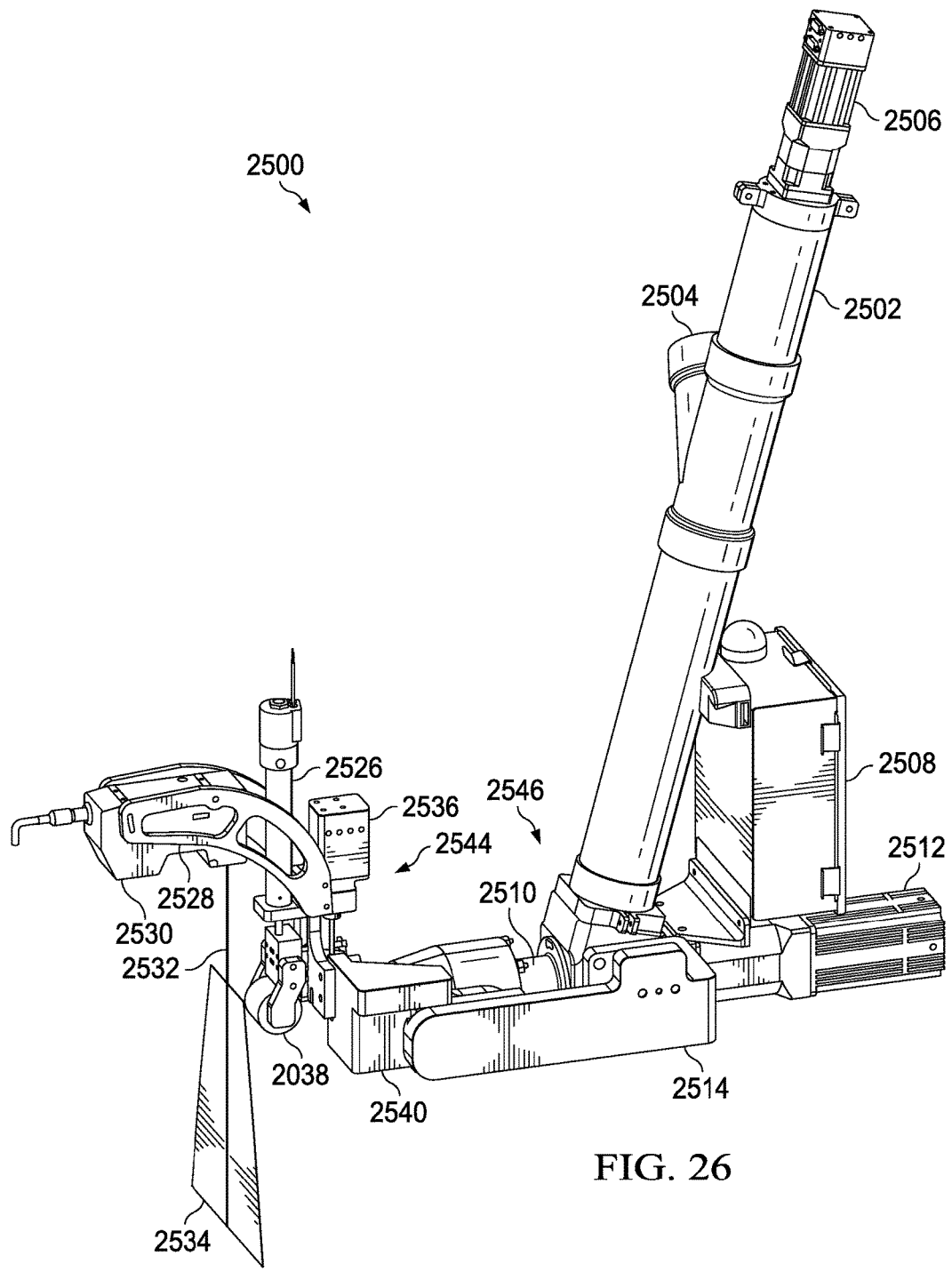
FIG. 26 is a perspective view of the side of the end effector, opposite that shown in FIG. 25.

Attention is now directed to FIGS. 25 and 26 which illustrate another embodiment of the end effector 2500 which incorporates the features of the extruder 1800 described above in connection with FIGS. 18-24. Various sensors and motors forming part of the end effector 2500 are coupled with and controlled by a feedback control system, similar to the feedback and control system 1500 previously described in connection with FIG. 15. The end effector 2500 comprises an extruder 2546 that includes an extruder body 2518 having a barrel 2510 configured similar to the barrel 1802 described above. Granulate polymer incorporating reinforcing fibers is introduced into the filler tube 2504 and fed into a hopper tube 2502 connected to the extruder body 2518.

The hopper tube 2502 includes an internal screw drive (not shown), driven by a motor 2506, that feeds the granulate polymer into the aft end of the extruder barrel 2510. The extruder 2546 further includes an internal screw drive (not shown) within the barrel 2510, having features and a configuration similar to the extruder 1800 discussed above in connection with FIGS. 20-24. The extruder barrel 2510 along with a controller 2508 are mounted on the extruder body 2518.

The extruder body 2518 is attached to an end effector mount 2514 that is configured to mount the end effector 2500 on a robot or similar numerically controlled manipulator suitable for the application. A drive motor 2512 at the aft end of the extruder barrel 2510 drives the internal screw drive (not shown) which feeds the polymer through the extruder barrel 2510 to an extrusion nozzle 2542. A clam cover 2516 surrounds a plurality of circumferentially spaced heater rods 2802 (FIG. 28) which heat the forward end of the extruder barrel 2510, similar to the heating jacket 2102 shown in FIG. 22. The extrusion nozzle 2542 includes a nozzle base 2520, nozzle die 2522, and an adjustable gate 2524. A compaction roller 2538 for compacting the extruded polymer bead is operated by a pneumatic cylinder 2526.

A laser profile sensor 2530 is mounted on the forward end of a scanner bracket 2528 and employs a laser beam 2532 to scan the surface 2534 of a workpiece. The profile sensor 2530 senses the location of certain features on the surface 2534 of the workpiece and feeds this location information back to a controller such as controller 1502 shown in FIG. 15. For example, the profile sensor 2530 can determine the location of the V-shaped channel 32 shown in FIG. 2A, and feed this location information to a controller operates the robot that moves the end effector 2500 over the surface 2534 of the workpiece.

Operation of the gate 2524 is controlled by a gate drive 2544 which includes a servo motor 2536. As will be discussed below in more detail, the gate 2524 may be used to change the profile of the polymer bead that is extruded through the nozzle 2542. The nozzle 2542, compaction roller 2538, gate 2524 and a scanner bracket 2528 are mounted on a swing arm 2540 that is rotatably attached to the end effector mount 2514.

Figure 27:
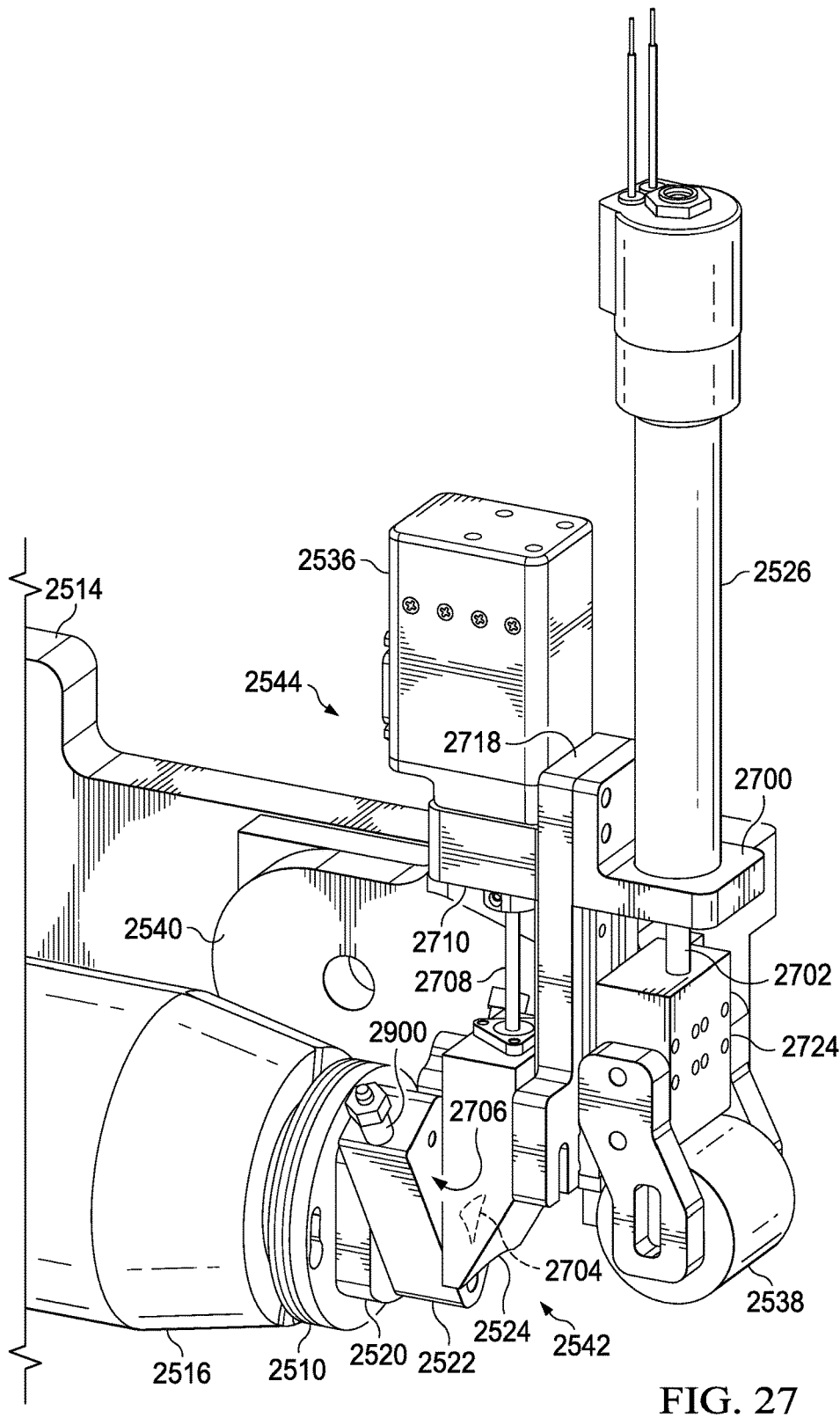
FIG. 27 is a perspective view of the front end of the extruder shown in FIGS. 25 and 26, certain parts not shown for clarity and wherein the gate in shown in transparent form.
Figure 28:
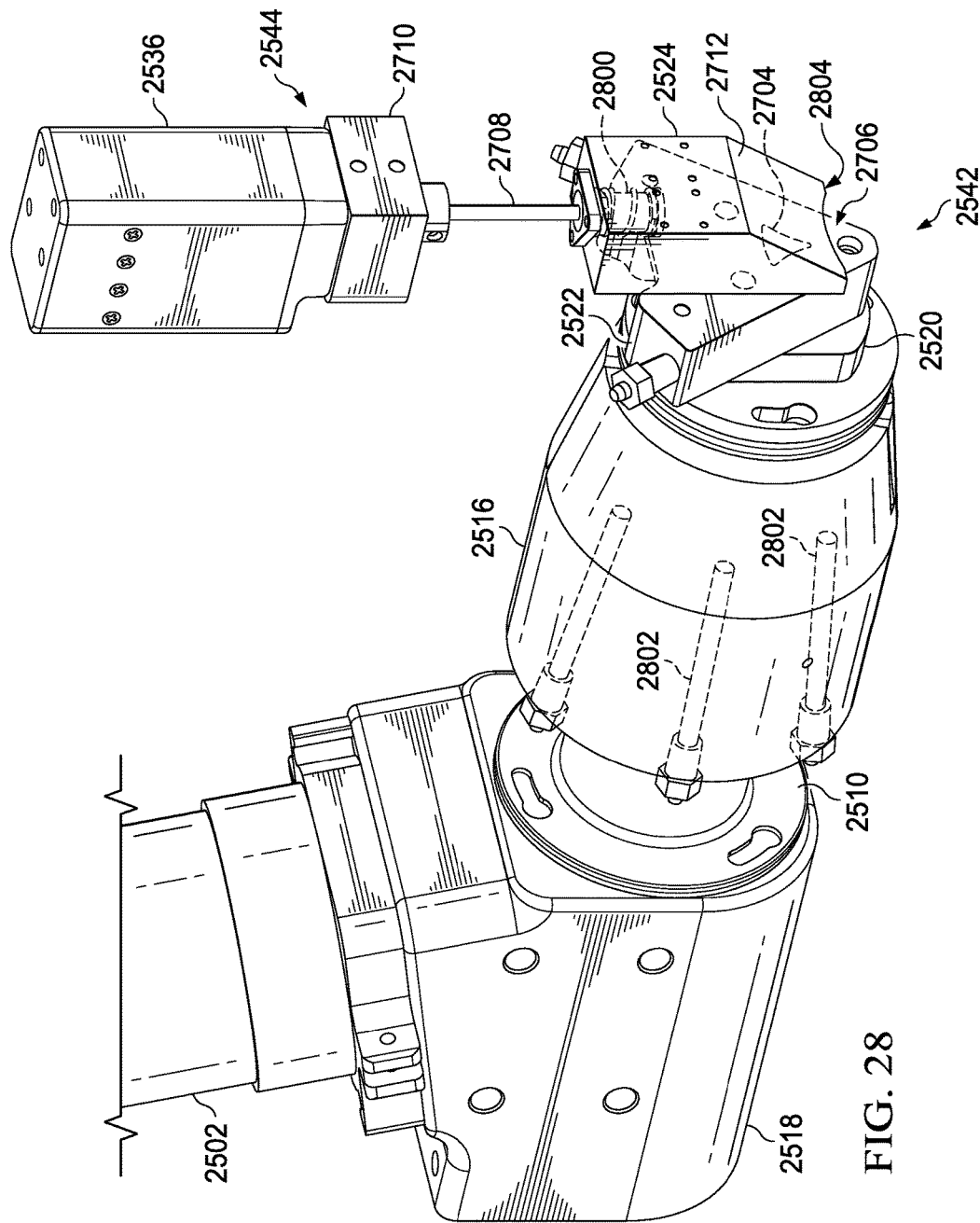
FIG. 28 is a perspective view showing the nozzle assembly on the front end of the extrusion barrel, the gate shown as transparent to reveal the die opening.

Referring to FIGS. 27 and 28, the pneumatic cylinder 2526 is supported on a cylinder mount 2700 and includes a cylinder rod 2702. The compaction roller 2538 is attached to a roller mount 2724 which is slidably attached to the bridge support 2718 and is connected to the cylinder rod 2702. The pneumatic cylinder 2526 controls the amount of compaction force applied by the compaction roller 2538 to the extruded polymer bead.

The gate 2524 is in face-to-face contact with the die face 2706, and is slidably mounted on the bridge support 2718. The gate motor 2536 is supported on a gate mount 2710 that is attached to the bridge support 2718. A rotatable screw shaft 2708 is coupled between the gate motor 2536 and a screw 2800 (FIG. 28) inside the gate 2524. Rotation of the rotatable shaft 2708 by the gate motor 2536 turns the screw 2800 which in turn displaces the gate 2524 relative to a die opening 2704 in the face 2706 of the nozzle die 2522. The die opening 2794 has a fixed cross sectional shape. The gate 2524 includes a chamfered face 2712 and a leading edge 2804 having a predetermined profile suitable for the application.

Figure 29A:
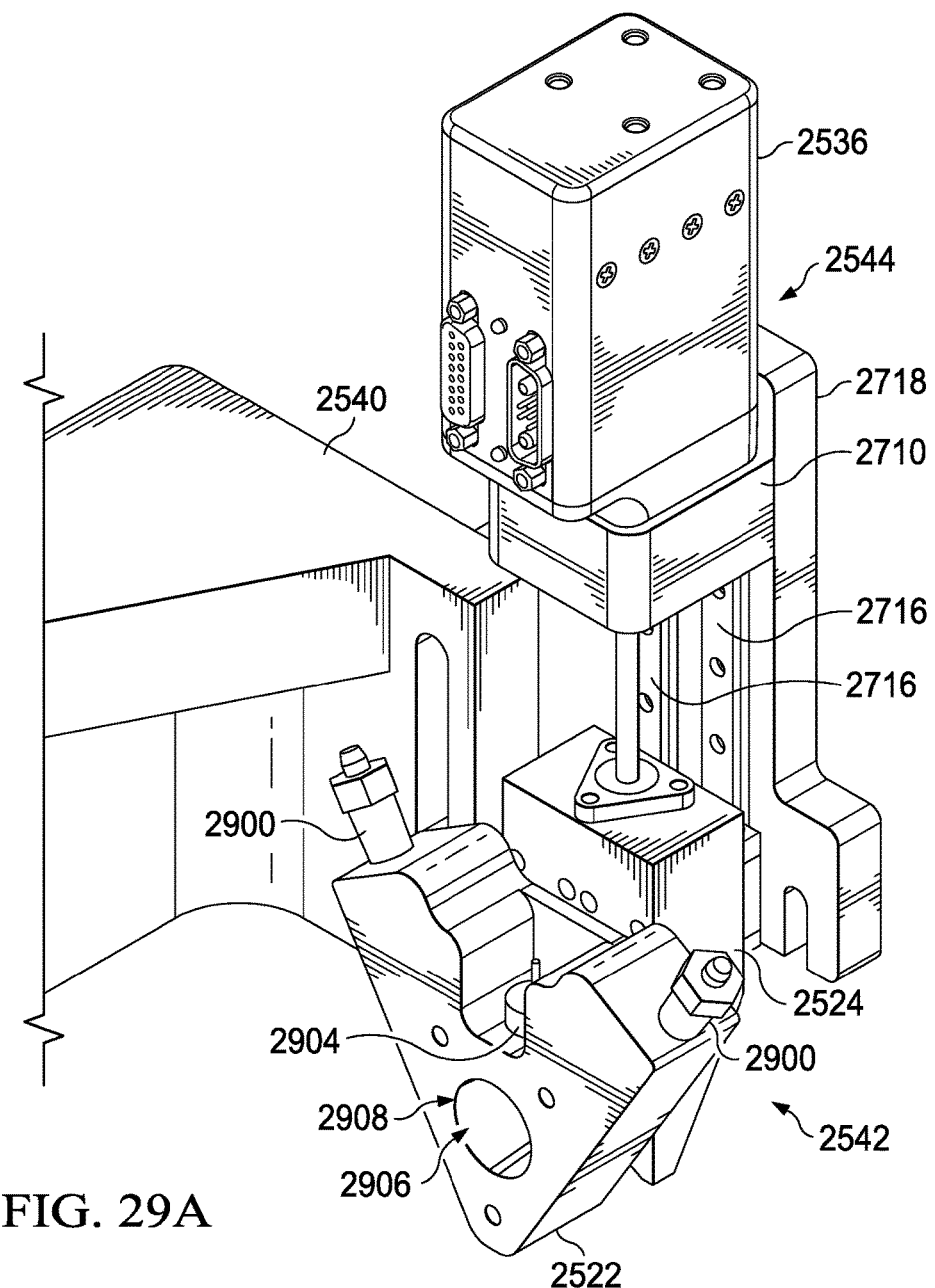
FIG. 29A is a rear perspective view of the nozzle assembly forming part of the extruder shown in FIGS. 25 and 26.
Figure 29B:
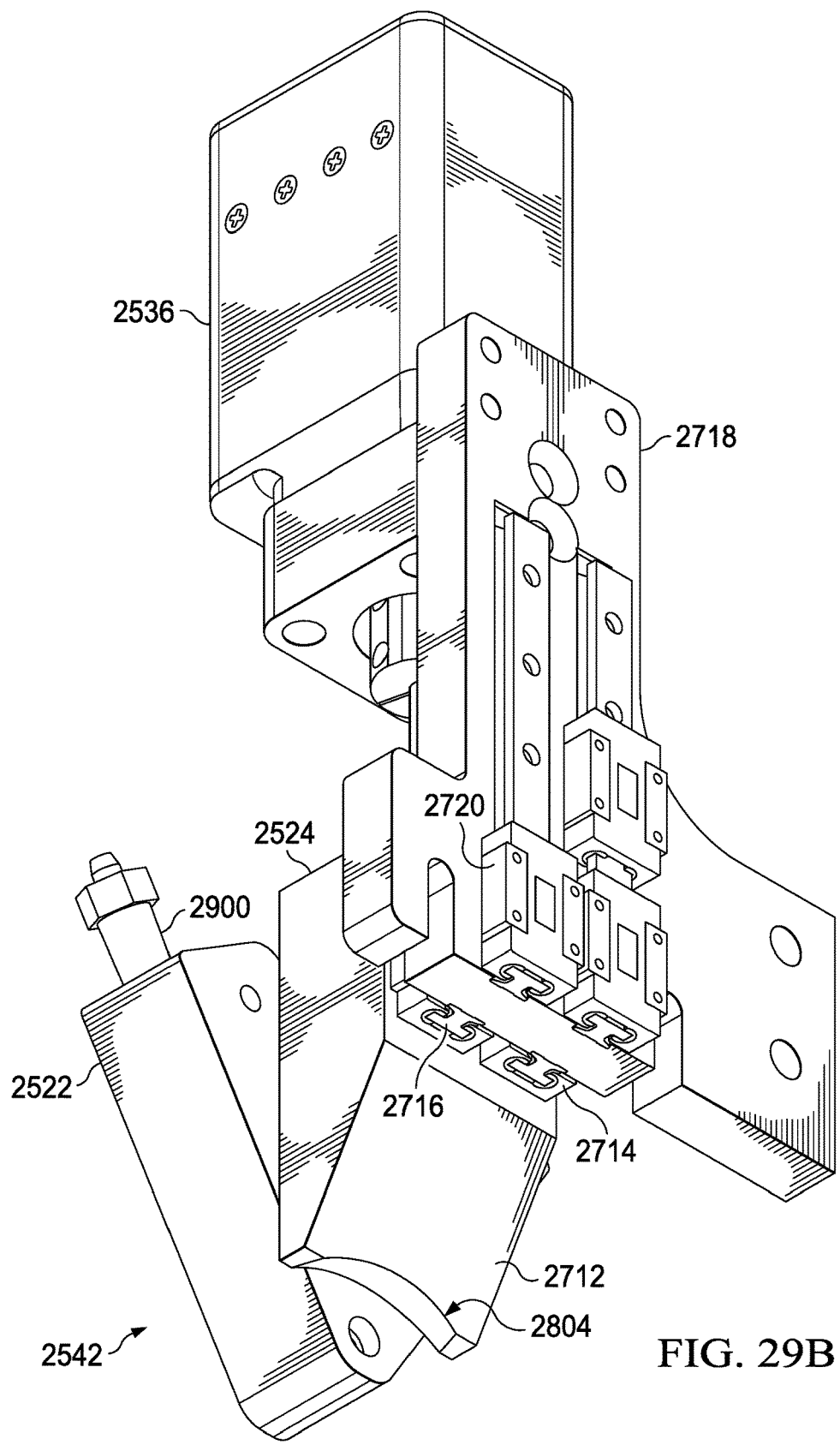
FIG. 29B is a bottom perspective view of the nozzle assembly, illustrating mounting of the gate on a bridge support.
Figure 30:
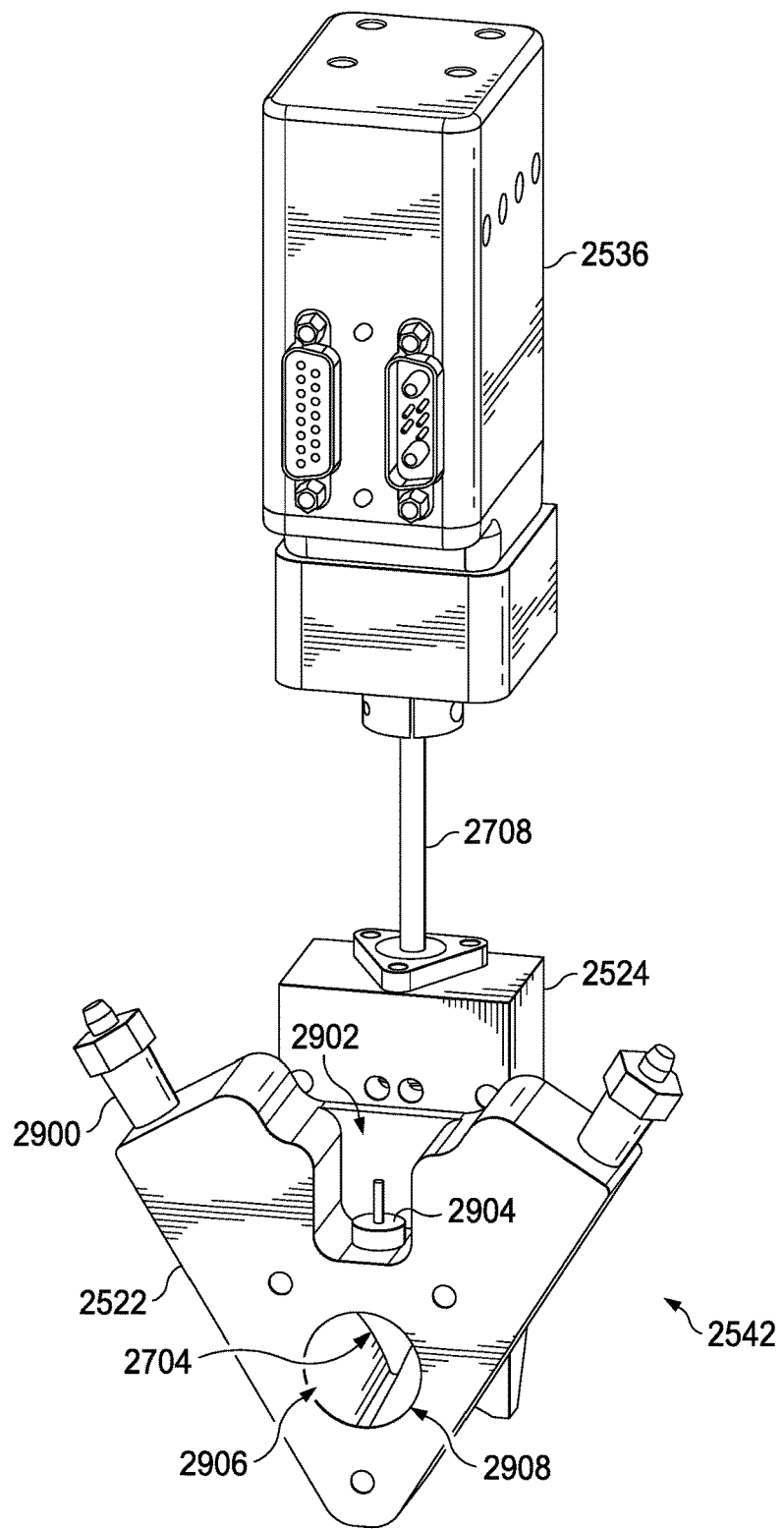
FIG. 30 is a perspective view of the rear side of the nozzle and gate drive.

Referring now to FIGS. 29A-29B and 30, a slide assembly comprising a set of gibs 2714 and ways 2716 slidably mount the gate 2524 on the bridge support 2718 (see FIG. 29). A similar slide assembly 2720 (FIG. 29B) slideably mounts the roller mount 2724 (FIG. 27) on the bridge support 2718. The nozzle die 2522 is provided with a pair of rod heaters 2900 which function similar to the heating jacket 2104 shown in FIG. 22, and maintain the melted polymer in a flowable state for extrusion through the die opening 2704. A pressure sensor 2904 mounted within a pocket 2902 in the nozzle die 2522 senses the pressure of the polymer bead extruded through the die opening 2704 and sends a signal representing the die pressure to the controller that controls the drive motor 2512 (FIG. 25). Depending upon the sensed pressure of the polymer, the drive motor 2512 may adjust the feed rate and/or the viscosity of the polymer may be adjusted by increasing or decreasing the temperature of the polymer using the heating system previously described. The nozzle die 2522 is provided with a through hole 2906 which tapers from a substantially circular opening 2908 on the backside of the nozzle die 2522 to a generally triangular die opening 2704 of the front side of the nozzle die 2522.

Figure 31:
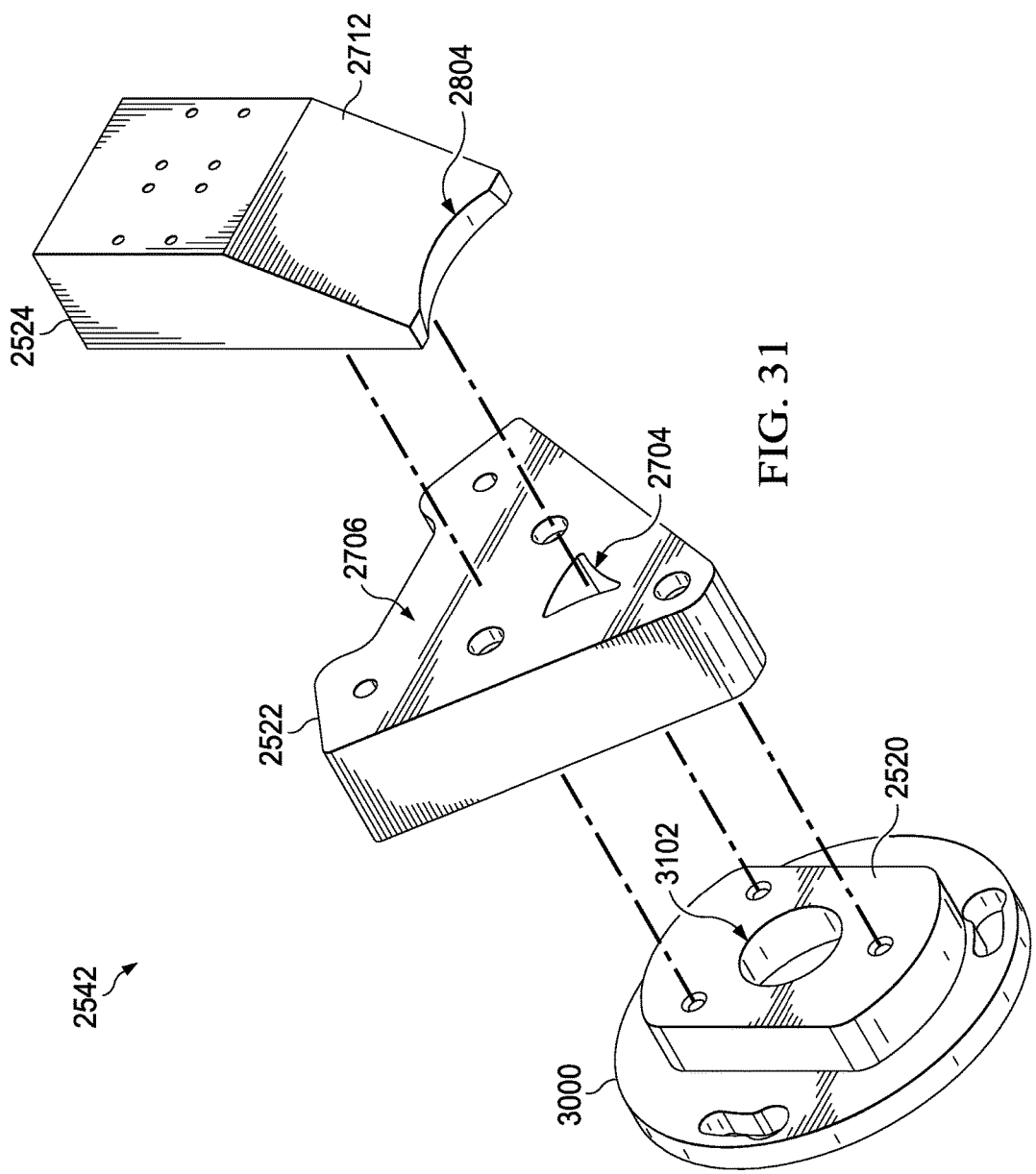
FIG. 31 is an exploded, perspective view of the nozzle.

FIG. 31 illustrates the mounting relationship of the nozzle base 2520, nozzle die 2522 and the gate 2524. As previously mentioned, the backside of the gate 2524 is in face-to-face contact with and slidable over the die face 2706. The nozzle die 2522 is secured as by fasteners (not shown) to the nozzle base 2520. The nozzle base 2520 includes a mounting plate 3000 which is removably attached as by fasteners (not shown) to the forward end of the extruder barrel 2510, with a central opening 3102 therein aligned with a corresponding opening (not shown) in the end of the extruder barrel 2510.

Figure 32A:
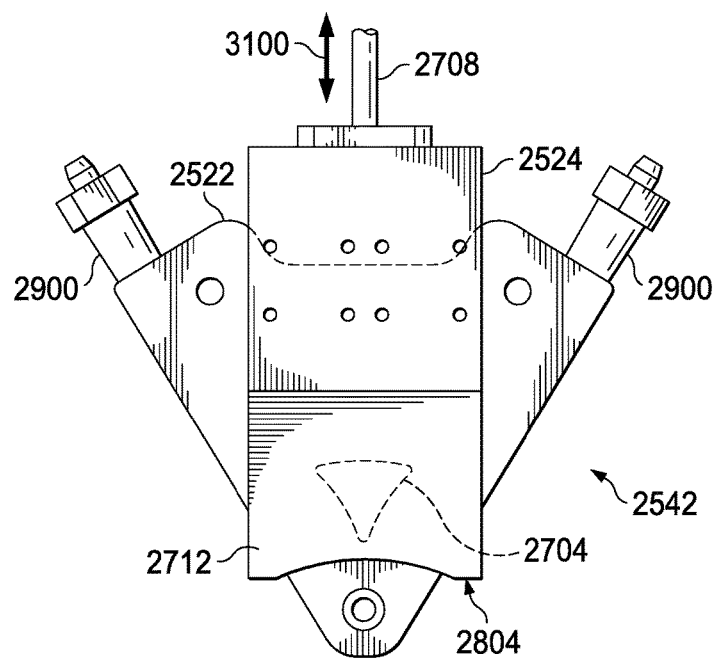
FIG. 32A is a front elevational view of the nozzle, wherein the gate is shown in a position fully covering the die opening.
Figure 32B:
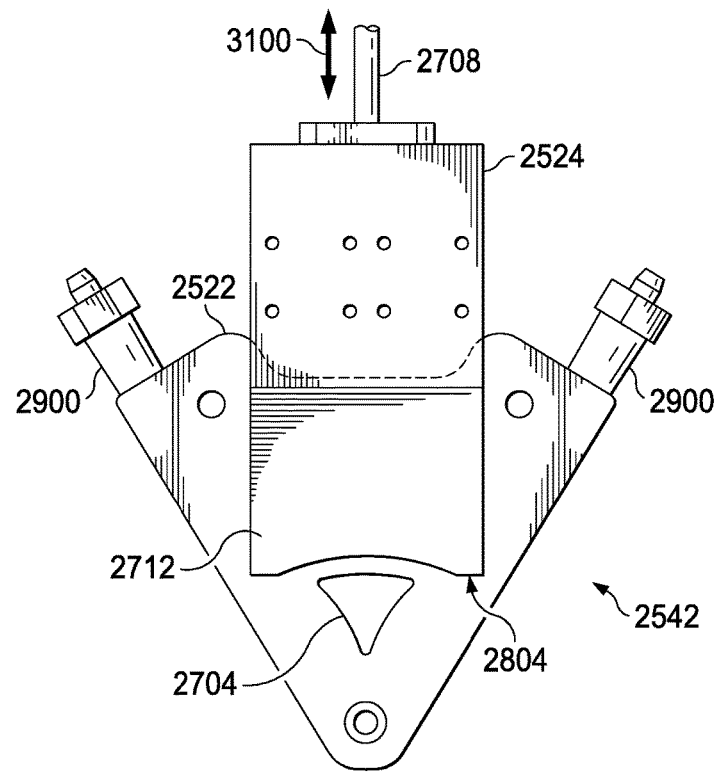
FIG. 32B is a view similar to FIG. 32A, but wherein the gate is shown in a position allowing full exposure of the die opening.
Figure 32C:
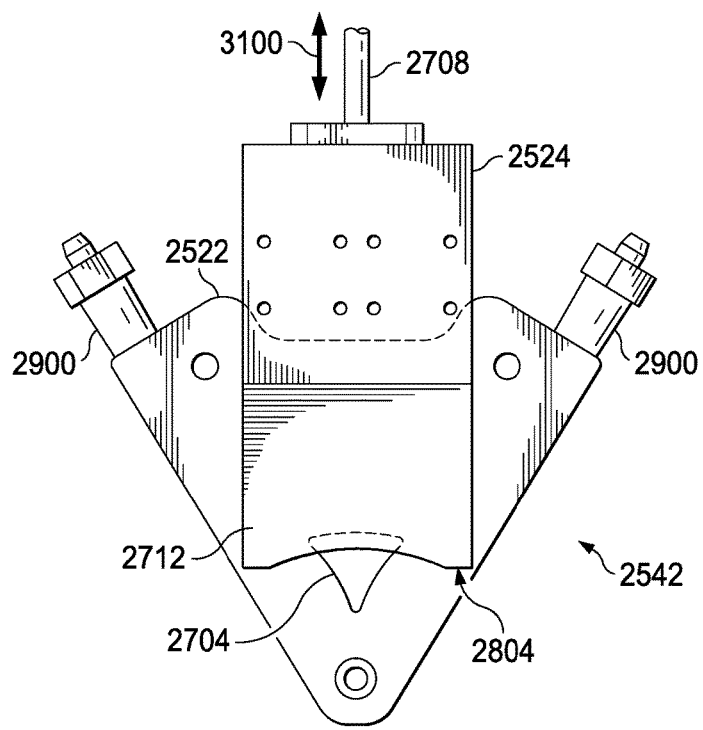
FIG. 32C is a view similar to FIG. 32A, but wherein the gate partially covers the die opening.

Attention is now directed to FIGS. 32A-32C which illustrate various positions of the gate 2524 relative to the die opening 2704. As previously discussed, the servo controlled gate drive 2544 is used to linearly displace 3100 the gate 2524 to any desired position relative to the die opening 2704. In FIG. 32A, the gate 2524 is moved to a position in which it fully covers the die opening 2704, as for example when the extrusion of a polymer bead has been completed. FIG. 32B shows the gate 2524 in a raised position, fully exposing the die opening 2704, such that the cross-sectional shape of the polymer bead that is extruded corresponds to the shape of the die opening 2704.

In FIG. 32C, the gate 2524 has been moved to a position in which it partially covers the die opening 2704. With the die opening 2704 partially covered by the gate 2524, the cross-sectional shape of the extruded polymer bead is a combination of the shape of the uncovered portion of the die opening 2704, and the leading edge 2804 of the gate 2524. Thus, depending upon position of the gate 2524 relative to the die opening 2704, polymer beads can be extruded having various cross-sectional shapes and areas. Depending on the application, the use of a servo controlled drive 2544 to control the position of the gate 2524 allows the position of the gate 2524 to be moved to any location, or to be varied continuously while the bead is being extruded, resulting in an extruded polymer bead having a varying cross-sectional area along its length.

Figure 33:
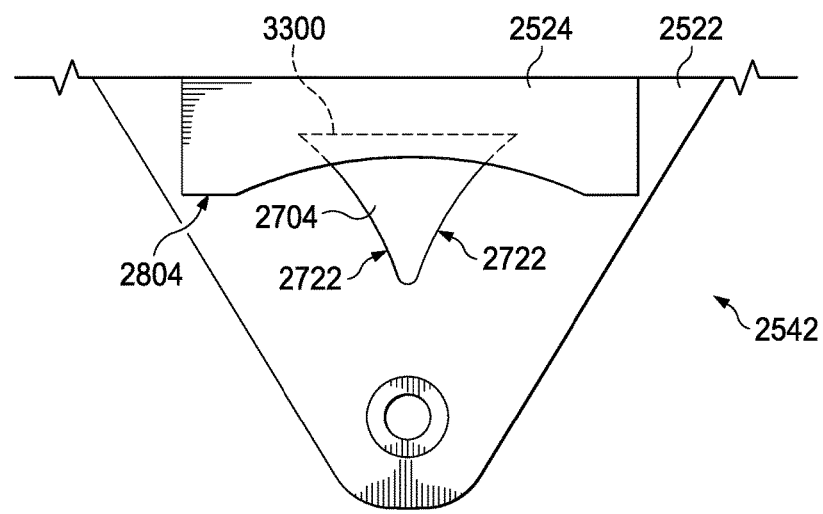
FIG. 33, is a front elevational view of a lower portion of the nozzle, better showing how the leading edge of the gate covers a top portion of the die opening.

FIG. 33 illustrates one example of a die opening 2704 suitable for use and extruding a polymer bead 24 used to fill the V-shaped channel 32 shown in FIGS. 2A and 2B. The die opening 2704 includes radiused sides 2722, and a substantially flat top 3300. The gate 2524 is shown moved to a position partially covering the die opening 2704, thereby changing the size of the cross section of the extruded bead. Further, in this example, the leading edge 2804 of the gate 2524 is slightly arcuate, resulting in an extruded bead having a correspondingly arcuate top surface. Consequently, it can be appreciated that the variable position gate 2524 can be employed to change both the area and shape of the extruded polymer bead.

Figure 34:
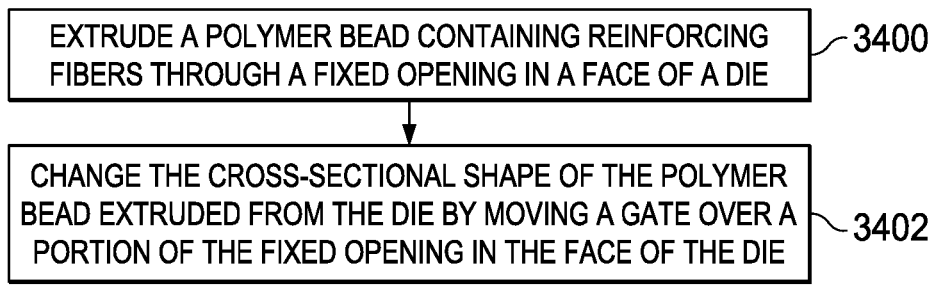
FIG. 34 is a flow diagram showing the steps of a method of extruding a polymer bead containing reinforcing fibers through a fixed die opening.

Attention is now directed to FIG. 34 which broadly illustrates the overall steps of a method of extruding a polymer bead through a fixed die opening 2704. At 3400, a polymer bead containing reinforcing fibers is extruded through a fixed opening 2704 in a face of a die 2522. At 3402, the cross-sectional shape of the polymer bead is changed by moving a gate 2524 over a portion of the fixed opening 2704 in the face of the die 2522.

Figure 35:
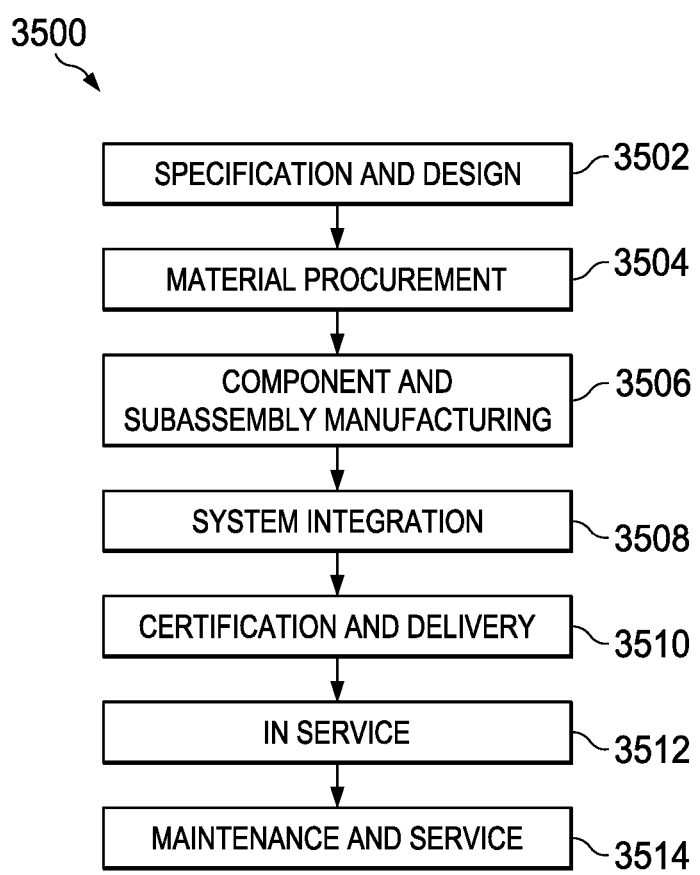
FIG. 35 is a flow diagram of an exemplary embodiment of an aircraft production and service method in accordance with the present disclosure.
Figure 36:
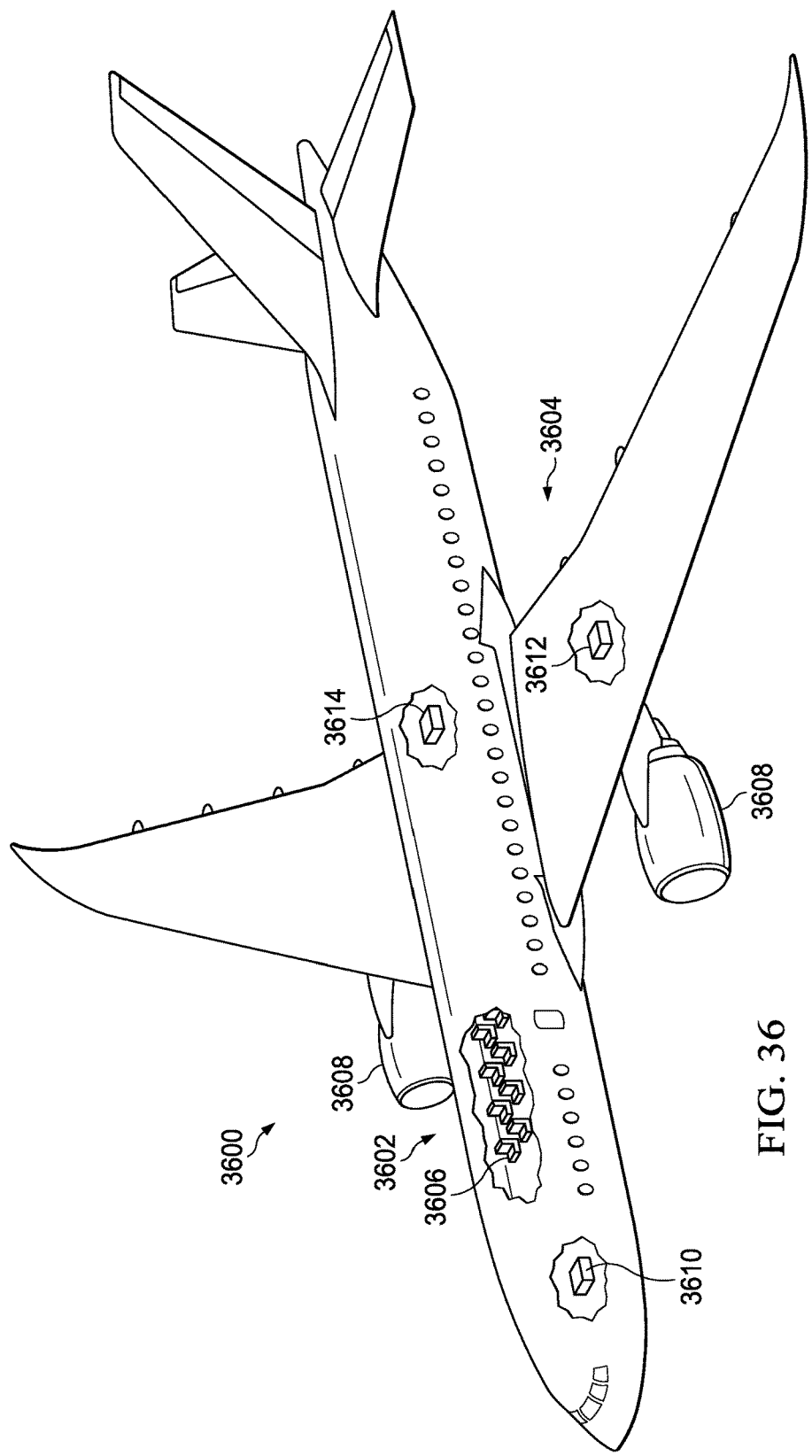
FIG. 36 is a partially cutaway upper, left side perspective view of an aircraft.

Examples of the present disclosure can be described in the context of an aircraft manufacturing and service method 3500, as illustrated in FIG. 35, and in the context of an aircraft 3600, as illustrated in FIG. 36. Thus, during pre-production, the example method 3500 can include a specification and design stage or phase 3502 of the aircraft 3600 and a material procurement phase 3504. During production, a component and subassembly manufacturing phase 3506 and a system integration phase 3508 of the aircraft 3600 can take place. Thereafter, the aircraft 3600 can go through a certification and delivery phase 3510 preparatory to being placed in service at 3512. While in service, the aircraft 3600 can be scheduled for a routine maintenance and service phase 3514. The routine maintenance and service phase 3514 can include modification, reconfiguration, refurbishment, etc., of one or more systems of the aircraft 3600. The disclosed embodiments can be used in any of 3506, 3508, 3514, 3602 and 3606.

Each of the processes of the disclosed embodiments described above can be performed or carried out by a system integrator, a third party, and/or an operator (e.g., a customer). For the purposes of this description, a "system integrator" can include, without limitation, any number of aircraft manufacturers and major-system subcontractors; a "third party" can include, without limitation, any number of vendors, subcontractors, and suppliers; and an "operator" can include an airline, leasing company, military entity, service organization, and so on. For example, various aspects disclosed herein can be utilized during one or more of the phases 3502, 3504, and 3506, and/or in connection with one or more of the elements 3602 or 3604 of the aircraft 3600 described below.

As illustrated in FIG. 36, the aircraft 3600 produced, maintained and upgraded using the disclosed embodiments, can include an airframe 3602 with a plurality of high-level systems 3604 and an interior 3606. Examples of the high-level systems 3604 can include one or more of a propulsion system 3608, an electrical system 3610, a hydraulic system 3612, and an environmental system 3614. Any number of other systems can also be included.

Although an aerospace example is illustrated in the figures, the principles disclosed herein can be applied in a similar manner to other industries, such as the automotive industry. Accordingly, in addition to the aircraft 3600, the principles disclosed herein can apply to other vehicles, e.g., land vehicles, marine vehicles, space vehicles, and so on.

The example systems and methods shown and described herein can be employed during any one or more of the stages of the manufacturing and service method 3500. For example, components or subassemblies corresponding to component and subassembly manufacturing phase 3506 can be fabricated or manufactured in a manner similar to the components or subassemblies produced while the aircraft 3600 is in service. Also, one or more examples of the systems, methods, or combinations thereof can be utilized during the production phase 3506 and 3508 of the method 3500, for example, by substantially expediting assembly or reducing the cost of the aircraft 3600. Similarly, one or more examples of the apparatus or method realizations, or a combination thereof, can be utilized, for example and without limitation, while the aircraft 3600 is in service, e.g., in the maintenance and service phase 3514.

As those of some skill in this art will understand, the systems and methods described herein are not limited to the fabrication of various types of vehicles. They are also fully applicable, with suitable modifications, to the manufacture of, for example, composite pressure vessels, such as dive tanks, and composite casings for, e.g., solid rocket engines. Indeed, as those of skill will by now appreciate, and depending on the particular application at hand, many modifications, substitutions and variations can be made in and to the materials, apparatus, configurations and methods of the present disclosure without departing from the spirit and scope thereof. In light of this, the scope of the present invention should not be understood as being limited to those of the particular embodiments illustrated and described herein, as they are merely by way of some examples thereof, but rather, should be fully commensurate with that of the claims appended hereafter and their functional equivalents.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. Apparatus for extruding a fiber reinforced polymer bead, comprising:
    a barrel configured to hold a polymer containing reinforcing fibers and to move the polymer toward an end of the barrel by a screw driven by a first motor in response to a signal from a pressure sensor in a pocket of a die;
    an extrusion nozzle attached to the barrel, the extrusion nozzle including the die having a fixed die opening through which the fiber reinforced polymer is extruded into a polymer bead; and
    a gate movable over a portion of the fixed die opening for changing a shape of the polymer bead extruded through the extrusion nozzle, wherein the die comprises a pair of rod heaters that maintain the polymer in a flowable state for extrusion through the fixed die opening;
wherein the gate moves in response to a second motor mounted above the gate; and
wherein the barrel, the extrusion nozzle, and the gate are located at an end of a robotic arm.

2. The apparatus of claim 1, wherein:
the die includes a die face,
the fixed die opening is defined in the die face, and
the gate is slidable over the die face;
wherein the fixed die opening comprises a through hole which tapers from a substantially circular opening on a backside of the die to a generally triangular opening of a front side of die.

3. The apparatus of claim 1, further comprising:
a servo controlled drive coupled with the gate for controlling movement of the gate over the portion of the fixed die opening, wherein the servo controlled drive is controlled by a robot.

4. The apparatus of claim 3, wherein the servo controlled drive includes:
a servo motor,
a rotatable shaft coupled with and rotated by the servo motor, and
a screw mounted on the gate and coupled with the rotatable shaft, wherein rotation of the shaft by the servo motor linearly displaces the gate relative to the fixed die opening.

5. The apparatus of claim 1, wherein the gate includes a leading edge configured to move over the fixed die opening, and shaped to define a portion of a cross sectional shape of the polymer bead.

6. The apparatus of claim 5, wherein:
the gate includes a chamfered face, and
the leading edge is defined along a side of the chamfered face.

7. The apparatus of claim 1, further comprising:
a high compression screw within the barrel configured to consolidate and feed the polymer to and through the extrusion nozzle, and
a low compression screw within the barrel, the low compression screw being coupled with the high compression screw and configured to feed the polymer to the high compression screw.

8. A robotic end effector for extruding a polymer bead containing reinforcing fibers, comprising:
a barrel configured to receive a polymer therein containing reinforcing fibers;
a rotatable screw within the barrel for moving the polymer toward an end of the barrel;
a first motor for rotating the rotatable screw;
an extrusion nozzle assembly mounted on the end of the barrel, the extrusion nozzle assembly including a die having a die face provided with a die opening therein through which the polymer is extruded as the polymer bead, the die opening having a fixed cross-sectional shape, and
a gate slidable over a portion of the die opening for varying a shape of the polymer bead of the polymer extruded through the die, wherein the gate moves in response to a second motor mounted above the gate and controlled by a robot; and
a pressure sensor mounted within a pocket in the die configured to sense a pressure of the polymer bead extruded through the die opening and to send a signal representing a die pressure to a controller that controls the first motor.

9. The robotic end effector of claim 8, wherein the gate is in contact with and slideable over the die face.

10. The robotic end effector of claim 8, wherein:
the die opening has a fixed shape, and
the gate includes a leading edge configured to cover the portion of the die opening and shape a part of the polymer bead as the polymer bead is extruded through the die opening.

11. The robotic end effector of claim 10, wherein:
the gate includes a chamfered face, and
the leading edge is defined along a side of the chamfered face.

12. The robotic end effector of claim 8, further comprising:
a support on which the gate is mounted;
a shaft coupled with the gate; and
a motor coupled with the shaft for sliding the gate over the die face.

13. The robotic end effector of claim 12, further comprising:
a screw on the gate, and
wherein the shaft is rotatable by the motor and rotation of the shaft rotates the screw and thereby linearly displaces the gate.

14. The robotic end effector of claim 8, further comprising:
a sensor for sensing a position of a surface on which the polymer bead is to be extruded relative to a location of the die opening.

15. A method of extruding a polymer bead containing reinforcing fibers, comprising:
providing a robotic end effector comprising:
a barrel configured to receive a polymer therein containing reinforcing fibers;
a rotatable screw within the barrel for moving the polymer toward an end of the barrel;
a first motor for rotating the rotatable screw;
an extrusion nozzle assembly mounted on the end of the barrel, the extrusion nozzle assembly including a die having a die face provided with a die opening therein through which the polymer is extruded as a bead, the die opening having a fixed cross-sectional shape, and
a gate slidable over a portion of the die opening for varying a shape of the bead of the polymer extruded through the die, wherein the gate moves in response to a second motor mounted above the gate and controlled by a robot; and
a pressure sensor mounted within a pocket in the die configured to sense a pressure of the bead extruded through the die opening and to send a signal representing a die pressure to a controller that controls the first motor;
extruding the polymer bead containing reinforcing fibers through the die opening; and
changing a cross-sectional shape of the polymer bead extruded through the opening in the die by moving the gate over a portion of the die opening.

16. The method of claim 15, wherein moving the gate includes sliding the gate over the die face of the die.

17. The method of claim 15, wherein moving the gate is performed using a servo controlled motor.

18. The method of claim 17, wherein movement of the gate by the servo controlled motor includes linearly displacing the gate using a screw drive powered by the servo controlled motor.

19. The method of claim 15, wherein changing the cross-sectional shape of the polymer bead includes using an edge of the gate to form a portion of the shape of the polymer bead.

20. The method of claim 15, wherein:
   extruding the polymer bead includes moving the extrusion nozzle over a surface onto which the polymer bead is to be extruded, and
   changing a cross-sectional shape of the polymer bead includes varying a position of the gate over a portion of the opening in the die face of the die as the extrusion nozzle is moved over the surface.

\* \* \* \* \*